(12) United States Patent
Biggerstaff et al.

(10) Patent No.: US 11,566,730 B2
(45) Date of Patent: Jan. 31, 2023

(54) DRILL PIPE

(71) Applicant: Black Diamond Oilfield Rentals LLC, Houston, TX (US)

(72) Inventors: Christopher M. Biggerstaff, Houston, TX (US); Charles G. Kibbe, New Iberia, LA (US)

(73) Assignee: Black Diamond Oilfield Rentals LLC, Houston, TX (US)

( * ) Notice: Subject to any disclaimer, the term of this patent is extended or adjusted under 35 U.S.C. 154(b) by 176 days.

(21) Appl. No.: 16/680,242

(22) Filed: Nov. 11, 2019

(65) Prior Publication Data

US 2020/0173584 A1    Jun. 4, 2020

Related U.S. Application Data

(63) Continuation-in-part of application No. 15/926,431, filed on Mar. 20, 2018, and a continuation-in-part of application No. 15/924,709, filed on Mar. 19, 2018.

(60) Provisional application No. 62/554,707, filed on Sep. 6, 2017, provisional application No. 62/554,347, filed on Sep. 5, 2017.

(51) Int. Cl.
    *F16L 15/06*   (2006.01)
    *E21B 17/042*  (2006.01)
    *E21B 19/16*   (2006.01)

(52) U.S. Cl.
    CPC ............ *F16L 15/06* (2013.01); *E21B 17/042* (2013.01); *E21B 19/16* (2013.01)

(58) Field of Classification Search
    CPC ....... F16L 15/06; F16L 15/001; F16L 15/004; F16L 15/00; E21B 17/042
    See application file for complete search history.

(56) References Cited

U.S. PATENT DOCUMENTS

| | | | |
|---|---|---|---|
| 2,239,942 A | 4/1941 | Stone et al. | |
| 3,870,351 A | 3/1975 | Matsuki | |
| 4,121,862 A | 10/1978 | Greer | |
| 4,161,332 A * | 7/1979 | Blose | E21B 17/0423 |
| | | | 285/334 |
| 4,192,533 A | 3/1980 | Blose | |
| 4,494,777 A | 1/1985 | Duret | |

(Continued)

OTHER PUBLICATIONS

Final Office Action on U.S. Appl. No. 15/924,709 dated May 24, 2021.

(Continued)

*Primary Examiner* — David Bochna
(74) *Attorney, Agent, or Firm* — Foley & Lardner LLP

(57) ABSTRACT

A drill pipe comprises a drill pipe body and a tool joint that comprises a rotary shoulder connection is disclosed. The rotary shoulder connection comprises: a box connection, wherein the box connection has a box outer radius, a box counter bore radius and a box inner radius, and box threads having a box thread form cut along a box taper; a pin connection, wherein the pin connection has a pin outer radius, a pin cylinder radius and a pin nose radius, and pin threads having a pin thread form cut along a pin taper to align with the box threads inside the box connection; and a primary shoulder connection comprising: a primary box shoulder that is angled or curved; and a primary pin shoulder that is angled or curved. Methods of using the drill pipe are also disclosed.

65 Claims, 43 Drawing Sheets

(56) References Cited

U.S. PATENT DOCUMENTS

| | | | |
|---|---|---|---|
| 4,549,754 A | 10/1985 | Saunders et al. | |
| 4,589,187 A | 5/1986 | Stone et al. | |
| 4,591,195 A | 5/1986 | Chelette et al. | |
| 4,629,221 A | 12/1986 | Lumsden et al. | |
| 4,676,529 A * | 6/1987 | McDonald | F16L 15/009 285/334 |
| 4,728,129 A | 3/1988 | Morris | |
| 4,732,416 A | 3/1988 | Dearden et al. | |
| 6,045,165 A * | 4/2000 | Sugino | F16L 15/004 285/333 |
| 6,047,997 A | 4/2000 | Olivier | |
| 6,485,063 B1 | 11/2002 | Olivier | |
| 6,990,719 B2 * | 1/2006 | Olivier | E21B 17/042 29/428 |
| 7,210,710 B2 | 5/2007 | Williamson et al. | |
| 8,287,008 B2 | 10/2012 | Charvet-Quemin et al. | |
| 8,641,100 B2 | 2/2014 | Patureau et al. | |
| 2003/0067168 A1 | 4/2003 | Sches et al. | |
| 2003/0075924 A1 | 4/2003 | Olivier | |
| 2004/0108719 A1 | 6/2004 | Carcagno et al. | |
| 2004/0262919 A1 * | 12/2004 | Dutilleul | E21B 17/042 285/333 |
| 2005/0087985 A1 | 4/2005 | Mosing et al. | |
| 2006/0071474 A1 | 4/2006 | Hallett et al. | |
| 2010/0308577 A1 * | 12/2010 | Chin | E21B 17/042 285/333 |
| 2011/0012347 A1 | 1/2011 | Pacheco | |
| 2011/0068574 A1 | 3/2011 | Morgan et al. | |
| 2011/0068578 A1 | 3/2011 | Chervin et al. | |
| 2014/0054887 A1 | 2/2014 | Pallini et al. | |
| 2014/0183862 A1 | 7/2014 | Angelle et al. | |
| 2014/0209394 A1 | 7/2014 | Mahmood et al. | |
| 2014/0265320 A1 | 9/2014 | Pollack et al. | |
| 2015/0145247 A1 | 5/2015 | Zhu et al. | |
| 2015/0362100 A1 | 12/2015 | Li et al. | |
| 2017/0167641 A1 | 6/2017 | Daly et al. | |
| 2017/0292638 A1 | 10/2017 | Sugino et al. | |

OTHER PUBLICATIONS

Final Office Action on U.S. Appl. No. 15/926,431 dated May 25, 2021.

International Search Report on and Written Opinion for International Patent Application No. PCT/US2018/049069 dated Dec. 27, 2018 (28 pages).

Non-Final Office Action on U.S. Appl. No. 15/926,431 dated Nov. 24, 2020.

U.S. Office Action on U.S. Appl. No. 15/924,709 dated Nov. 25, 2020.

PCT Dec. 27, 2018 International Search Report and Written Opinion mailed for International Patent Application No. PCT/US2018/049061, filed Aug. 31, 2018.

PCT Dec. 27, 2018 International Search Report and Written Opinion mailed for International Patent Application No. PCT/US2018/049069, filed Aug. 31, 2018.

Foreign Search Report on PCT PCT/US2020/059183 dated Feb. 3, 2021, 8 pages.

Final Office Action on U.S. Appl. No. 15/924,709 dated Jul. 27, 2022.

Final Office Action on U.S. Appl. No. 16/791,929 dated Jul. 27, 2022.

Non-Final Office Action on U.S. Appl. No. 15/924,709 dated Dec. 3, 2021.

Non-Final Office Action on U.S. Appl. No. 16/791,929 dated Dec. 6, 2021.

Non-Final Office Action on U.S. Appl. No. 16/926,219 dated Oct. 20, 2022.

Website Drill Pipe Specifications: http://www.drill-pipes.com/drill-pipe-specifications.php (Year: 2009).

* cited by examiner

2500

Locating a pitch line parallel to a connection taper 2502

↓

Locating a first intersection of a pitch diameter and the pitch line 2503

↓

Locate a first perpendicular to the connection axis at the first intersection 2506

↓

Locating a second perpendicular to the connection axis at a first distance towards a primary shoulder from the first perpendicular 2508

↓

Locating a first reference plane, and, optionally, locating a second intersection of the pitch line and the second perpendicular 2510

↓

Selecting a primary axial box/pin radius height, selecting a primary box/pin radius, and locating a primary box/pin center point between a box counter bore diameter and a pin bevel diameter 2512

↓

Defining a primary box/pin curved profile with respect to primary axial box/pin radius height, the primary box/pin center point and the primary box/pin radius, and, optionally, defining a primary box/pin angle with respect to the second perpendicular at the second intersection 2514

FIG. 25

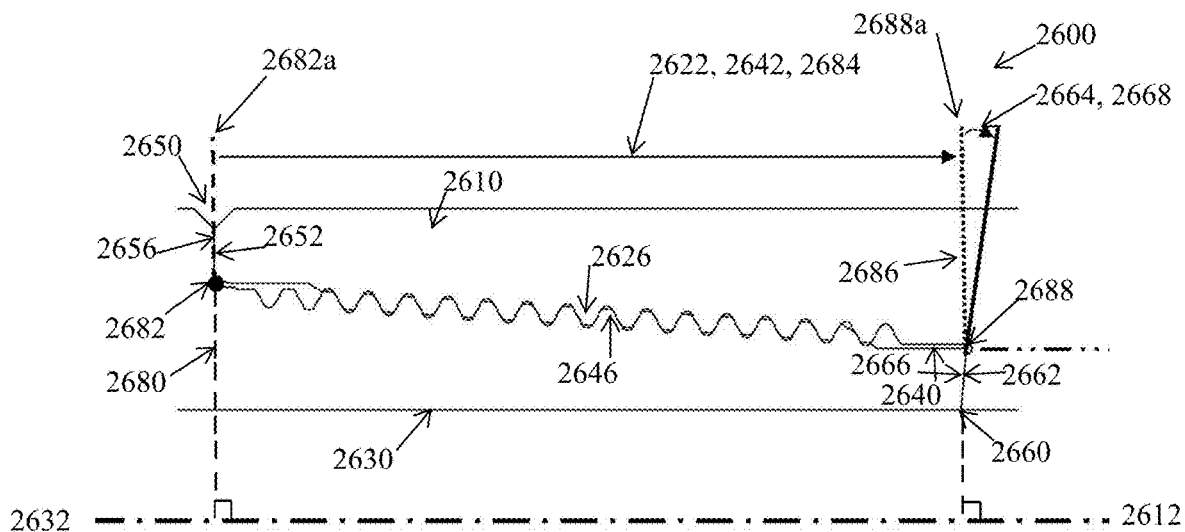

FIG. 26C

```
                                    2800
┌─────────────────────────────────────────────────────┐
│  Providing a rotary shoulder connection  2802       │
└─────────────────────────────────────────────────────┘
                          ↓
┌─────────────────────────────────────────────────────┐
│ Applying the rotary shoulder connection to one or more products  2804 │
└─────────────────────────────────────────────────────┘
                          ↓
┌─────────────────────────────────────────────────────┐
│ Tightening the rotary shoulder connection between the one or more products to │
│  form the first seal between the one or more products  2806 │
└─────────────────────────────────────────────────────┘
                          ↓
┌─────────────────────────────────────────────────────┐
│ Optionally, tightening the rotary shoulder connection between the one or more │
│  products to form the torque shoulder between the one or more products  2808 │
└─────────────────────────────────────────────────────┘
```

FIG 28

DRILL PIPE

PRIOR RELATED APPLICATIONS

This application is a continuation-in-part of U.S. Nonprovisional patent application Ser. No. 15/924,709, filed on Mar. 19, 2018, which claims the benefit of U.S. Provisional Patent Application Ser. No. 62/554,347 entitled "IMPROVED ROTARY SHOULDER CONNECTIONS FOR THREADED PIPE CONNECTIONS," filed on Sep. 5, 2017.

This application is also a continuation-in-part of U.S. Nonprovisional patent application Ser. No. 15/926,431, filed on Mar. 20, 2018, which claims the benefit of U.S. Provisional Patent Application Ser. No. 62/554,707 entitled "IMPROVED ROTARY SHOULDER CONNECTIONS FOR THREADED PIPE CONNECTIONS," filed on Sep. 6, 2017.

FEDERALLY SPONSORED RESEARCH STATEMENT

Not Applicable (N/A)

REFERENCE TO MICROFICHE APPENDIX

N/A

FIELD OF INVENTION

The present invention relates generally to a drill pipe with a rotary shoulder connection and methods thereof and, more particularly, to an improved drill pipe with a rotary shoulder connection with primary and secondary angled and/or curved shoulder features for threaded pipe connections in various drill strings and methods thereof.

BACKGROUND OF THE INVENTION

Conventional American Petroleum Institute (API) 5-inch drill pipe suffers from poor hydraulic efficiencies and mechanical performance. The API 5-inch drill pipe has a tendency to buckle due to poor stiffness.

Standard (typical) double-shoulder connections and standard (typical) single-shoulder connections suffer from the problem of box "swell" (e.g., box material yields) due to tapered threads, included thread profile angle and high generated axial compressive loads. The box swell forces force the primary shoulder of the box connection outward, causing deformation of and/or permanent damage to the box connection.

Standard (typical) double-shoulder connections and standard (typical) single-shoulder connections also suffer from the problem of pin collapse. The pin collapse forces push a portion of the pin nose inward, causing deformation of and/or permanent damage to the pin connection.

This combination of box swell (e.g., box material yields) and pin collapse can lead to misalignment of the box threads and the pin threads, as well as permanent damage to the box connection and/or the pin connection. Over time, the box threads become misaligned with the pin threads, causing damage to the box threads and/or the pin threads.

Further, this combination of box swell (e.g., box material yields) and pin collapse, in conjunction with high alternating axial, torsional, and bending loads, can lead to premature fatigue failure of the standard (typical) double-shoulder connection and standard (typical) single-shoulder connection, damage to the box threads and/or the pin threads, and permanent deformation of the box connection and/or the pin connection to reduce the effects of box swell (e.g., box material yields) and pin collapse.

Thus, an improved drill pipe with an improved double-shoulder connection and an improved single-shoulder connection are needed to eliminate these problems.

SUMMARY OF THE INVENTION

In an embodiment, a drill pipe comprises a drill pipe body having a drill pipe body outer diameter and a drill pipe body inner diameter.

In an embodiment, the drill pipe comprises a drill pipe length.

In an embodiment, the drill pipe length is from about 25-feet to about 50-feet. In an embodiment, the drill pipe length is about 31.5-feet. In an embodiment, the drill pipe length is about 45-feet to about 47-feet.

In an embodiment, the drill pipe is made from one or more of low alloy steels, stainless steels, super alloys, titanium alloys, copper alloys, cobalt alloys, aluminum alloys, and variations thereof. In an embodiment, the drill pipe is made from one or more of low alloy steels, stainless steels, and variations thereof.

In an embodiment, the drill pipe body outer diameter is from about 5.1-inches to about 5.4-inches. In an embodiment, the drill pipe body outer diameter is about 5.25-inches.

In an embodiment, the drill pipe body inner diameter is from about 4.4-inches to about 4.6-inches. In an embodiment, the drill pipe body inner diameter is about 4.528-inches.

In an embodiment, the drill pipe body comprises a drill pipe body wall thickness.

In an embodiment, the drill pipe body wall thickness is from about 0.352-inches to about 0.370-inches. In an embodiment, the drill pipe body wall thickness is about 0.361-inch.

In an embodiment, the tool joint comprises a tool joint box having a tool joint box outer diameter and a tool joint box inner diameter, and a tool joint pin having a tool joint pin outer diameter and a tool joint pin inner diameter.

In an embodiment, the tool joint box outer diameter is from about 6.1-inches to about 6.4-inches and the tool joint box inner diameter is from about 3.4-inches to about 3.6-inches. In an embodiment, the tool joint box outer diameter is about 6.25-inches and the tool joint box inner diameter is about 3.5-inches.

In an embodiment, the tool joint pin outer diameter is from about 6.1-inches to about 6.4-inches and the tool joint pin inner diameter is from about 3.4-inches to about 3.6-inches. In an embodiment, the tool joint pin outer diameter is about 6.25-inches and the tool joint pin inner diameter is about 3.5-inches.

In an embodiment, the tool joint comprises a box hardband havinf a box hardband outer diameter, and a pin hardband having a pin hardband outer diameter.

In an embodiment, the box hardband outer diameter is from about 6.3-inches to about 6.6-inches. In an embodiment, the box hardband outer diameter is about 6.438-inches.

In an embodiment, the pin hardband outer diameter is from about 6.3-inches to about 6.6-inches. In an embodiment, the pin hardband outer diameter is about 6.438-inches.

In an embodiment, the tool joint box comprises a tapered elevator shoulder having a tapered elevator shoulder angle.

In an embodiment, the tapered elevator shoulder angle is from about 16 degrees to about 20 degrees. In an embodiment, the tapered elevator shoulder is about 18 degrees.

In an embodiment, the tool joint pin comprises a tapered pin shoulder having a tapered pin shoulder angle.

In an embodiment, the tapered pin shoulder angle is from about 16 degree to about 36-degrees. In an embodiment, the tapered pin shoulder angle is from about 16-degrees to about 20 degrees. In an embodiment, the tapered pin shoulder is about 18 degrees.

In an embodiment, the tool joint box comprises a drill pipe box weld neck in a region of a drill pipe box body upset having a drill pipe box body upset inner diameter.

In an embodiment, the drill pipe box body upset inner diameter is from about 3.66-inches to about 3.85-inches. In an embodiment, the drill pipe box body inner diameter is about 3.752-inches.

In an embodiment, the tool joint pin comprises a drill pipe pin weld neck in a region of a drill pipe pin body upset having a drill pipe pin body upset inner diameter.

In an embodiment, the drill pipe pin body upset inner diameter is from about 3.66-inches to about 3.85-inches. In an embodiment, the drill pipe pin body upset inner diameter is about 3.752-inches.

In an embodiment, the tool joint box comprises a tool joint box length.

In an embodiment, the tool joint box length is from about 15-inches to about 19-inches. In an embodiment, the tool joint box length is about 17-inches.

In an embodiment, the tool joint pin comprises tool joint pin length.

In an embodiment, the tool joint pin length is from about 12.5-inches to about 15.5-inches. In an embodiment, the tool joint pin length is about 14-inches.

In an embodiment, a method of using a drill pipe comprises providing a plurality of drill pipe as discussed herein and connecting the plurality of the drill pipe to produce a drill string.

In an embodiment, a tool joint comprises a rotary shoulder box connection, as discussed herein.

In an embodiment, the rotary shoulder connection comprises a rotary shoulder connection length.

In an embodiment, the rotary shoulder connection length is from about 4.275-inches to about 5.225-inches. In an embodiment, the rotary shoulder connection length is about 4.75-inches.

In an embodiment, a rotary shoulder connection comprises an angled primary shoulder and/or an angled secondary shoulder.

In an embodiment, the rotary shoulder connection comprises: a box connection having a box axis, a pin connection having a pin axis and a primary shoulder connection at a first end of the box connection and a first end of the pin connection.

In an embodiment, the box connection has a box outer radius, a box counter bore radius and a box inner radius, and box threads having a box thread form cut along a box taper.

In an embodiment, the pin connection has a pin outer radius, a pin cylinder radius and a pin nose radius, and pin threads having a pin thread form cut along a pin taper to align with the box threads inside the box connection.

In an embodiment, the primary shoulder connection comprises: a primary box shoulder at a primary box angle with respect to a first perpendicular to the box axis at a first end point of the box connection; and a primary pin shoulder at a primary pin angle with respect to the first perpendicular to the pin axis at the first end point of the pin connection. In an embodiment, the first end point is equal to a datum intersection.

In an embodiment, the primary box angle is about 0 degrees and the primary pin angle is about 0 degrees.

In an embodiment, the primary box angle is from greater than or equal to about 0 degrees to less than or equal to about 15 degrees. In an embodiment, the primary box angle is from greater than or equal to about 0 degrees to less than or equal to about 10 degrees. In an embodiment, the primary box angle is about 5 degrees. In an embodiment, the primary box angle is about 0 degrees.

In an embodiment, the primary pin angle is from greater than or equal to about 0 degrees to less than or equal to about 15 degrees. In an embodiment, the primary pin angle is from greater than or equal to about 0 degrees to less than or equal to about 10 degrees. In an embodiment, the primary pin angle is about 5 degrees. In an embodiment, the primary pin angle is about 0 degrees.

In an embodiment, the primary box angle is about equal to the primary pin angle to form a first seal.

In an embodiment, the primary box angle is slightly different than the primary pin angle to form a first seal. In an embodiment, the first seal is a gas-tight seal.

In an embodiment, the primary box shoulder contacts the primary pin shoulder to form a first seal. In an embodiment, the primary box shoulder is conical shaped (outside of cone, male) and the primary pin shoulder is conical shaped (inside of cone, female).

In an embodiment, the box thread form comprises a first box thread crest, a second box thread crest, a first box thread flank, a second box thread flank, a box included angle between the first box thread flank and the second box thread flank, and a box thread root. In an embodiment, the box thread form is selected from the group consisting of square, triangular, trapezoidal, and variations thereof. In an embodiment, the first box thread crest and/or the second box thread crest is circular, square, triangular or trapezoidal shaped. In an embodiment, the first box thread flank and/or the second box thread flank are concave, convex, or straight shaped. In an embodiment, the box thread root is circular, square, triangular or trapezoidal shaped. In an embodiment, the box included angle is from about 29 degrees to about 90 degrees. In an embodiment, the box thread form is triangular and the box included angle is about 60 degrees.

In an embodiment, the pin thread form comprises a first pin thread crest, a second pin thread crest, a first pin thread flank, a second pin thread flank, a pin included angle between the first pin thread flank and the second pin thread flank, and a pin thread root. In an embodiment, the pin thread form is selected from the group consisting of square, triangular, trapezoidal, and variations thereof. In an embodiment, the first pin thread crest and/or the second pin thread crest is circular, square, triangular or trapezoidal shaped. In an embodiment, the first pin thread flank and/or the second pin thread flank are concave, convex, or straight shaped. In an embodiment, the pin thread root is circular, square, triangular or trapezoidal shaped. In an embodiment, the pin included angle is from about 29 degrees to about 90 degrees. In an embodiment, the pin thread form is triangular shaped and the pin included angle is about 60 degrees.

In an embodiment, the box threads and/or the pin threads are treated by one or more of cold rolling, shot peening, phosphating, fluoropolymer coating, ceramic coating, chrome plating, anodizing, and variations thereof. In an embodiment, the box threads and/or the pin threads are treated by one or more of cold rolling, shot peening, fluoropolymer coating, and anodizing.

In an embodiment, the rotary shoulder connection further comprises one or more of a box boreback, a box stress relief groove and a pin stress relief groove.

In an embodiment, the rotary shoulder connection is made from one or more of low alloy steels, stainless steels, super alloys, titanium alloys, copper alloys, cobalt alloys, aluminum alloys, and variations thereof. In an embodiment, the rotary shoulder connection is made from one or more of low alloy steels, stainless steels, and variations thereof.

In an embodiment, the rotary shoulder connection is applied to one or more of drill pipe, heavy weight drill pipe, drill collars, pup joints, crossover subs, saver subs, bit subs, float subs, pump-in subs, inside blowout preventers, top drive shafts, top drive valves, safety valves, kelly valves, hoisting equipment, swivels, fishing tools, mud motors, rotary steerable tools, drill bits, directional drilling bottom hole assembly components, measurement while drilling components, logging while drilling components, well cleanout tools, completion tools, and variations thereof. In an embodiment, the rotary shoulder connection is applied to one or more of drill pipe, heavy weight drill pipe, drill collars, pup joints, and variations thereof.

In an embodiment, the rotary shoulder connection further comprises: a secondary shoulder connection at a second end of the box connection and a second end of the pin connection. In an embodiment, the secondary shoulder connection comprises: a secondary box shoulder at a secondary box angle with respect to a second perpendicular to the box axis at the second end point of the box connection; and a secondary pin shoulder at a secondary pin angle with respect to the second perpendicular to the pin axis at the second end point of the pin connection.

In an embodiment, the second end is offset a second distance from the first end. In an embodiment, the second distance is from about 2 inches to about 8 inches. In an embodiment, the second distance is a connection length.

In an embodiment, the secondary box angle is about 0 degrees and the secondary pin angle is about 0 degrees.

In an embodiment, the secondary box angle is from greater than or equal to about 0 degrees to less than or equal to about 15 degrees. In an embodiment, the secondary box angle is from greater than or equal to about 0 degrees to less than or equal to about 10 degrees. In an embodiment, the secondary box angle is about 5 degrees. In an embodiment, the secondary box angle is about 0 degrees.

In an embodiment, the secondary pin angle is from greater than or equal to about 0 degrees to less than or equal to about 15 degrees. In an embodiment, the secondary pin angle is from greater than or equal to about 0 degrees to less than or equal to about 10 degrees. In an embodiment, the secondary pin angle is about 5 degrees. In an embodiment, the secondary pin angle is about 0 degrees.

In an embodiment, the secondary box angle is about equal to the secondary pin angle to form a torque shoulder.

In an embodiment, the secondary box angle is slightly different than the secondary pin angle to form a torque shoulder that is a second seal. In an embodiment, the torque shoulder or the second seal is a gas-tight seal.

In an embodiment, the secondary box shoulder contacts the secondary pin shoulder to form a torque shoulder. In an embodiment, the secondary box shoulder is conical shaped (outside of cone, male) and the secondary pin shoulder is conical shaped (inside of cone, female).

In the box thread form comprises a first box thread crest, a second box thread crest, a first box thread flank, a second box thread flank, a box included angle between the first box thread flank and the second box thread flank, and a box thread root. In an embodiment, the box thread form is selected from the group consisting of square, triangular, trapezoidal, and variations thereof. In an embodiment, the first box thread crest and/or the second box thread crest is circular, square, triangular or trapezoidal shaped. In an embodiment, the first box thread flank and/or the second box thread flank are concave, convex, or straight shaped. In an embodiment, the box thread root is circular, square, triangular or trapezoidal shaped. In an embodiment, the box included angle is from about 29 degrees to about 90 degrees. In an embodiment, the box thread form is triangular and the box included angle is about 60 degrees.

In an embodiment, the pin thread form comprises a first pin thread crest, a second pin thread crest, a first pin thread flank, a second pin thread flank, a pin included angle between the first pin thread flank and the second pin thread flank, and a pin thread root. In an embodiment, the pin thread form is selected from the group consisting of square, triangular, trapezoidal, and variations thereof. In an embodiment, the first pin thread crest and/or the second pin thread crest is circular, square, triangular or trapezoidal shaped. In an embodiment, the first pin thread flank and/or the second pin thread flank are concave, convex, or straight shaped. In an embodiment, the pin thread root is circular, square, triangular or trapezoidal shaped. In an embodiment, the pin included angle is from about 29 degrees to about 90 degrees. In an embodiment, the pin thread form is triangular shaped and the pin included angle is about 60 degrees.

In an embodiment, the box threads and/or the pin threads are treated by one or more of cold rolling, shot peening, phosphating, fluoropolymer coating, ceramic coating, chrome plating, anodizing, and variations thereof. In an embodiment, the box threads and/or the pin threads are treated by one or more of cold rolling, shot peening, fluoropolymer coating, and anodizing.

In an embodiment, the rotary shoulder connection further comprises one or more of a box boreback, a box stress relief groove and a pin stress relief groove.

In an embodiment, the rotary shoulder connection is made from one or more of low alloy steels, stainless steels, super alloys, titanium alloys, copper alloys, cobalt alloys, aluminum alloys, and variations thereof. In an embodiment, the rotary shoulder connection is made from one or more of low alloy steels, stainless steels, and variations thereof.

In an embodiment, the rotary shoulder connection is applied to one or more of drill pipe, heavy weight drill pipe, drill collars, pup joints, crossover subs, saver subs, bit subs, float subs, pump-in subs, inside blowout preventers, top drive shafts, top drive valves, safety valves, kelly valves, hoisting equipment, swivels, fishing tools, mud motors, rotary steerable tools, drill bits, directional drilling bottom hole assembly components, measurement while drilling components, logging while drilling components, well cleanout tools, completion tools, and variations thereof. In an embodiment, the rotary shoulder connection is applied to one or more of drill pipe, heavy weight drill pipe, drill collars, pup joints, and variations thereof.

In an embodiment, a method of using a rotary shoulder connection comprises: providing a rotary shoulder connection; and applying the rotary shoulder connection to one or more products. In an embodiment, the rotary shoulder connection may be the improved double-shoulder connection with an angled primary shoulder or the improved single-shoulder connection with an angled primary shoulder, as discussed above.

In an embodiment, the method further comprises tightening the rotary shoulder connection between one of more products to form the first seal.

In an embodiment, the method further comprises tightening the rotary shoulder connection between the one or more products to form the first seal and the torque shoulder.

In an embodiment, a method for determining a primary shoulder location comprises: locating a pitch line parallel to a connection box/pin taper; locating a first intersection of a pitch diameter and the pitch line; locating a first perpendicular to the connection box/pin axis at the first intersection; locating a second perpendicular to the connection box/pin axis at a first distance towards a primary box/pin shoulder from the first perpendicular; and locating a second intersection of the pitch line and the second perpendicular.

In an embodiment, the method for determining a primary shoulder location further comprises defining a primary box/pin angle with respect to the second perpendicular at the second intersection.

In an embodiment, the first distance is from about 0.5 inch to about 2.50 inches. In an embodiment, the first distance is from about 0.625 inch to about 2.250 inches. In an embodiment, the first distance is about 0.625 inch.

In an embodiment, a method for determining a secondary shoulder connection location comprises: locating a pitch line parallel to a connection box/pin taper; locating a first intersection of a pitch diameter and the pitch line; locating a first perpendicular to the connection box/pin axis at the first intersection; locating a second perpendicular to the connection box/pin axis at a first distance towards a primary box/pin shoulder from the first perpendicular; locating a second intersection of the pitch line and the second perpendicular; locating a third perpendicular to the connection box/pin axis at a second distance toward a secondary box/pin shoulder; and locating a third intersection of a pin nose outer diameter and the third perpendicular.

In an embodiment, the second distance may be about 2 inches to about 8 inches. In an embodiment, the second distance is a connection length.

In an embodiment, the method for determining a secondary shoulder location further comprises optionally, defining a primary box/pin angle with respect to the second perpendicular at the second intersection and defining a secondary box/pin angle with respect to the third perpendicular at the third intersection.

In an embodiment, the method for determining a secondary shoulder location comprises defining a secondary box/pin angle with respect to the third perpendicular at the third intersection.

In an embodiment, a rotary shoulder connection comprises a curved primary shoulder and/or a curved secondary shoulder.

In an embodiment, the rotary shoulder connection comprises: a box connection having a box axis, wherein the box connection has a box outer radius, a box counter bore radius and a box inner radius, and box threads having a box thread form cut along a box taper; a pin connection having a pin axis, wherein the pin connection has a pin nose inner radius, a pin outer radius, a pin cylinder radius and a pin nose radius, and pin threads having a pin thread form cut along a pin taper to align with the box threads inside the box connection; and a primary shoulder connection at a first end of the box connection and a first end of the pin connection.

In an embodiment, the primary shoulder connection comprises: a primary box shoulder with a first curved profile defined by a primary axial box radius height, a primary box center point and a primary box radius; and a primary pin shoulder with a second curved profile defined by a primary axial pin radius height, a primary box center point and a primary pin radius. In an embodiment, the primary box shoulder contacts the primary pin shoulder to form a first seal.

In an embodiment, the first end point is coplanar with a first reference plane.

In an embodiment, the primary axial box radius height is from about 0.000 inch to about the length of the primary box radius in inches; and the primary axial pin radius height is from about 0.000 inch to about the length of the primary pin radius in inches.

In an embodiment, the primary box center point is located at about half-way between a box counter bore diameter and a pin bevel diameter; and the primary pin center point is located at about half-way between the box counter bore diameter and the pin bevel diameter.

In an embodiment, the primary box radius is greater than about [(pin bevel diameter−box counter bore diameter)/4] inches; and the primary pin radius is greater than about [(box bevel diameter−box counter bore diameter)/4] inches. In an embodiment, the primary box radius is greater than about [(pin bevel diameter−box counter bore diameter)/4] inches.

In an embodiment, the primary axial box radius is about equal to the primary pin radius to form the first seal. In an embodiment, the primary box radius is slightly different than the primary pin radius to form the first seal.

In an embodiment, the primary box shoulder is convex shaped and the primary pin shoulder is concave shaped.

In an embodiment, the primary box shoulder has one or more of a first flat region at an inner edge of the first curved profile and a first angled flat region at an outer edge of the first curved profile; and the primary pin shoulder has one or more of a second flat region at an inner edge of the first curved profile and a third flat region at an outer edge of the first curved profile.

In an embodiment, the rotary shoulder connection further comprises: a secondary shoulder connection at a second end of the box connection and a second end of the pin connection. In an embodiment, the secondary shoulder connection comprises: a secondary box shoulder with a third curved profile defined by a secondary axial box radius height, a secondary box center point and a secondary box radius and a secondary pin shoulder with a fourth curved profile defined by a secondary axial pin radius height, a secondary pin center point and a secondary pin radius. In an embodiment, the secondary box shoulder contacts the secondary pin shoulder to form a torque shoulder.

In an embodiment, the second end is offset a first distance from the first end. In an embodiment, the first distance is from about 1 inch to about 8 inches. In an embodiment, the first distance is from about 2 inches to about 8 inches. In an embodiment, the first distance is a connection length.

In an embodiment, the secondary axial box radius height is from about 0.000 inch to about the length of the secondary box radius in inches; and the secondary axial pin radius height is from about 0.000 inch to about the length of the secondary pin radius in inches.

In an embodiment, the secondary box center point is located at about half-way between a pin nose outer diameter and a pin nose inner diameter; and the secondary pin center point is located at about half-way between the pin nose outer diameter and the pin nose inner diameter.

In an embodiment, the secondary box radius is greater than about [(pin nose outer diameter−pin nose inner diameter)/4] inches; and the secondary pin radius is greater than about [(pin nose outer diameter−pin nose inner diameter)/4]

inches. In an embodiment, the secondary box radius is about equal to the secondary pin radius to form the torque shoulder. In an embodiment, the secondary box radius is slightly different than the secondary pin radius to form the torque shoulder.

In an embodiment, the secondary box shoulder is concave shaped and the secondary pin shoulder is convex shaped.

In an embodiment, the secondary box shoulder has one or more of a fourth flat region at an inner edge of the second curved profile and a fifth flat region at an outer edge of the second curved profile; and the secondary pin shoulder has one or more of a sixth flat region at an inner edge of the second curved profile and a second angled region at an outer edge of the second curved profile.

In an embodiment, the rotary shoulder connection further comprises: a secondary shoulder connection at a second end of the box connection and a second end of the pin connection. In an embodiment, the secondary shoulder connection comprises: a secondary box shoulder at a secondary box angle with respect to a second perpendicular to the box axis at a second end point and a secondary pin shoulder at a secondary pin angle with respect to the second perpendicular to the pin axis at the second end point. In an embodiment, the secondary box shoulder contacts the secondary pin shoulder to form a torque shoulder.

In an embodiment, the second end is offset a first distance from the first end. In an embodiment, the first distance is from about 1 inch to about 8 inches. In an embodiment, the first distance is from about 2 inches to about 8 inches. In an embodiment, the first distance is a connection length.

In an embodiment, the secondary box angle is from greater than or equal to about 0 degrees to less than or equal to 15 degrees; and the secondary pin angle is from greater than or equal to about 0 degrees to less than or equal to 15 degrees. In an embodiment, the secondary box angle is from greater than or equal to about 0 degrees to less than or equal to 10 degrees; and the secondary pin angle is from greater than or equal to about 0 degrees to less than or equal to 10 degrees. In an embodiment, the secondary box angle is about 5 degrees; and the secondary pin angle is about 5 degrees. In an embodiment, the secondary box angle is about 0 degrees; and the secondary pin angle is about 0 degrees.

In an embodiment, the secondary box angle is about equal to the secondary pin angle to form the torque shoulder. In an embodiment, the secondary box angle is slightly different than the secondary pin angle to form the torque shoulder.

In an embodiment, the secondary box shoulder is conical shaped (outside of cone, male) and the secondary pin shoulder is conical shaped (inside of cone, female).

In an embodiment, the box thread form comprises a first box thread crest, a second box thread crest, a first box thread flank, a second box thread flank, a box included angle between the first box thread flank and the second box thread flank, and a box thread root, and wherein the pin thread form comprises a first pin thread crest, a second pin thread crest, a first pin thread flank, a second pin thread flank, a pin included angle between the first pin thread flank and the second pin thread flank, and a pin thread root.

In an embodiment, the box thread form is selected from the group consisting of square, triangular, trapezoidal, and variations thereof, and the pin thread form is selected from the group consisting of square, triangular, trapezoidal, and variations thereof.

In an embodiment, the first box thread crest and/or the second box thread crest is circular, square, triangular or trapezoidal shaped; and first pin thread crest and/or the second pin thread crest is circular, square, triangular or trapezoidal shaped.

In an embodiment, the first box thread flank and/or the second box thread flank are concave, convex, or straight shaped, and wherein the first pin thread flank and/or the second pin thread flank are concave, convex, or straight shaped.

In an embodiment, the box thread root is circular, square, triangular or trapezoidal shaped, and wherein the pin thread root is circular, square, triangular or trapezoidal shaped.

In an embodiment, the box included angle is from about 29 degrees to about 90 degrees, and the pin included angle is from about 29 degrees to about 90 degrees. In an embodiment, the box thread form is triangular and the box included angle is about 60 degrees, and the pin thread form is triangular shaped and the pin included angle is about 60 degrees.

In an embodiment, the box threads and/or the pin threads are treated by one or more of cold rolling, shot peening, phosphating, fluoropolymer coating, ceramic coating, chrome plating, anodizing, and variations thereof. In an embodiment, the box threads and/or the pin threads are treated by one or more of cold rolling, shot peening, fluoropolymer coating, and anodizing.

In an embodiment, the rotary shoulder connection further comprises one or more of a box boreback, a box stress relief groove and a pin stress relief groove.

In an embodiment, the rotary shoulder connection is made from one or more of low alloy steels, stainless steels, super alloys, titanium alloys, copper alloys, cobalt alloys, aluminum alloys, and variations thereof. In an embodiment, the rotary shoulder connection is made from one or more of low alloy steels, stainless steels, and variations thereof.

In an embodiment, the rotary shoulder connection is applied to one or more of drill pipe, heavy weight drill pipe, drill collars, pup joints, crossover subs, saver subs, bit subs, float subs, pump-in subs, inside blowout preventers, top drive shafts, top drive valves, safety valves, kelly valves, hoisting equipment, swivels, fishing tools, mud motors, rotary steerable tools, drill bits, directional drilling bottom hole assembly components, measurement while drilling components, logging while drilling components, well cleanout tools, completion tools, and variations thereof.

In an embodiment, the rotary shoulder connection is applied to one or more of drill pipe, heavy weight drill pipe, drill collars, pup joints, and variations thereof.

In an embodiment, a method of using a rotary shoulder connection comprises: providing the rotary shoulder connection; and applying the rotary shoulder connection to one or more products. In an embodiment, the rotary shoulder connection may be the improved double shoulder connection with a curved primary shoulder or the improved single-shoulder connection with a curved primary shoulder, as discussed above.

In an embodiment, the method further comprises tightening the rotary shoulder connection between one of more products to form the first seal.

In an embodiment, the method further comprises tightening the rotary shoulder connection between the one or more products to form the first seal and the torque shoulder.

In an embodiment, a method for determining a primary shoulder location comprises: locating a pitch line parallel to a connection box/pin taper; locating a first intersection of a pitch diameter and the pitch line; locating a first perpendicular to the connection box/pin axis at the first intersection; locating a second perpendicular to the connection box/pin axis at a first distance towards a primary box/pin shoulder from the first perpendicular; locating a first reference plane, and, optionally, locating a second intersection of the pitch line and the second perpendicular; and selecting a primary axial box/pin radius height, selecting a primary box/pin radius, and locating a primary box/pin center point between a box counter bore diameter and a pin bevel diameter.

In an embodiment, the method for determining a primary shoulder location further comprises step (g) defining a primary box/pin curved profile with respect to primary axial box/pin radius height, the primary box/pin center point and the primary box/pin radius, and, optionally, defining a primary box/pin angle with respect to the second perpendicular at the second intersection.

In an embodiment, the method for determining a primary shoulder location further comprises step (f) defining a primary box/pin angle with respect to the second perpendicular at the second intersection.

In an embodiment, the first distance is from about 0.5 inch to about 2.50 inches. In an embodiment, the first distance is from about 0.625 inch to about 2.250 inches. In an embodiment, the first distance is about 0.625 inch.

In an embodiment, a method for determining a secondary shoulder connection location comprises: locating a pitch line parallel to a connection box/pin taper; locating a first intersection of a pitch diameter and the pitch line; locating a first perpendicular to the connection box/pin axis at the first intersection; locating a second perpendicular to the connection box/pin axis at a first distance towards a primary box/pin shoulder from the first perpendicular; locating a first reference plane, and, optionally, locating a second intersection of the pitch line and the second perpendicular; locating a third perpendicular to the connection box/pin axis at a second distance toward a secondary box/pin shoulder; locating a second reference plane, and, optionally, locating a third intersection of a pin nose outer diameter and the third perpendicular; and selecting a secondary axial box/pin radius height, selecting a secondary box/pin radius, and locating a secondary box/pin center point between a pin nose outer diameter and a pin nose inner diameter.

In an embodiment, a method for determining a secondary shoulder connection location further comprises defining a secondary box/pin curved profile with respect to secondary axial box/pin radius height, the secondary box/pin center point and the secondary box/pin radius, and, optionally, defining a secondary box/pin angle with respect to the third perpendicular at the third intersection.

In an embodiment, a method for determining a secondary shoulder connection location further comprises optionally, defining a primary box/pin angle with respect to the second perpendicular at the second intersection.

In an embodiment, a method for determining a secondary shoulder connection location further comprises optionally, defining a secondary box/pin angle with respect to the third perpendicular at the third intersection.

In an embodiment, the second distance is from about 1 inch to about 8 inches. In an embodiment, the second distance is from about 2 inches to about 8 inches. In an embodiment, the second distance is a connection length.

These and other objects, features and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

For a further understanding of the nature and objects of the present invention, reference should be made to the following detailed disclosure, taken in conjunction with the accompanying drawings, in which like parts are given like reference numerals, and wherein:

FIG. 24B-2 illustrates an enlarged detailed view of the double- or single-shoulder connection in FIG. 24B-1, showing the curved primary connection shoulder according to an embodiment of the present invention;

FIG. 25 illustrates a flow chart of a method for determining a primary connection shoulder location according to an embodiment of the present invention;

FIG. 26B-1 illustrates a detailed view of the double-shoulder connection in FIG. 26A, showing the curved secondary connection shoulder according to an embodiment of the present invention;

FIG. 26B-2 illustrates an enlarged detailed view of the double-shoulder connection in FIG. 26B-1, showing the curved secondary connection shoulder according to an embodiment of the present invention;

FIG. 26C illustrates a cross-sectional view of an improved double-shoulder connection with a standard primary connection shoulder and an angled secondary connection shoulder according to an embodiment of the present inventions;

FIG. 28 illustrates a flowchart of a method of using an improved double-shoulder connection with a curved primary connection shoulder or an improved single-shoulder connection with a curved primary connection shoulder according to an embodiment of the present invention;

DETAILED DESCRIPTION OF EMBODIMENTS OF THE INVENTION

Figure 1A:
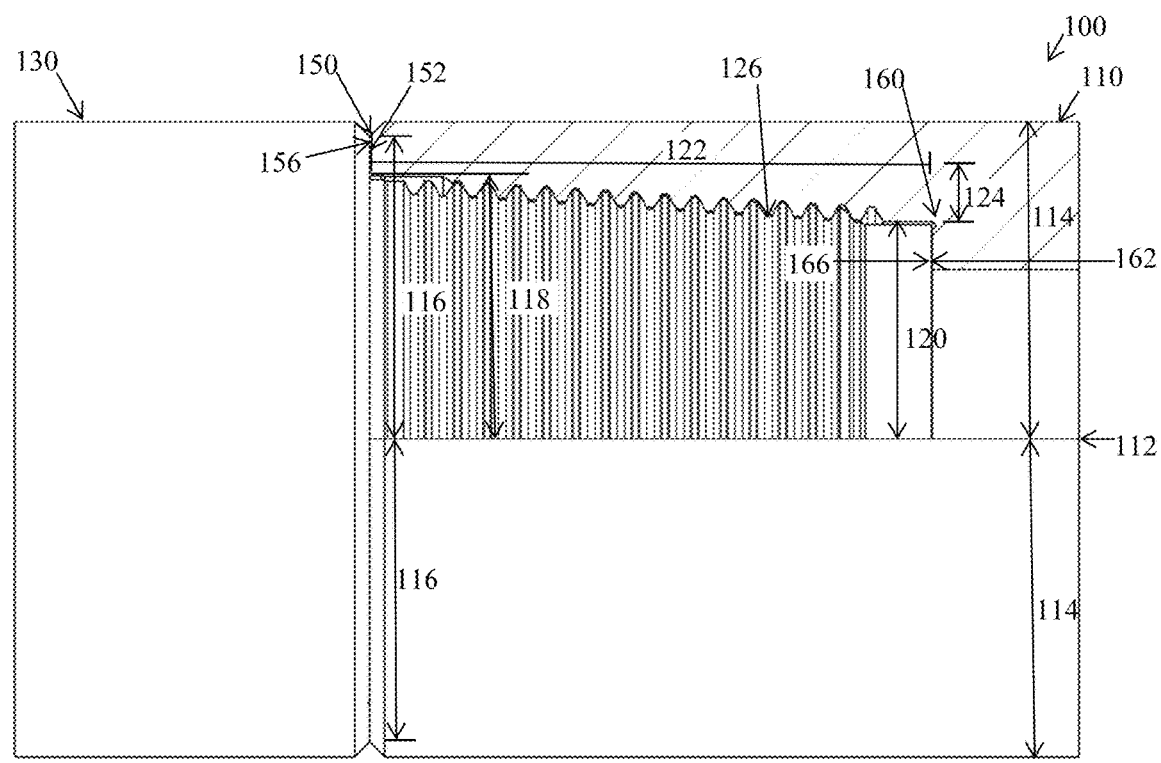
FIG. 1A illustrates a partial cross-sectional view of a double-shoulder connection with a pin and box made-up (screwed together), showing box connection features.

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled Standard (Typical) Drill Pipe Standard (typical) drill pipe is typically based on American Petroleum Institute (API) design methodology and specifications. Such drill pipe is commercially available in API 2⅜-inches, API 2⅞-inches, API 3½-inches, API 4-inches, API 4½-inches, API 5-inches, API 5½-inches and API 6⅝-inches sizes. Typical API casing sizes, of mixed walls and weights, range from 4½-inches to 13⅝-inches.

For drilling a given hole or bit size, a proper design of a drill string and/or drill pipe is critical for achieving hole cleaning objectives, desired hole geometry and trajectory in a specific application. For example, an annulus (i.e., area between the drill string and the hole) can create problems if too large or small. If the annulus is too large, an inadequate hole cleaning may occur. If the annulus is too small, high friction pressures and turbulent erosion can occur.

Drill Pipe Design Considerations

A proper design of the drill string or drill pipe (i.e., grade, size and weight) is based on a number of factors including, but not limited to, component availability, component cost, component size, material requirements, and strength requirements, as discussed below.

Strength Requirements

The drill string and/or drill pipe must be strong enough to handle the service loads during all phases of the drilling program, including:
1. Torsion and tension loads when rotating the drill pipe (rotary torque) and when pulling the drill pipe out of the hole (POOH); and/or
2. Compressive and bending loads when the drill pipe is in a dogleg and when advancing the drill bit in horizontal sections of the hole.

There are also pressure requirements, internal and external, from the flow of fluid inside the drill pipe and from drill stem testing. In most, if not all, cases, the drill pipe may be subjected to a combination of all of these loads.

With respect to design of the drill string and/or drill pipe, the strength of each member must be evaluated in terms of the forces and loads it will encounter under static, dynamic and fatigue conditions. The API design methodology for drill pipe assumes the outside diameter of the box tool joint and inside diameter of the pin tool joint configure in such a manner that the connection-to-tube torsional strength ratio calculates to 0.8 or greater.

This API guideline leaves much to be desired because this ratio decreases as wall thickness increases or as tube grade (material yield strength) increases. Further, changes in the OD and ID of the tool joints can result in lower drill pipe torsion-strength ratios, potentially rendering the drill pipe unsuitable for a specific application.

For many high-strength G-105 grade and S-135 grade drill pipe assemblies, the tool joint ID must be quite small to increase the torsional strength of the connection such that substantial restrictions for hydraulic and drill stem logging and directional tools are created. The standard API 5-inch S-135 grade drill pipe with NC50 connections is torque limited with a tool joint-to-new pipe torsional strength ratio of 0.75 on 19.50 ppf (i.e., 0.362-inch wall thickness) S-135 grade drill pipe.

In contrast, the presented invention (e.g., 5¼-inches drill pipe assembly) optionally features a 130 ksi SMYS (6¼-inches OD×3½-inches ID) EVRDRL49G, double-shoulder connection (i.e., tool joint) with an improved tool joint-to-pipe body torsional ratio compared to a standard API single-shoulder connection drill pipe. For a 5¼-inches, 20.70 ppf (i.e., 0.361-inch wall thickness), S-135 grade drill pipe, the tool joint-to-pipe torsional ratio is 85%.

Table 1 permits comparison of the present invention (e.g., 5¼-inches drill pipe assembly) to the standard API 5-inches and API 5½-inches drill pipe assemblies of the same wall thickness (i.e., 0.362-inch).

TABLE 1

| Designations | | | | | Drill Pipe OD (in.) | Drill Pipe Wall (in.) −12.5% | Drill pipe Weld Neck (in.) Max | Tool Joint OD (in.) ±0.031 | Tool Joint Pin ID (in.) +0.016 +0.031 | Tool Joint Pin OD (in.) ±0.250 | Tool Joint Box OD (in) ±0.250 | RSC Bevel Dia. (in.) ±0.016 | Approx. Mass (lb/ft.) Calc. |
|---|---|---|---|---|---|---|---|---|---|---|---|---|---|
| Label 1 | Label 2 | Grade | Upset Type | RSC Type | | | | | | | | | |
| 1 | 2 | 3 | 4 | 5 | 6 | 7 | 8 | 9 | 10 | 11 | 12 | 13 | 14 |
| 5 | 19.50 | E | IEU | NC50 | 5.000 | 0.362 | 5.125 | 6.625 | 3.750 | 7.000 | 10.000 | 6.063 | 21.37 |
| 5 | 19.50 | X | IEU | NC50 | 5.000 | 0.362 | 5.125 | 6.625 | 3.500 | 7.000 | 10.000 | 6.063 | 21.89 |
| 5 | 19.50 | G | IEU | NC50 | 5.000 | 0.362 | 5.125 | 6.625 | 3.250 | 7.000 | 10.000 | 6.063 | 22.14 |
| 5 | 19.50 | S | IEU | NC50 | 5.000 | 0.362 | 5.125 | 6.625 | 2.750 | 7.000 | 10.000 | 6.063 | 22.58 |
| 5 | 19.50 | E | IEU | 5½ FH | 5.000 | 0.362 | 5.125 | 7.000 | 3.750 | 8.000 | 10.000 | 6.719 | 22.32 |
| 5 | 19.50 | X, G | IEU | 5½ FH | 5.000 | 0.362 | 5.125 | 7.000 | 3.750 | 8.000 | 10.000 | 6.719 | 22.58 |
| 5 | 19.50 | S | IEU | 5½ FH | 5.000 | 0.362 | 5.125 | 7.250 | 3.500 | 8.000 | 10.000 | 6.719 | 23.44 |
| 5 | 25.60 | E | IEU | NC50 | 5.000 | 0.500 | 5.125 | 6.625 | 3.500 | 7.000 | 10.000 | 6.063 | 27.37 |
| 5 | 25.60 | X | IEU | NC50 | 5.000 | 0.500 | 5.125 | 6.625 | 3.000 | 7.000 | 10.000 | 6.063 | 28.09 |
| 5 | 25.60 | G | IEU | NC50 | 5.000 | 0.500 | 5.125 | 6.625 | 2.750 | 7.000 | 10.000 | 6.063 | 28.30 |
| 5 | 25.60 | E | IEU | 5½ FH | 5.000 | 0.500 | 5.125 | 7.000 | 3.500 | 8.000 | 10.000 | 6.719 | 28.32 |
| 5 | 25.60 | X | IEU | 5½ FH | 5.000 | 0.500 | 5.125 | 7.000 | 3.500 | 8.000 | 10.000 | 6.719 | 28.56 |

TABLE 1-continued

| Designations | | | | | Drill Pipe OD (in.) +0.016 −12.5% | Drill Pipe Wall (in.) −12.5% | Drill pipe Weld Neck (in.) Max | Tool Joint OD (in.) ±0.031 | Tool Joint Pin ID (in.) +0.016 +0.031 | Tool Joint Pin OD (in.) ±0.250 | Tool Joint Box OD (in) ±0.250 | RSC Bevel Dia. (in.) ±0.016 | Approx. Mass (lb/ft.) Calc. |
|---|---|---|---|---|---|---|---|---|---|---|---|---|---|
| Label 1 | Label 2 | Grade | Upset Type | RSC Type | | | | | | | | | |
| 1 | 2 | 3 | 4 | 5 | 6 | 7 | 8 | 9 | 10 | 11 | 12 | 13 | 14 |
| 5 | 25.60 | G | IEU | 5½ FH | 5.000 | 0.500 | 5.125 | 7.250 | 3.500 | 8.000 | 10.000 | 6.719 | 29.13 |
| 5 | 25.60 | S | IEU | 5½ FH | 5.000 | 0.500 | 5.125 | 7.250 | 3.250 | 8.000 | 10.000 | 6.719 | 29.40 |
| 5½ | 21.90 | E | IEU | 5½ FH | 5.500 | 0.361 | 5.688 | 7.000 | 4.000 | 8.000 | 10.000 | 6.719 | 23.81 |
| 5½ | 21.90 | X | IEU | 5½ FH | 5.500 | 0.361 | 5.688 | 7.000 | 3.750 | 8.000 | 10.000 | 6.719 | 24.43 |
| 5½ | 21.90 | G | IEU | 5½ FH | 5.500 | 0.361 | 5.688 | 7.250 | 3.500 | 8.000 | 10.000 | 6.719 | 25.28 |
| 5½ | 21.90 | S | IEU | 5½ FH | 5.500 | 0.361 | 5.688 | 7.500 | 3.000 | 8.000 | 10.000 | 7.094 | 26.39 |

Component Size

In the design of the drill string and/or drill pipe, component size of the drill pipe body and the tool joint must be considered in relation to the hole diameter. For a given drill pipe and hole diameter, there are several hydraulic consequences of this relationship. Of these, the annular velocity (AV) and equivalent circulation density (ECD) are the most significant. As drill pipe size increases in relation to the hole, the pump flow needed to attain the AV required for drill bit cuttings transport decreases. However, the ECD increases because it takes more pressure to pump the mud past the drill pipe and to the surface.

To properly design the drill string and/or drill pipe, the AV and ECD must be balanced for the specific application. A higher AV may be achieved with the larger drill pipe size, but a lower ECD becomes a major consideration for long and building angle, or deviated, holes.

Improved Hydraulic Efficiency

The present invention (e.g., 5¼-inches drill pipe with EVRDRL49G double-shoulder connections) has an improved hydraulic efficiency over the standard API 5-inches pipe due to a larger tube and tool joint bore diameters. Further, the present invention (e.g., 5¼-inches drill pipe with EVRDRL49G double-shoulder connections) provides a lower ECD than the standard API 5½-inches drill pipe due to a smaller pipe OD.

Tables 2-4 provide an equivalent pipe inside diameter, the ECD and a calculated pressure loss per 1000 feet for the standard API 5-inches drill pipe, the present invention (e.g., 5¼-inches drill pipe) and standard API 5½-inches drill pipe, based on maximum achievable BHA flow rates for the 12¼-inches (900 gpm), 8½-inches (600 gpm—limited by motor) and 7⅞-inches hole sizes (600 gpm—limited by motor).

TABLE 2

| | Equivalent Diameter (in.) | | |
|---|---|---|---|
| | Flow Rate (600 gpm) | Flow Rate (9900 gpm) | Capacity of Drill Pipe (gal/ft) |
| 5-inch, 19.50# (0.362-inch wall) Drill Pipe with 6.625-inch × 3.25-inch Tool Joints | 3.75 | 3.64 | 0.716 |
| 5¼-inch, 20.70# (0.361-inch wall) Drill Pipe with 6.25-inch × 3.5-inch Tool Joints | 4.04 | 3.95 | 0.784 |

TABLE 2-continued

| | Equivalent Diameter (in.) | | |
|---|---|---|---|
| | Flow Rate (600 gpm) | Flow Rate (9900 gpm) | Capacity of Drill Pipe (gal/ft) |
| 5½-inch, 21.90# (0.361-inch wall) Drill Pipe with 7.25-inch × 3.5-inch Tool Joints | 4.15 | 4.01 | 0.890 |

TABLE 3

| | Equivalent Circulation Density (lb/gal) | | |
|---|---|---|---|
| | Flow Rate (600 gpm) | Flow Rate (600 gpm) | Flow Rate (900 gpm) |
| 5-inch, 19.50# (0.362-inch wall) Drill Pipe with 6.625-inch × 3.25-inch Tool Joints | 14.41 | 14 | 17.50 |
| 5¼-inch, 20.70# (0.361-inch wall) Drill Pipe with 6.25-inch × 3.5-inch Tool Joints | 13.92 | 13.78 | 15.98 |
| 5½-inch, 21.90# (0.361-inch wall) Drill Pipe with 7.25-inch × 3.5-inch Tool Joints | 16.45 | 14.09 | 25.60 |

TABLE 4

| | Pressure Loss per 1000 feet of Drill Pipe | | |
|---|---|---|---|
| 12 lb/gal mud | Hole Size (7⅞-inch) Flow Rate (600 gpm) | Hole Size (8½-inch) Flow Rate (600 gpm) | Hole Size (12¼-inch) Flow Rate (900 gpm) |
| 5-inch, 19.50# (0.362-inch wall) Drill Pipe | 266 | 242 | 483 |
| 5¼-inch, 20.70# (0.361-inch wall) Drill Pipe | 207 | 185 | 343 |
| 5½-inch, 21.90# (0.361-inch wall) Drill Pipe | 252 | 171 | 300 |
| | Annular Velocity (600 gpm) | Annular Velocity (600 gpm) | Annular Velocity (900 gpm) |

For a 12¼-inches hole, the present invention (e.g., 5¼-inches drill pipe) provides a 9.5% increase in capacity over the standard API 5-inches drill pipe, decreasing a combined (bore and annulus) pressure losses by 29% per 1000 feet of drill pipe in the 12¼-inches hole when considering 12 lb/gal. mud and a 900 gpm flow rate.

Similarly, for a 7⅞-inches hole, the annulus pressure loss for the present invention (e.g., 5¼-inches drill pipe) was 13.6% lower than the standard API 5-inches pipe, decreasing the bore pressure loss by a 35.8% per 1000 feet of drill pipe in the 7⅞-inches hole when considering 12 lb/gal. mud and a 600 gpm flow rate.

Improved Buckling Strength

The present invention (e.g., 5¼-inches drill pipe with EVRDRL49G double-shoulder connections) has an improved bucking strength over the standard API 5-inches pipe due a relationship between the drill pipe size and hole size. See Table 5 below.

TABLE 5

Critical Buckling Load of 5-inch and 5¼-inch Drill Pipe

| Deviation | 30-Degrees | 60-Degrees | 90-Degress |
|---|---|---|---|
| 5-inch, 19.50# (0.362-inch wall), IEU S-135 Drill Pipe | 31221 lbs | 41089 lbs | 44153 lbs |
| 5¼-inch, 20.70# (0.361-inch wall), IEU S-135 Drill Pipe | 34585 lbs | 45516 lbs | 48910 lbs |

1) Buckling loads calculated using weight of drill pipe in air.

Figure 30:
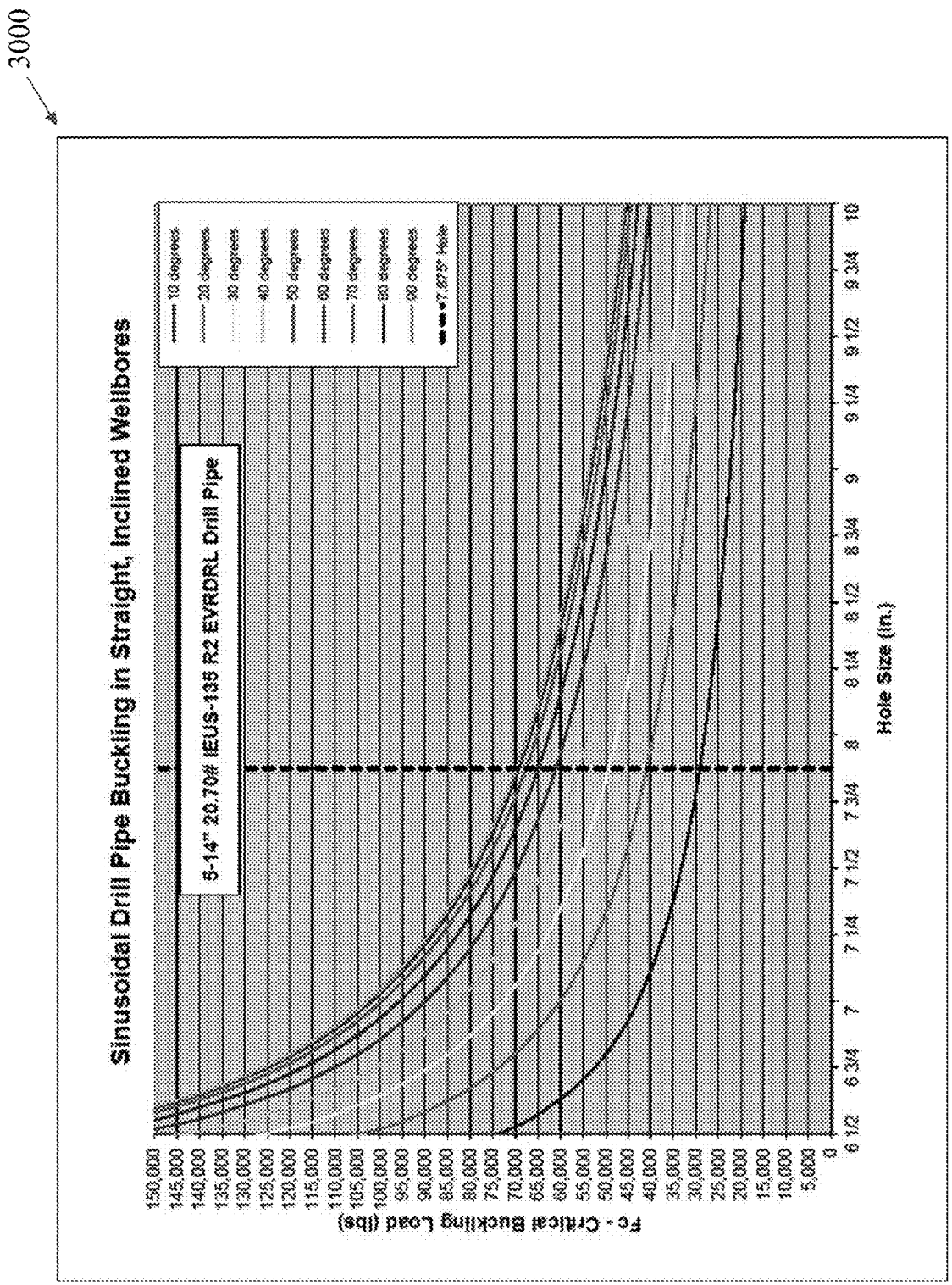
FIG. 30 illustrates a chart of hole size (inches) vs. Fc—Critical Buckling Load (lbs) for an embodiment of the present invention (e.g., 5¼-inches drill pipe), showing sinusoidal drill pipe buckling straight, inclined well bores.
Figure 31:
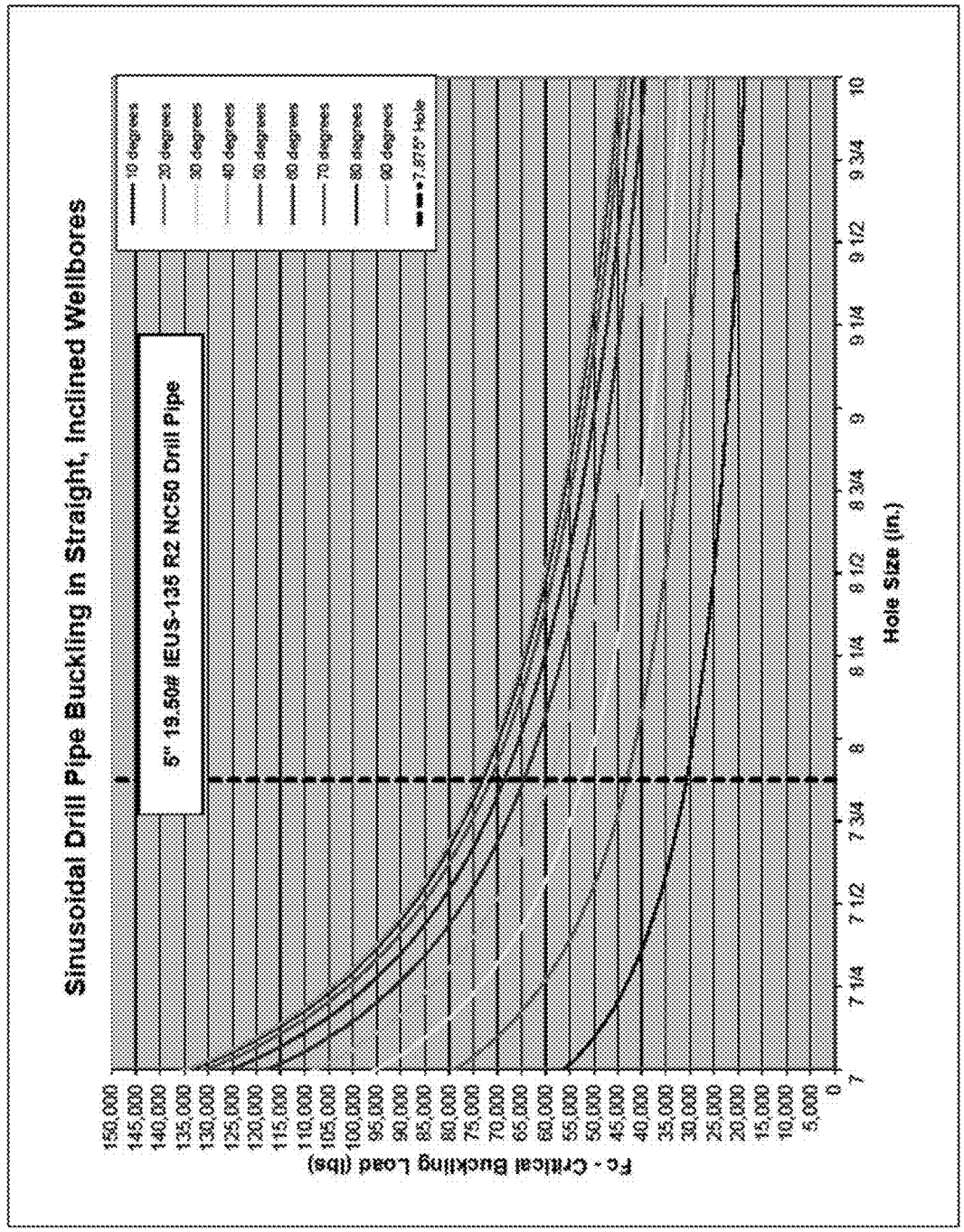
FIG. 31 illustrates a chart of hole size (inches) vs. Fc—Critical Buckling Load (lbs) for a standard API 5-inch drill pipe, showing sinusoidal drill pipe buckling straight, inclined well bores.
Figure 32:
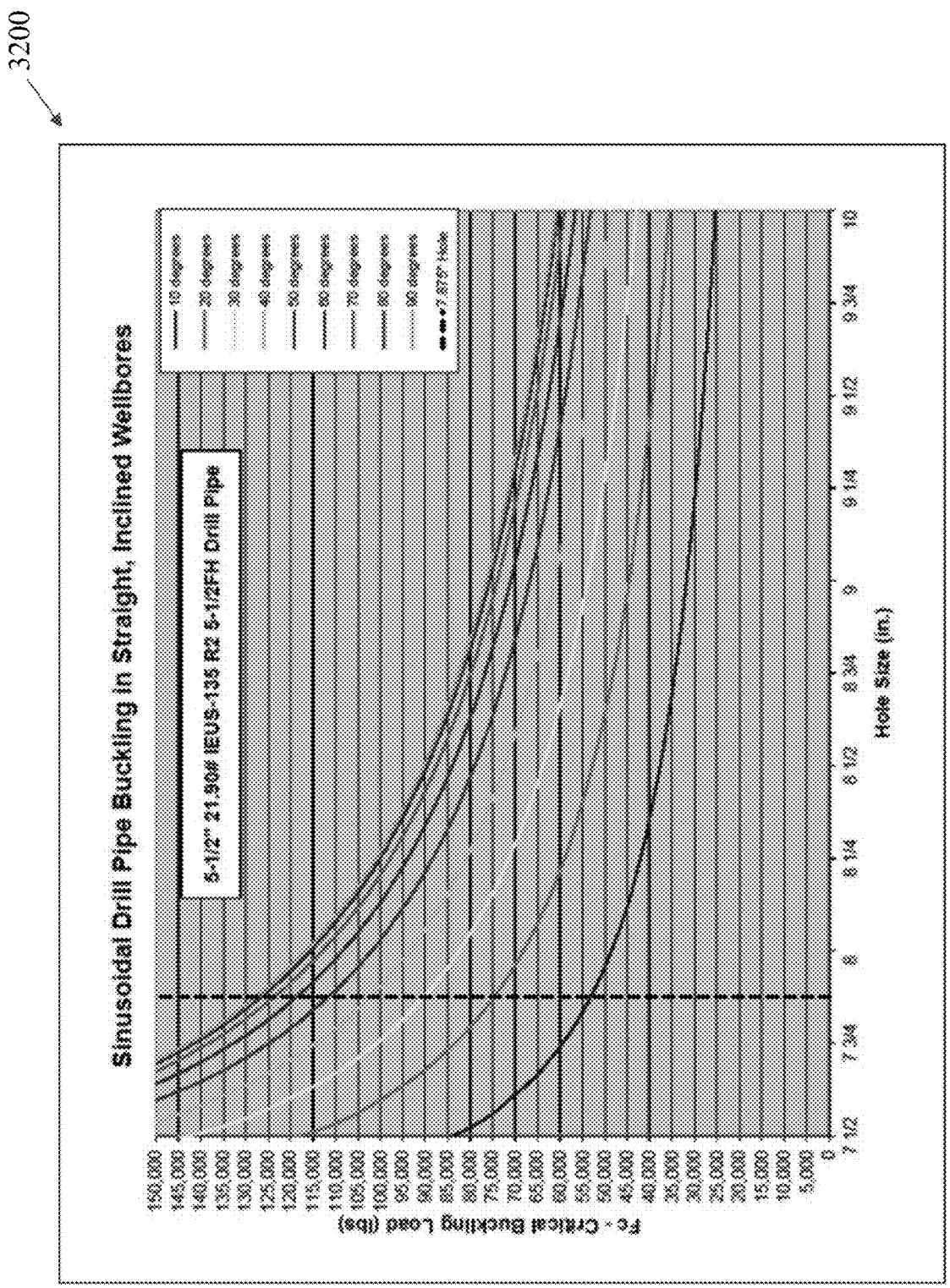
FIG. 32 illustrates a chart of hole size (inches) vs. Fc—Critical Buckling Load (lbs) for a standard API 5½-inch drill pipe, showing sinusoidal drill pipe buckling straight, inclined well bores.

FIG. 30 illustrates a chart of hole size (inches) vs. Fc—Critical Buckling Load (lbs) for an embodiment of the present invention (e.g., 5¼-inches drill pipe), showing sinusoidal drill pipe buckling straight, inclined well bores; FIG. 31 illustrates a chart of hole size (inches) vs. Fc—Critical Buckling Load (lbs) for a standard API 5-inches drill pipe, showing sinusoidal drill pipe buckling straight, inclined well bores; and FIG. 32 illustrates a chart of hole size (inches) vs. Fc—Critical Buckling Load (lbs) for a standard API 5½-inches drill pipe, showing sinusoidal drill pipe buckling straight, inclined well bores.

The larger the drill pipe in a given hole size, the higher the critical buckling load. Buckling and rotating of the drill pipe at the same time can cause rapid fatigue failure. If the drill string undergoes mechanical compression that exceeds its critical buckling load, the string will first buckle sinusoidally. That is, the drill string abruptly assumes a snaked, or sinusoidal shape in the wellbore. If compression continues to increase, the drill string will finally achieve a helical shape in the wellbore. Rotary-mode buckling is unavoidable in vertical hole sections. This occurs because the long elastic drill string, sometimes reaching lengths in excess of 4 miles, has very little stability unless it is pressed against the side of the hole over some significant length. Forces which accomplish this are absent in a straight, vertical hole. Once the hole angle deviates a few degrees from vertical, or if the hole is curving upward, the drill string gains stability and can carry higher compressive loads and remain stable. For the drill pipe size with the higher buckling resistance, the more weight can be applied to the bit, increasing penetration rates and lessening fatigue damage in directional holes. This consideration favors the largest possible drill pipe tube size for a given hole.

In a high angle ER well, drill bit weight cannot be efficiently applied with the traditional BHA, and it becomes necessary to mechanically compress the normal weight drill pipe to apply the drill bit weight. Because of the high hole angles, it's often necessary while rotating to apply drill bit weight with normal weight drill pipe (NWDP) run in mechanical compression. However, so long as the drill pipe is not buckled, no significant fatigue damage should be expected.

In sliding mode drilling, hole friction may cause drill pipe buckling when attempting to apply weight on the drill bit. In the absence of rotation however, no significant fatigue damage is likely. Fortunately, high hole angles help stabilize the drill pipe and allows for a certain amount of mechanical compression. So long as the magnitude of mechanical compression does not exceed the critical buckling load, the drill pipe remains stable. When drilling the horizontal section of the hole, the drill bit weight is applied by mechanically compressing the drill pipe in the build zone. Above the kickoff point in the vertical section of the hole, buckling is predicted as soon as the drill pipe goes into mechanical compression regardless of drill pipe size or hole size. Thus, the available drill bit weight will be a function of the drill pipe weight in the build zone and horizontal section.

The buckling strength calculated using the Dawson Paslay formula shows the present invention (e.g., 5¼-inches drill pipe) buckling resistance (i.e., stiffness) to be approximately 10% higher than the 5-inches drill pipe while the present invention (e.g., 5¼-inches drill pipe) is only about 0.8% heavier than the 5-inches drill pipe (weights adjusted to include tool joints).

As shown in FIG. 30, nearly 50,000 lbf can be applied to the present invention (e.g., 5¼-inches drill pipe), inside a 7⅞-inches hole with little to no buckling anywhere in the horizontal section.

Improved Elevator Hoist Capacity

The present invention (e.g., 5¼-inches drill pipe with EVRDRL49G double-shoulder connections) has an improved elevator hoist capacity over the standard API 5½-inches drill pipe due to the size of the tool joint in relation to the drill pipe.

A maximum drill pipe elevator hoist capacity is a function of a contact area between an elevator and a tool joint elevator shoulder, which is dependent on the difference between the tool joint OD and the drill pipe OD adjacent to the tool joint. The smaller the tool joint OD relative to the drill pipe OD, the lower the elevator hoist capacity.

The elevator hoist capacities for the present invention (e.g., 5¼-inches drill pipe) and the standard API 5½-inches drill pipe were calculated based on a projected area of the elevator contact surface (i.e., bowl bore), using a 100,000-psi contact stress. See Table 6.

TABLE 6

Elevator Hoist Capacities

| Drill Pipe Assembly | Tool Joint OD (in.) | Max. Tube Upset OD (in.) | New Nominal (100% RBW) Tube Tensile Strength (lbs) | Elevator Carrying Capacity[1] (lbs) |
|---|---|---|---|---|
| 5-inch IEU S-135 Drill Pipe | 6¼ | 5⅛ | 712100 | 994432 |
| 5¼-inch IEU S-135 Drill Pipe | 6¼ | 5⅜ | 748500 | 762037 |
| 5½-inch IEU S-135 Drill Pipe | 6¼ | 5¹¹⁄₁₆ | 786800 | 424846 |

[1]Based on 100,000 psi contact stress and ¹⁄₃₂-inch elevator wear factor.

Figure 33:
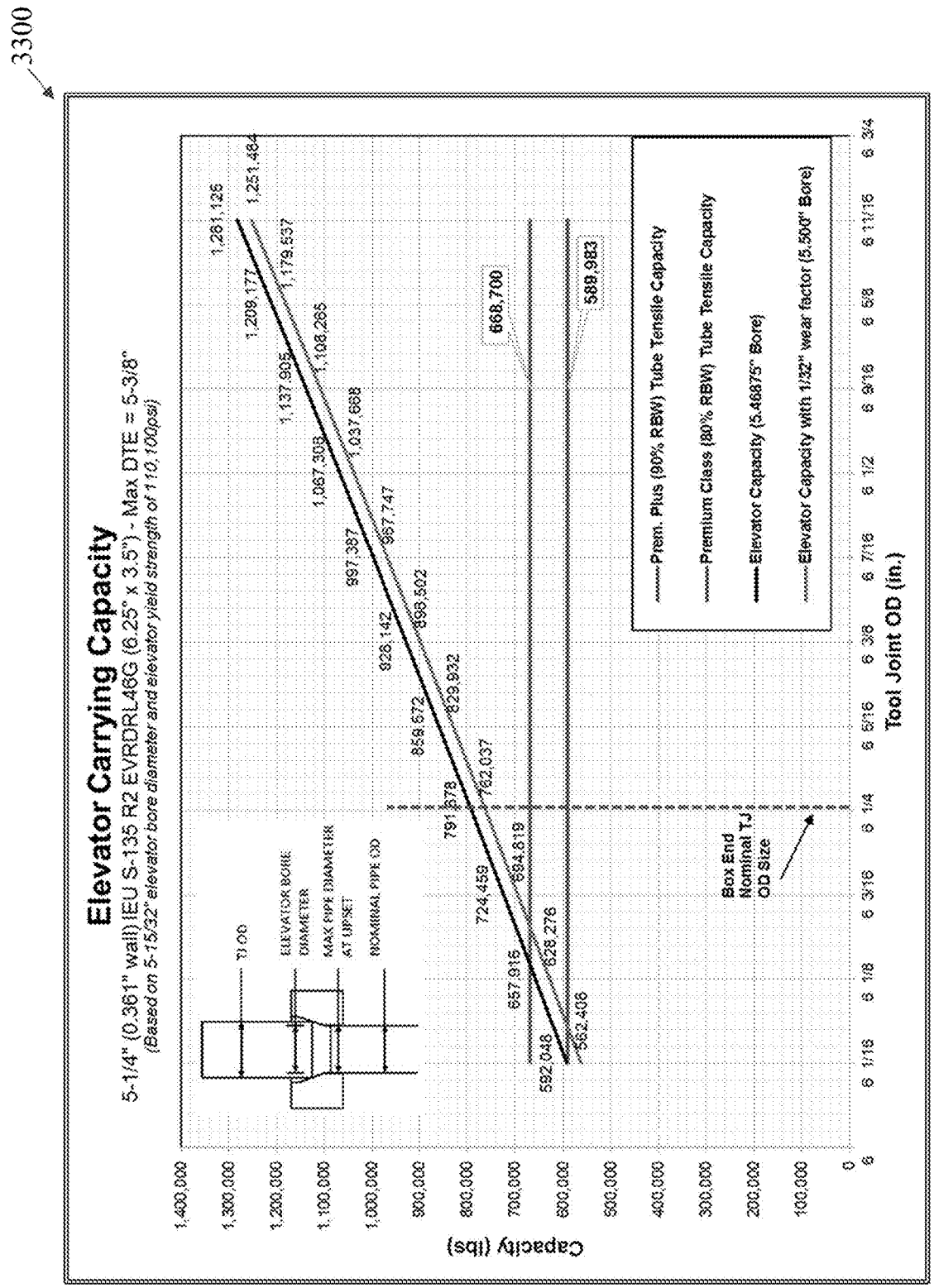
FIG. 33 illustrates a chart of tool joint outer diameter (OD) (inches) vs. capacity (lbs) for an embodiment of the present invention (e.g., 5¼-inches drill pipe), showing elevator carrying capacity.

FIG. 33 illustrates a chart of tool joint outer diameter (OD) (inches) vs. capacity (lbs) for an embodiment of the present invention (e.g., 5¼-inches drill pipe), showing elevator hoist capacity.

Improved Drill String Fishability

The present invention (e.g., 5¼-inches drill pipe with EVRDRL49G double-shoulder connections) has an improved drill string fishability over the standard API 5-inches drill pipe due to the tool joint OD in relation to hole size. See Table 7.

TABLE 7

Maximum Fishable Drill Pipe Tool Joint Outside Diameter

| Casing OD (in.) | Casing Drift Diameter (in.) | Overshot OD (in.) | Min. Catch (in.) | 5 ½-inch Drill Pipe with 7 ¼-inch OD Tool Joint[1,2] | 5 ¼-inch Drill Pipe with 6 ¼-inch OD Tool Joint[1,2] | 5-inch Drill Pipe with 6 ⅝-inch OD Tool Joint[1,2] |
|---|---|---|---|---|---|---|
| 8.625 | 7.286 | 7 ¼ | 6 ⅛ | X | X | X |
| | 7.500 | 7 ½ | 6 ⅜ | X | Y | X |
| | 7.600 | 7 ⅝ | 6 ½ | X | Y | X |
| | 7.700 | 7 ⅝ | 6 ½ | X | Y | X |
| | 7.796 | 7 ⅞ | 6 ¾ | X | Y | Y |
| | 7.892 | 7 ⅞ | 6 ¾ | X | Y | Y |
| | 7.972 | 7 ⅞ | 6 ¾ | X | Y | Y |
| 9.625 | 8.125 | 8 ⅛ | 7 | X | Y | Y |
| | 8.219 | 8 ⅛ | 7 | X | Y | Y |
| | 8.279 | 8 ¼ | 7 ⅛ | X | Y | Y |
| 9.875 | 8.469 | 8 ½ | 7 ⅜ | Y | Y | Y |
| 9.625 | 8.500 | 8 ½ | 7 ⅜ | Y | Y | Y |
| | 8.525 | 8 ½ | 7 ⅜ | Y | Y | Y |
| | 8.599 | 8 ½ | 7 ⅜ | Y | Y | Y |
| | 8.750 | 8 ¾ | 7 ⅝ | Y | Y | Y |
| 10.750 | 9.000 | | | Y | Y | Y |
| | 9.126 | | | Y | Y | Y |
| | 9.250 | | | Y | Y | Y |
| | 9.404 | 9 ⅜ | 7 ¾ | Y | Y | Y |
| | 9.504 | | | Y | Y | Y |
| | 9.625 | 9 ⅝ | 8 | Y | Y | Y |
| | 9.694 | | | Y | Y | Y |
| | 9.875 | | | Y | Y | Y |
| | 9.894 | | | Y | Y | Y |
| | 10.036 | | | Y | Y | Y |

[1] X - Dimensionally unfishable assembly
[2] Y -- Fishable assembly

5 ½-inch Drill Pipe: 7-inch and larger OD tool joints have a fishability limited to casing sizes API 9 ⅝-inch and larger OD. Unfishable in hole sizes smaller than 8 ½-inches.
5 ¼-inch Drill Pipe: 6 ¼-inch and larger OD tool joints have a fishability in casing sizes API 8 ⅝-inch and larger OD and with weights up to 44.00# (0.500-inch wall). Fishable in hole sizes larger than 7 ½-inches.
5-inch Drill Pipe: 6 ⅝-inch OD tool joints are not fishable in API 8 ⅝-inch casing OD and with weights greater than 32.00# (0.362-inch wall). Unfishable in 7 ⅞-inch hole.

For the present invention (e.g., 5¼-inches drill string) that has become separated or unscrewed downhole, conventional high-strength fishing tools are readily available to aid in recovering the separated or unscrewed drill string (fish) and allowing drilling to continue.

In relation to a typical well design, a 9⅝-inches 53.50 ppf casing produces an 8½-inches holes, with enough annular ID clearance for fishing equipment (overshot) sizes up to 8⅜-inches OD and capable of catching tool joints up to 7¼-inches OD.

Similarly, an 8⅝-inches casing produces a 7⅞-inches holes for 7¾-inches OD overshot to catch tool joints 6⅜-inches OD.

For a standard API 5-inch NC50 tool joint, drill string fishability is limited by the tool joint OD as it relates to hole size. The standard API 5-inches drill pipe has limited-to-no fishability by way of overshot in a 7⅞-inches hole with an 8⅝-inches or 8¾-inches casing due to a 6⅝-inches OD NC50 tool joint. For the 7⅞-inches hole, the tool joint should have the smallest OD possible to provide sufficient fishability.

Further, the standard API 5½-inches drill pipe represents an over-design for holes smaller than 8½-inches with a limited-to-no fishability by way of overshot due to a 7¼-inches OD NC50 tool joint, especially in deviated holes.

Improved Hole Cleaning

The present invention (e.g., 5¼-inches drill pipe with EVRDRL49G double-shoulder connections) has an improved hole cleaning over the standard API 5-inches drill pipe due to the tool joint OD in relation to hole size.

For a standard API 5-inches drill pipe, hole cleaning is limited by a maximum flow rate of drilling fluid generated by a drilling rig pump. Many drilling rigs lack sufficient pump horsepower to generate the flow rate to achieve sufficient annular velocity to clean the hole.

Further, the standard API 5½-inches drill pipe represents an over-design for holes smaller than 8½-inches, with large, bulky tool joints restricting the ability of the drilling fluid to remove cuttings from the annulus.

Summary

The present invention (e.g., 5¼-inches drill pipe) provides hydraulic performance comparable to the standard API 5½-inches drill pipe in a 12¼-inches hole and superior to the standard API 5-inches and 5½-inches drill pipe in 7⅞-inches or 8½-inches holes. The present invention (e.g., 5¼-inches drill pipe with EVRDRL49G double shoulder connections) maximizes the tool joint ID for improved hydraulics (and a less obstructed path for tools) and minimizes tool joint OD for improved fishability and hole cleaning in high angle holes.

Further, the present invention (e.g., 5¼-inches drill pipe) extends the drilling envelope by allowing engineers to select a single size drill pipe (e.g., 5¼-inches drill pipe) for multiple hole geometries.

Drillstring/Drill Pipe Design Analysis

Figure 29:
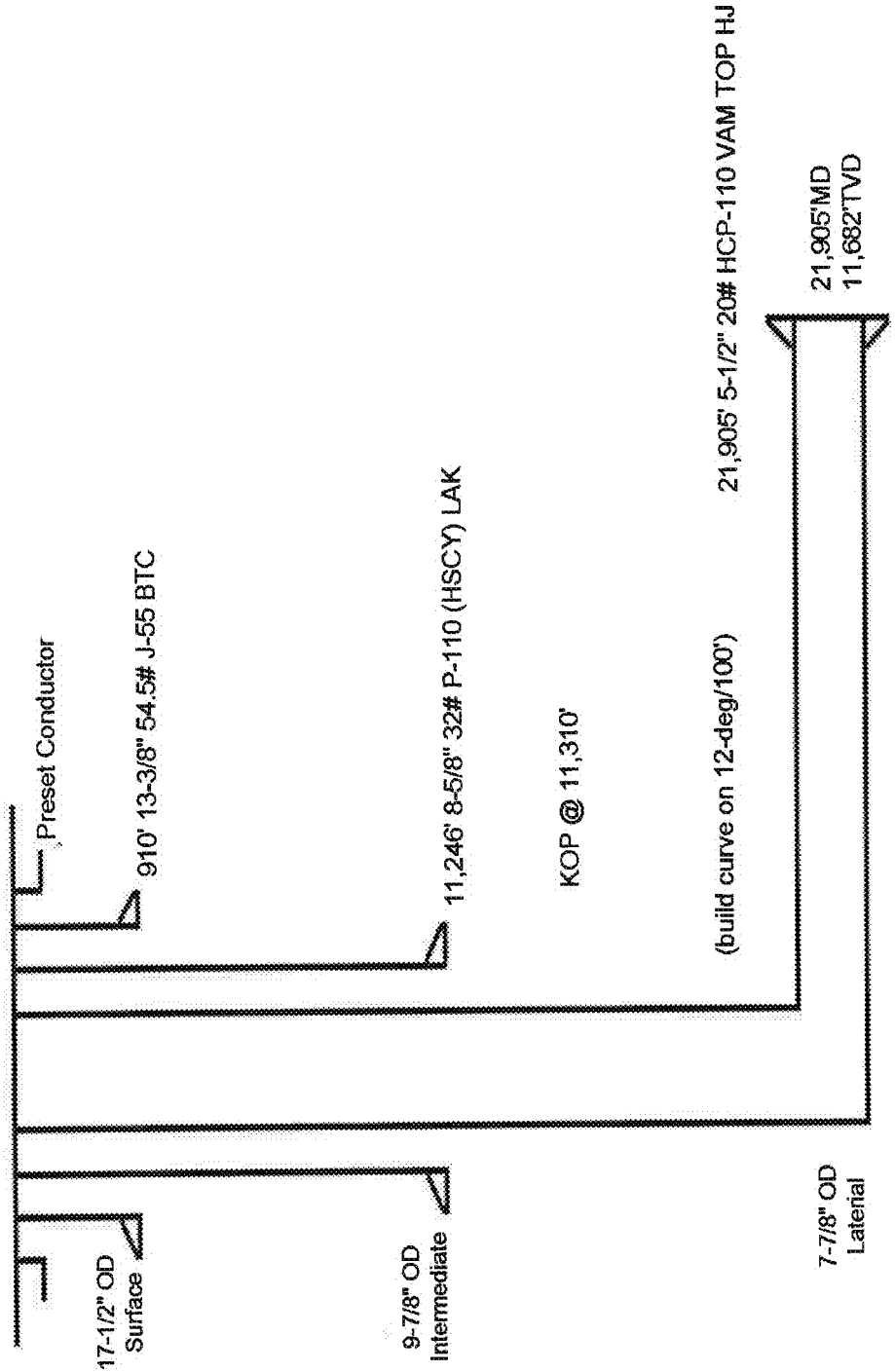
FIG. 29 illustrates an exemplary wellbore diagram.

Prior to field applications, load and stability analyses were performed on the drill string, considering the standard API 5-inches drill pipe or the present invention (e.g., 5¼-inches drill pipe). The well plan included a 3-casing string design with long, 8½-inches or 7⅞-inches horizontal holes across the pay zones at TD. See FIG. 29.

An objective of the analysis was to confirm that the present invention (e.g., 5¼-inches drill pipe) could replace the standard API 5-inches drill pipe in a pad drilling application where both 8½-inches and 7⅞-inches production intervals are drilled from a single surface location.

The design of the drill string and/or drill pipe was based on the drill pipe's structural requirements, geometric requirements and component costs. The drill string and/or drill pipe was analyzed under the following conditions and operational modes:
1. at hole inclination of 30-degree, 60-degree and 90-degree
2. in hole sizes of 12¼-inches, 7⅞-inches and 8½-inches
3. at a measured depth of 11,246 feet MD/TVD and 21,900 feet MD (11,958 feet TVD).
4. for S-135 grade, Range-2 drill pipe and nominal wall: 5-inches (i.e., 0.362-inch wall) vs. 5¼-inches (i.e., 0.375-inch wall)
5. at design flow rate limits of 900 gpm for a 12¼-inches hole and 600 gpm for a 7⅞-inches and 8½-inches holes.

The well path for the study was based on a vertical hole to KOP at 11,282 feet TVD, a build rate of 12 degrees/100 feet to a maximum inclination of 90-degrees and a hole size at total measured depth of 7⅞-inches, and with an 8⅝-inches casing set at 11,246 feet. The mud type in the lateral was 12.8 pound per gallon (lb/gal.) oil-based mud (OBM), with cut brine for surface and intermediate holes. The assumed friction factors were 0.25 for the casing and 0.30 for the open hole.

The drill string and/or drill pipe stability was addressed from two perspectives:
1. the stability effect on drill pipe fatigue in rotary mode drilling; and
2. the stability effect on static stress levels in sliding mode drilling.

Structural Requirements

The drill string and/or drill pipe structural requirements are primarily defined by torsional, tensile and buckling loads on the drill pipe during operations. The drill pipe and tool joints must have the torsional strength needed to rotate the drill string when drilling and when coming out of the hole. The drill pipe must have the tensile strength to pull the drill string out of the hole. Further, the drill pipe must have the buckling strength to transfer weight from the build zone to the drill bit. Except for tension and buckling, these loads are often applied simultaneously.

In addition, the drill string and/or drill pipe structural requirement are also defined by other factors (e.g., external and internal pressure capabilities) of the drill pipe during operations.

Geometric Requirements

The drill string and/or drill pipe must be designed for a specific hole or casing. For example, the drill pipe should be large enough to optimize the drilling hydraulics program yet have small enough tool joints to be fished. Bit hydraulic horsepower and annular velocity are drilling parameters that depend on the flow rate of the drilling fluid. Larger ID drill pipe can minimize pressure losses and decrease pump horsepower. The drill pipe acts as a conduit for pumping drilling fluid to the bit and to bring the fluid and cutting back to the surface. Pressure losses caused by pumping the fluid to and from the drill bit must be minimized and the velocity of the fluid in the annulus (between the pipe and wall of the hole) must be sufficient to bring the cuttings back to the surface. A large tool joint bore diameter will have a positive effect on drilling hydraulics. The pipe must be fishable inside 8⅝-inches casing or 7⅞-inches open hole sections. The tool joints are selected so that there is adequate annular clearance for fishing tools. The drill pipe must be handled with conventional elevators to avoid special handling equipment and additional handling costs. The difference between the diameter of the tool joints and the diameter of the drill pipe body must be large enough to provide enough contact area to allow use of standard 18-degree tapered elevators.

Component Costs

A cost savings may be realized with the present invention (e.g., 5¼-inches drill pipe) compared to the standard API 5½-inches drill pipe by permitting smaller production hole sizes and use of a single string for both intermediate and production holes (i.e., 7⅞-inches and larger). The drill string and/or drill pipe costs include costs associated with performance enhancing features (e.g., pin tool joint-to-tube tapers, proprietary connections, tool joint hardfacings and internal/external coatings) to extend the service life of components, and costs relating to utilization of drill pipe in the field. Further, costs associated with using the drill pipe include handling (on the rig and during pipe movement) and interfacing with other drill string components.

Improved Drill Pipe

Figure 34A:
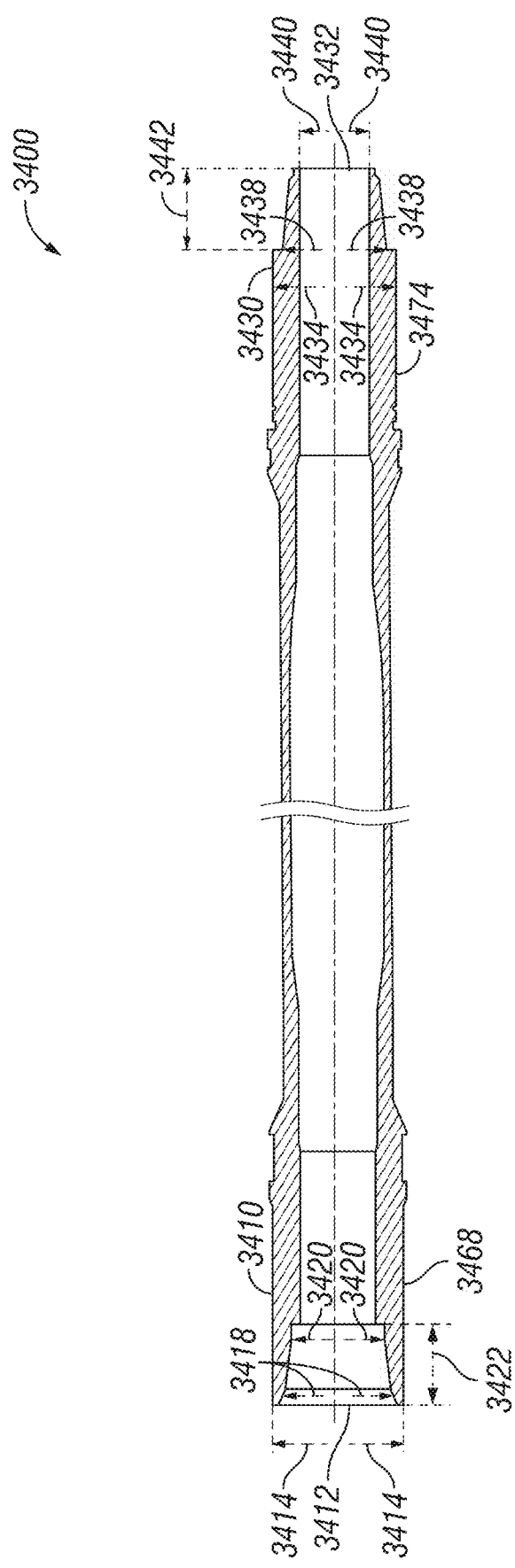
FIG. 34A illustrates cross-sectional view of a drill pipe according to an embodiment of the present invention, showing a double-shoulder connection with a box connection at one end and a pin connection at the other.
Figure 34B:
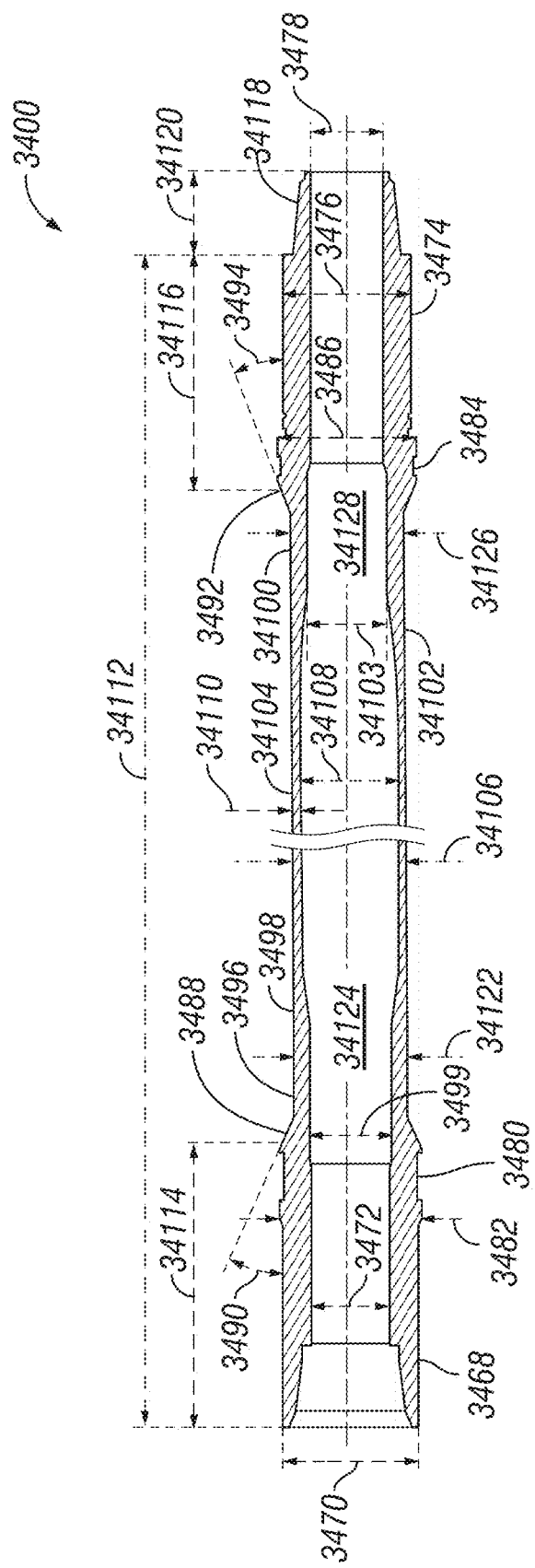
FIG. 34B illustrates cross-sectional view of a drill pipe according to an embodiment of the present invention, showing a double-shoulder connection with a box connection at one end and a pin connection at the other.

FIG. 34 illustrates cross-sectional view of an improved drill pipe 3400 according to an embodiment of the present invention, showing a tool joint box 3468 at one end and a tool joint pin 3472 at the other. As shown in FIG. 34, the drill pipe 3400 comprises a tool joint box 3468 having a tool joint box outer diameter 3470 and a tool joint box inner diameter 3472, and a tool joint pin 3474 having a tool joint pin outer diameter 3476 and a tool joint pin inner diameter 3476.

In an embodiment, the tool joint box outer diameter 3470 may be from about 6.1-inches to about 6.4-inches, and any range or value there between. In an embodiment, the tool joint box diameter 3470 may be about 6.25-inches. In an embodiment, the tool joint box diameter 3470 may be about 6.25-inches for a 5¼-inches drill pipe. In an embodiment, the tool joint box diameter 3470 may be about 6.25-inches for a 5¼-inches 20.70 ppf (i.e., 0.361-inch wall thickness), S-135 grade, Range-2 drill pipe.

In an embodiment, the tool joint box inner diameter 3472 may be from about 3.4-inches to about 3.6-inches, and any range or value there between. In an embodiment, the tool joint box inner diameter 3472 may be about 3.5-inches. In an embodiment, the tool joint box inner diameter 3472 may be about 3.5-inches for a 5¼-inches drill pipe. In an embodiment, the tool joint box inner diameter 3472 may be about 3.5-inches for a 5¼-inches 20.70 ppf (i.e., 0.361-inch wall thickness), S-135 grade, Range-2 drill pipe.

In an embodiment, the tool joint pin outer diameter 3476 may be from about 6.1-inches to about 6.4-inches, and any range or value there between. In an embodiment, the tool joint pin diameter 3476 may be about 6.25-inches. In an embodiment, the tool joint pin diameter 3476 may be about 6.25-inches for a 5¼-inches drill pipe. In an embodiment, the tool joint pin diameter 3476 may be about 6.25-inches for a 5¼-inches 20.70 ppf (i.e., 0.361-inch wall thickness), S-135 grade, Range-2 drill pipe.

In an embodiment, the tool joint pin inner diameter 3478 may be from about 3.4-inches to about 3.6-inches, and any range or value there between. In an embodiment, the tool joint pin inner diameter 3478 may be about 3.5-inches. In an embodiment, the tool joint pin inner diameter 3478 may be about 3.5-inches for a 5¼-inches drill pipe. In an embodiment, the tool joint pin inner diameter 3478 may be about 3.5-inches for a 5¼-inches 20.70 ppf (i.e., 0.361-inch wall thickness), S-135 grade, Range-2 drill pipe.

In an embodiment, the tool joint box 3468 may comprise an optional box hardband 3480 having a box hardband outer diameter 3478 for extra downhole wear protection. In an embodiment, the box hardband 3480 may comprise an extra component (e.g., welded wire) attached to the tool joint box 3468.

In an embodiment, the box hardband diameter 3478 may be from about 6.3-inches to about 6.6-inches, and any range or value there between. In an embodiment, the box hardband diameter 3478 may be about 6.438-inches. In an embodiment, the box hardband diameter 3478 may be about 6.438-inches for 5¼-inches drill pipe. In an embodiment, the box hardband diameter 3478 may be about 6.438-inches for 5¼-inches 20.70 ppf (i.e., 0.361-inch wall thickness), S-135 grade, Range-2 drill pipe.

In an embodiment, the tool joint pin 3474 may comprise an optional pin hardband 3484 having a pin hardband outer diameter 3486 for extra downhole wear protection. In an embodiment, the pin hardband 3484 may comprise an extra component (e.g., welded wire) attached to the tool joint pin 3474.

In an embodiment, the pin hardband diameter 3484 may be from about 6.3-inches to about 6.6-inches, and any range or value there between. In an embodiment, the pin hardband diameter 3484 may be about 6.438-inches. In an embodiment, the pin hardband diameter 3484 may be about 6.438-inches for 5¼-inches drill pipe. In an embodiment, the pin hardband diameter 3484 may be about 6.438-inches for 5¼-inches, 20.70 ppf (i.e., 0.361-inch wall thickness), S-135 grade, Range-2 drill pipe.

In an embodiment, the tool joint box 3468 comprises a tapered elevator shoulder 3488 having a tapered elevator shoulder angle 3490.

In an embodiment, the tapered elevator shoulder angle 3490 may be from 16 degrees to about 20 degrees, and any range or value between. In an embodiment, the tapered elevator shoulder angle 3490 may be about 18 degrees. In an embodiment, the tapered elevator shoulder angle 3490 may be about 18 degrees for 5¼-inches drill pipe. In an embodiment, the tapered elevator shoulder angle 3490 may be about 18 degrees for 5¼-inches, 20.70 ppf (i.e., 0.361-inch wall thickness), S-135 grade, Range-2 drill pipe.

In an embodiment, the tool joint pin 3474 comprises a tapered pin shoulder 3492 having a pin shoulder angle 3494.

In an embodiment, the taper pin shoulder angle 3494 may be from about 16 degrees to about 36 degrees, and any range or value there between. In an embodiment, the tapered pin shoulder angle 3494 may be about 18 degrees. In an embodiment, the tapered pin shoulder angle 3494 may be about 18 degrees for 5¼-inches drill pipe. In an embodiment, the tapered pin shoulder angle 3494 may be about 18 degrees for 5¼-inches, 20.70 ppf (i.e., 0.361-inch wall thickness), S-135 grade, Range-2 drill pipe.

In an embodiment, the drill pipe 3400 comprises a tool joint box 3468, a tool joint pin 3474 and a drill pipe body 34104.

In an embodiment, the tool joint box 3468 may have a drill pipe box weld neck 3496 in a region of a drill pipe box body upset 3498 having a drill pipe box body upset inner diameter 3499.

In an embodiment, the drill pipe box body upset inner diameter 3499 may be from about 3.66-inches to about 3.85-inches, and any range or value there between. In an embodiment, the drill pipe box body upset inner diameter 3499 may be about 3.752-inches. In an embodiment, the drill pipe box body upset inner diameter 3499 may be about 3.752-inches for 5¼-inches drill pipe. In an embodiment, the drill pipe box body upset inner diameter 3499 may be about 3.752-inches for 5¼-inches, 20.70 ppf (i.e., 0.361-inch wall thickness), S-135 grade, Range-2 drill pipe.

In an embodiment, the tool joint pin 3474 may have a drill pipe pin weld neck 34100 in a region of a drill pipe pin body upset 34102 having a drill pipe pin body upset inner diameter 34103.

In an embodiment, the drill pipe pin body upset inner diameter 34103 may be from about 3.66-inches to about 3.85-inches, and any range or value there between. In an embodiment, the drill pipe pin body upset inner diameter 34103 may be about 3.752-inches. In an embodiment, the drill pipe pin body upset inner diameter 34103 may be about 3.752-inches for 5¼-inches drill pipe. In an embodiment, the drill pipe pin body upset inner diameter 34103 may be about 3.752-inches for 5¼-inches, 20.70 ppf (i.e., 0.361-inch wall thickness), S-135 grade, Range-2 drill pipe.

In an embodiment, the drill pipe body 34104 has a drill pipe body outer diameter 34106 and a drill pipe body inner diameter 34108.

In an embodiment, the drill pipe body outer diameter 34106 may be from about 5.1-inches to about 5.4-inches, and any range or value there between. In an embodiment, the drill pipe body outer diameter 34106 may be about 5.25-inches for 5¼-inches drill pipe. In an embodiment, the drill pipe body outer diameter 34106 may be about 5.25-inches for 5¼-inches, 20.70 ppf (i.e., 0.361-inch wall thickness), S-135 grade, Range-2 drill pipe.

In an embodiment, the drill pipe body inner diameter 34108 may be from about 4.4-inches to about 4.6-inches, and any range or value there between. In an embodiment, the drill pipe body inner diameter 34108 may be about 4.528-inches for 5¼-inches drill pipe. In an embodiment, the drill pipe body inner diameter 34108 may be about 4.528-inches for 5¼-inches, 20.70 ppf (i.e., 0.361-inch wall thickness), S-135 grade, Range-2 drill pipe.

In an embodiment, the drill pipe body 34104 has a drill pipe wall thickness 34110.

In an embodiment, the drill pipe wall thickness 34110 may be from about 0.352-inch to about 0.370-inch, and any range or value there between. In an embodiment, the drill pipe wall thickness 34110 may be about 0.361-inch. In an embodiment, the drill pipe wall thickness 34110 may be about 0.361-inch for 5¼-inches drill pipe. In an embodiment, the drill pipe wall thickness 34110 may be about 0.361-inch for 5¼-inches, 20.70 ppf (i.e., 0.361-inch wall thickness), S-135 grade, Range-2 drill pipe.

In an embodiment, the drill pipe 3400 having a drill pipe length 34112 comprises a tool joint box 3468 having a tool joint box length 34114, a tool joint pin 3474 having a tool joint pin length 34116 and a drill pipe body 34104 having a drill pipe body length (i.e., drill pipe length−(tool joint box length+tool joint pin length)).

In an embodiment, the drill pipe length 34112 may be from about 25-feet to about 50-feet, and any range or value there between. In an embodiment, the drill pipe length 34112 may be about 31.5-feet. In an embodiment, the drill pipe length 34112 may be about 31.5-feet for 5¼-inches drill pipe. In an embodiment, the drill pipe length 34112 may be about 31.5-feet for 5¼-inches, 20.70 ppf (i.e., 0.361-inch wall thickness), S-135 grade, Range-2 drill pipe.

In an embodiment, the drill pipe length 34112 may be about 45-feet to about 47-feet. In an embodiment, the drill pipe length 34112 may be about 45-feet to about 47-feet for 5¼-inch drill pipe. In an embodiment, the drill pipe length 34112 may be about 45-feet to about 47-feet for 5¼-inch, Range-3 drill pipe. Longer drill pipe lengths reduce the number of tool joint connections, resulting in fewer potential damage points to maintain and repair.

In an embodiment, the tool joint box length 34114 may be from about 15-inches to about 19-inches, and any range or value there between. In an embodiment, the tool joint box 34114 may be about 17-inches. In an embodiment, the tool joint box 34114 may be about 17-inches for 5¼-inches drill pipe. In an embodiment, the tool joint box 34114 may be about 17-inches for 5¼-inches, 20.70 ppf (i.e., 0.361-inch wall thickness), S-135 grade, Range-2 drill pipe.

In an embodiment, the tool joint pin length 34116 may be from about 12.5-inches to about 15.5-inches, and any range or value there between. In an embodiment, the tool joint pin 34116 may be about 14-inches. In an embodiment, the tool joint pin 34116 may be about 14-inches for 5¼-inches drill pipe. In an embodiment, the tool joint pin 34116 may be about 14-inches for 5¼-inches, 20.70 ppf (i.e., 0.361-inch wall thickness), S-135 grade, Range-2 drill pipe.

In an embodiment, the drill pipe 3400 having a drill pipe length 34112 comprises a tool joint box 3468 having a tool joint box length 34114, a tool joint pin 3474 having a tool joint pin length 34116, a drill pipe body 34104 having a drill pipe body length (i.e., drill pipe length−(tool joint box length+tool joint pin length)), and a rotary shoulder connection 34118 having a rotary connection length 34120.

In an embodiment, the rotary shoulder connection length 34120 may be from about 4.275-inches to about 5.225-inches, and any range or value there between. In an embodiment, the rotary shoulder connection length 34120 may be about 4.75-inches. In an embodiment, the rotary shoulder connection length 34120 may be about 4.75-inches for 5¼-inches drill pipe. In an embodiment, the rotary shoulder connection length 34120 may be about 4.75-inches for 5¼-inches, 20.70 ppf (i.e., 0.361-inch wall thickness), S-135 grade, Range-2 drill pipe.

In an embodiment, the tool joint box 3468 may have a drill pipe box friction weld 34122 (i.e., a theoretical "physical" location of the weld) having a box friction weld outer diameter 34124 in a region of a drill pipe box body upset 3498.

In an embodiment, the box friction weld outer diameter 34124 may be from about 5.22-inches to about 5.48-inches, and any range or value there between. In an embodiment, the box friction weld outer diameter 34124 may be about 5.350-inches. In an embodiment, the box friction weld outer diameter 34124 may be about 5.350-inches for 5¼-inches drill pipe. In an embodiment, the box friction weld outer diameter 34124 may be about 5.350-inches for 5¼-inches, 20.70 ppf (i.e., 0.361-inch wall thickness), S-135 grade, Range-2 drill pipe.

In an embodiment, the tool joint pin 3474 may have a drill pipe pin friction weld 34126 (i.e., a theoretical "physical" location of the weld) having a pin friction weld outer diameter 34128 in a region of a drill pipe pin body upset 34102.

In an embodiment, the pin friction weld outer diameter 34128 may be from about 5.22-inches to about 5.48-inches, and any range or value there between. In an embodiment, the pin friction weld outer diameter 34128 may be about 5.350-inches. In an embodiment, the pin friction weld outer diameter 34128 may be about 5.350-inches for 5¼-inches drill pipe. In an embodiment, the pin friction weld outer diameter 34128 may be about 5.350-inches for 5¼-inches, 20.70 ppf (i.e., 0.361-inch wall thickness), S-135 grade, Range-2 drill pipe.

In an embodiment, In an embodiment, the drill pipe 3400 having a drill pipe length 34112 comprises a tool joint box 3468 having a tool joint box length 34114, a tool joint pin 3474 having a tool joint pin length 34116, a drill pipe body 34104 having a drill pipe body length (i.e., drill pipe length−(tool joint box length+tool joint pin length)) and a double shoulder connection having a double shoulder connection length, as discussed below.

In an embodiment, the double shoulder connection length may be from about 4.275-inches to about 5.225-inches, and any range or value there between. In an embodiment, the double shoulder connection length may be about 4.75-inches. In an embodiment, the double shoulder connection length may be about 4.75-inches for 5¼-inches drill pipe. In an embodiment, the double shoulder connection length may be about 4.75-inches for 5¼-inches, 20.70 ppf (i.e., 0.361-inch wall thickness), S-135 grade, Range-2 drill pipe.

In an embodiment, the improved drill pipe 3400 may be made of any suitable material. For example, suitable materials include, but are not limited to, low alloy steels (e.g., 4140, 4145, 4330, etc.), stainless steels (e.g., 17-4, 304, 316, etc.), super alloys (e.g., Inconel), titanium alloys (e.g., Ti-6Al-4V, Ti-6Al-6V-2Sn, etc.), copper alloys (e.g., Beryllium copper), cobalt alloys (e.g., Stellite), aluminum alloys (e.g., 2024, 6061, 7075, etc.), and combinations and variations thereof. In an embodiment, the improved drill pipe 3400 may be low alloy steels or stainless steels.

As shown in FIGS. 1A-1B, 4A-4B and 34, the double-shoulder connection 100 comprises a box connection 110, 410, 3410 having a box axis (centerline) 112, 412, 3412, a pin connection 130, 430, 3430 having a pin axis (centerline) 132, 432, 3432, a primary shoulder 150, 450 and a secondary shoulder 160, 460.

In an embodiment, the box connection 110, 3410 comprises a box axis (centerline) 112, 3412, a box outer radius 114, 3414, a box bevel radius 116, a box counter bore radius 118, 3418, a box inner radius 120, 3420, a box depth 122, 3422, a box taper 124 and box threads 126 cut along the box taper 124. The box connection 110, 3410 is a female, internally threaded half of the double-shoulder connection 100, similar to a nut. See FIGS. 1A & 1B.

In an embodiment, the pin connection 130, 3430 comprises a pin axis (centerline) 132, 3432, a pin outer radius 134, 3434, a pin bevel radius 136, a pin cylinder radius 138, 3438, a pin nose radius 140, 3440, a pin length 142, 3442, a pin taper 144 and pin threads 146 cut along the pin taper 144. The pin connection 130, 3430 is a male, externally threaded half of the double-shoulder connection 100, similar to a bolt. See FIGS. 1A & 1B.

In an embodiment, any suitable connection box/pin taper 124, 144 may be used for the box/pin connection 100. For example, suitable connection box/pin taper 124, 144 may be from about ¾ inch per foot to about 3 inches per foot, and any range or value there between.

In an embodiment, any suitable thread pitch may be used for the box threads 126, 426, 526, 626, 726, 826, 926, 1026, 1226, 1426, 1726, 1826, 19, 26, 2026, 2126, 2226, 2326, 2426, 2626 and/or pin threads 146, 446, 546, 646, 746, 846, 946, 1046, 1246, 1446, 1746, 1846, 1946, 2046, 2146, 2246, 2346, 2446, 2646. For example, suitable thread pitches may be from about 3 threads per inch to about 5 threads per inch, and any range or value there between.

In an embodiment, any suitable thread form 1100 may be used for the box threads 126, 426, 526, 626, 726, 826, 926, 1026, 1226, 1426, 1726, 1826, 1926, 2026, 2126, 2226, 2326, 2426, 2626 and/or pin threads 146, 446, 546, 646, 746, 846, 946, 1046, 1246, 1446, 1746, 1846, 1946, 2046, 2146, 2246, 2346, 2446, 2646. See FIG. 11. Suitable thread forms 1100 may have various crest 1110, 1112, flank 1130, 1140 and root 1160 shapes with an included angle 1150 from about 29 degrees to about 90 degrees, and any range or value there between, as discussed below.

Figure 4B:
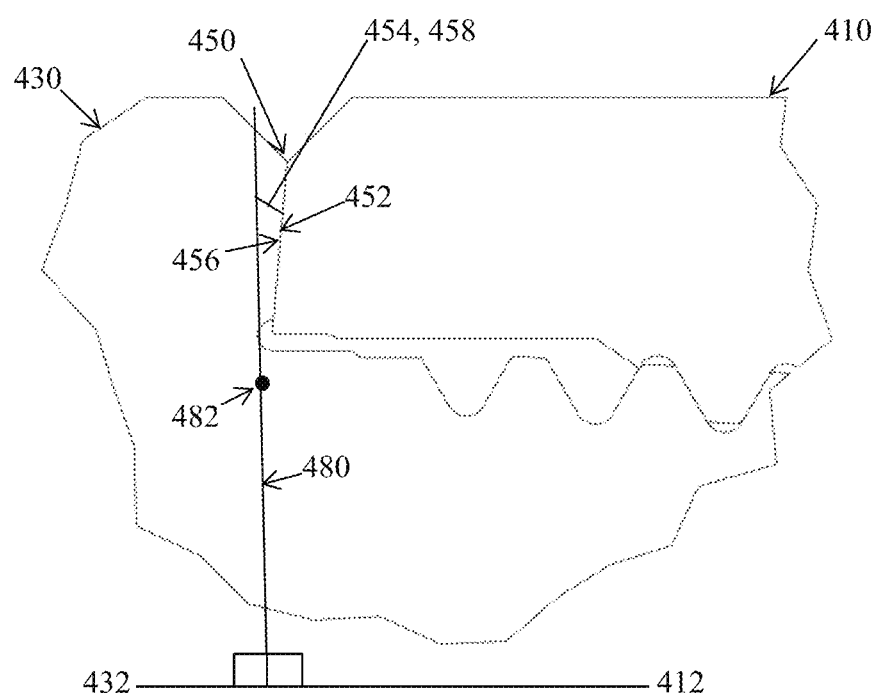
FIG. 4B illustrates a detailed view E in FIG. 4A, showing the angled primary shoulder according to an embodiment of the present invention.
Figure 4A:
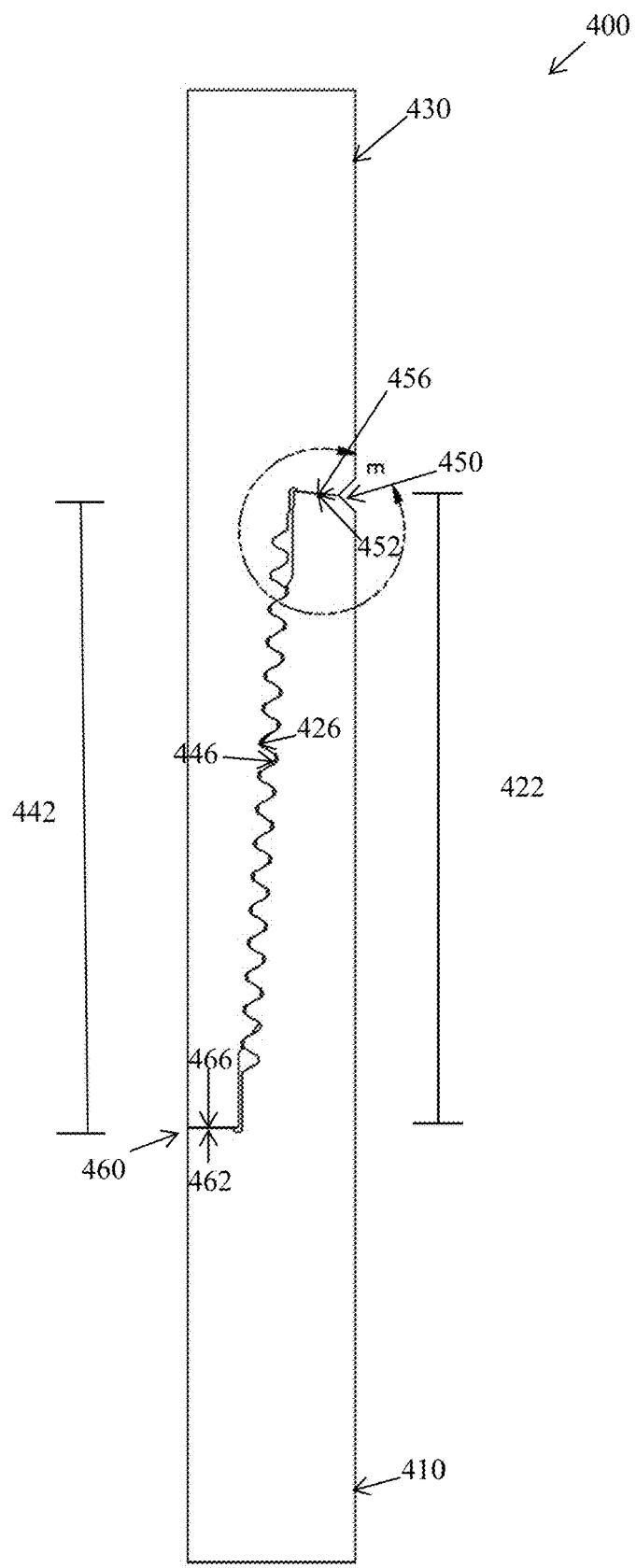
FIG. 4A illustrates a cross-sectional view of an improved double-shoulder connection with an angled primary shoulder and a standard secondary shoulder according to an embodiment of the present invention.

In an embodiment, the primary shoulder 150, 450 may be an angled primary shoulder, as discussed below. As shown in FIGS. 4A-4B, the primary shoulder 450 comprises a primary box shoulder 452 at a primary box angle 454 with respect to a first perpendicular 480 to the box axis 412 at a first end point 482 of the box connection; and a primary pin shoulder 456 at a primary pin angle 458 with respect to a first perpendicular 480 to the pin axis 432 at the first end point 482 of the pin connection. See also FIG. 1A: 112 & FIG. 1B: 132 (showing box and pin made up).

Figure 6B:
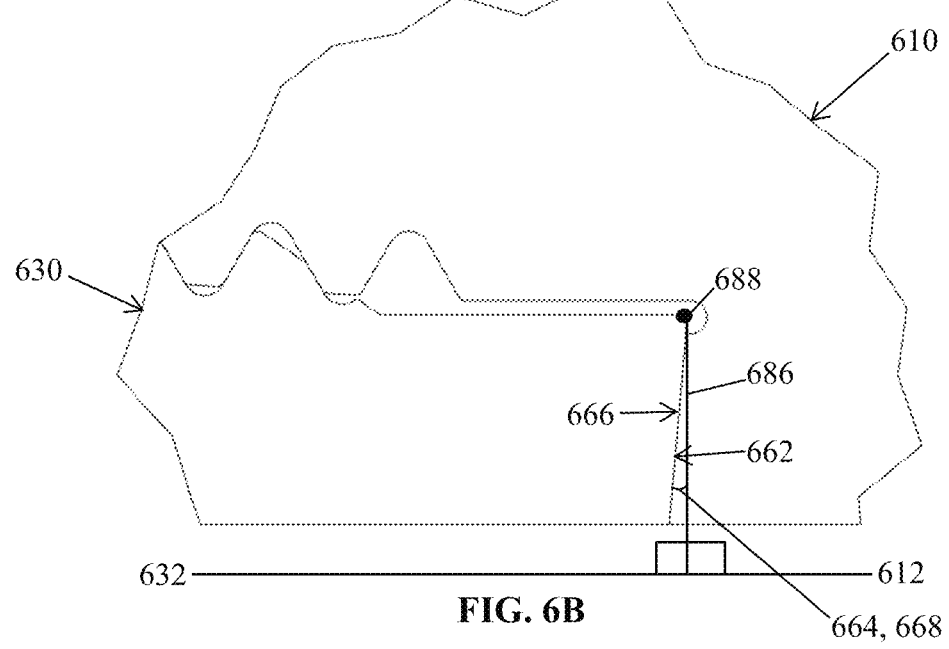
FIG. 6B illustrates a detailed view G in FIG. 6A, showing the angled secondary shoulder according to an embodiment of the present invention.
Figure 6A:
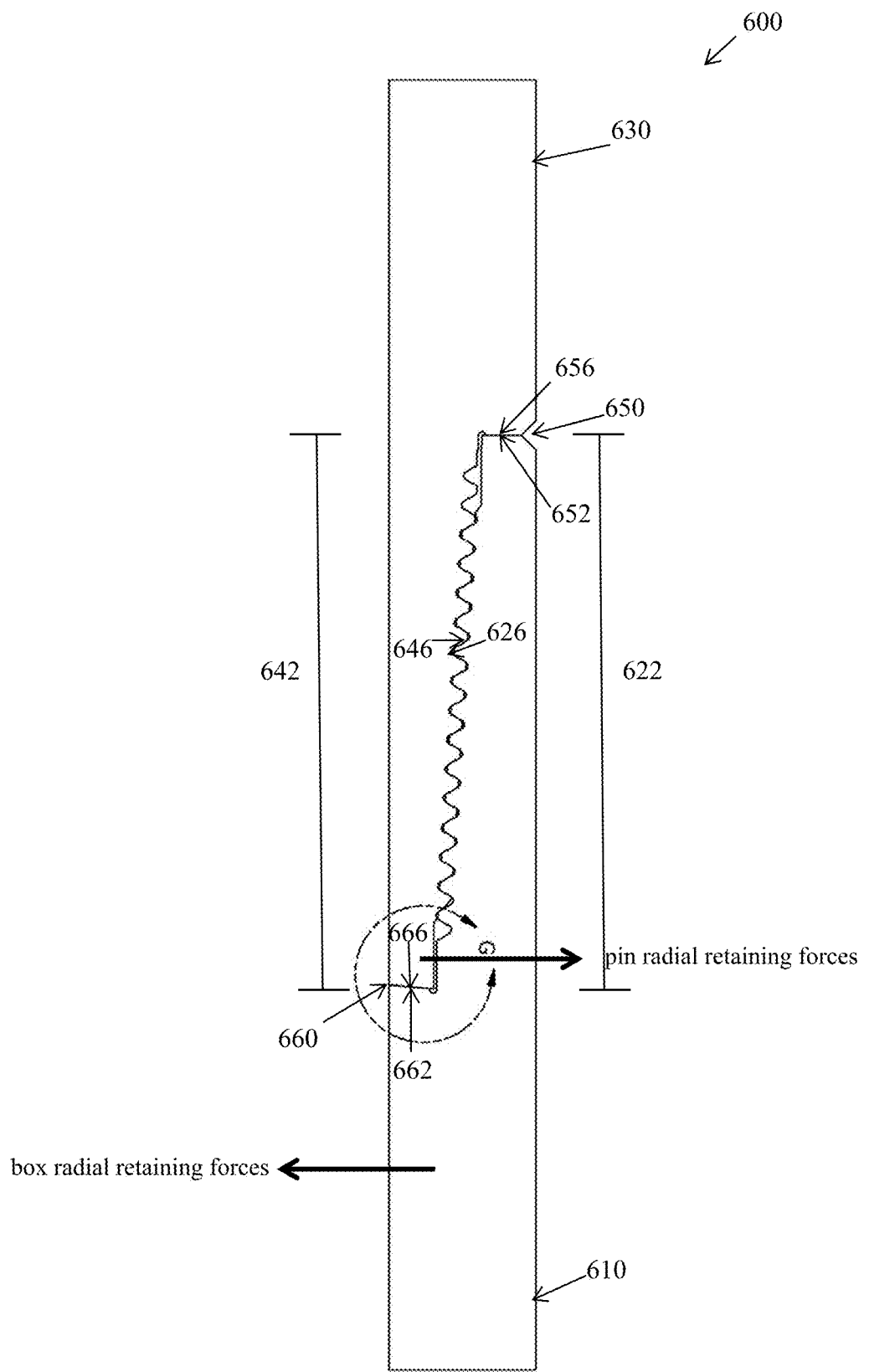
FIG. 6A illustrates a cross-sectional view of an improved double-shoulder connection with a standard primary shoulder and an angled secondary shoulder according to an embodiment of the present invention, showing box radial retaining forces and pin radial retaining forces.

In an embodiment, the secondary shoulder 160, 660 may be an angled secondary shoulder, as discussed below. As shown in FIGS. 6A-6B, the secondary shoulder 160, 660 comprises a secondary box shoulder 662 at a secondary box angle 664 with respect to a second perpendicular 686 to the box axis 612 at a second end point 688 of the box connection; and a secondary pin shoulder 666 at a secondary pin angle 668 with respect to a second perpendicular 686 to the pin axis 632 at the second end point 688 of the pin connection. See also FIG. 1A: 112 & FIG. 1B: 132 (showing box and pin made up).

Figure 17A:
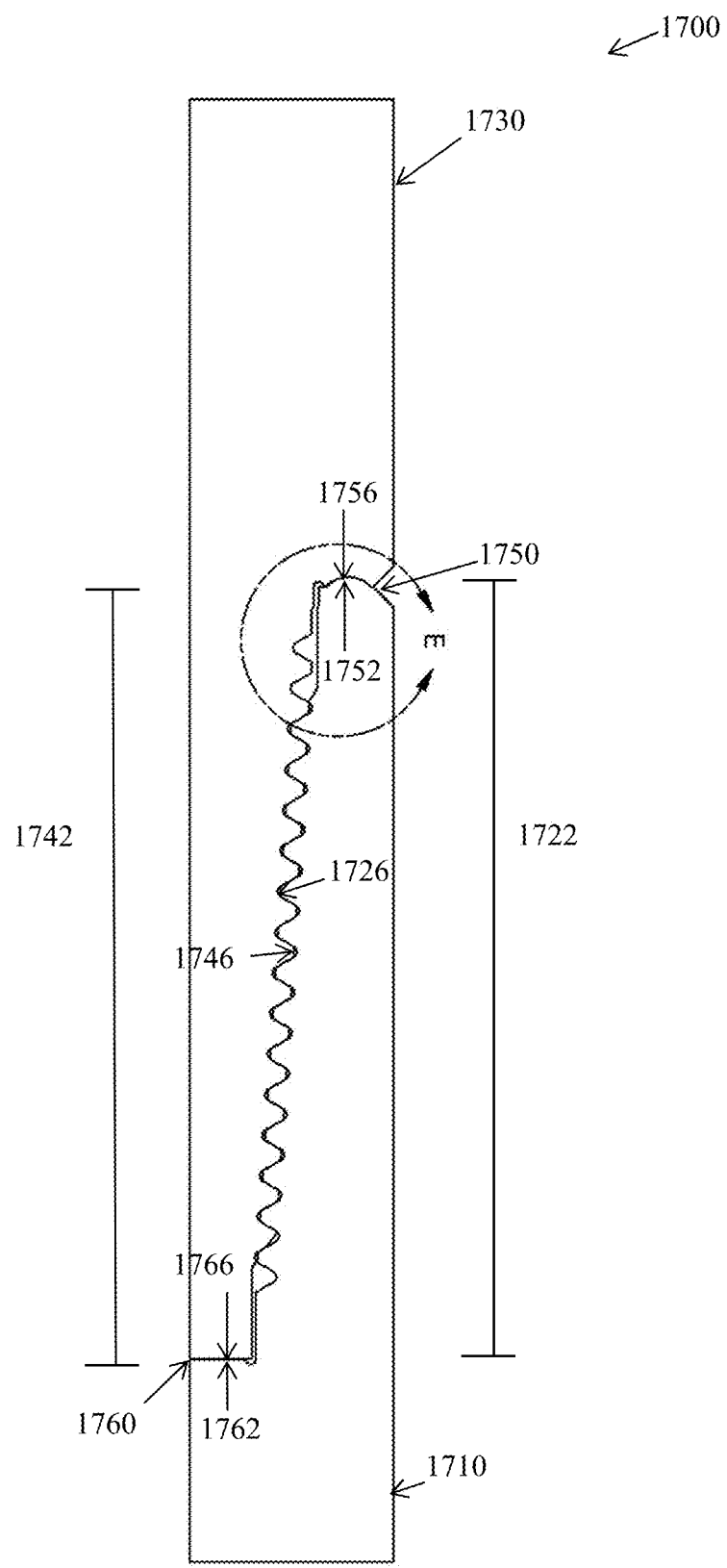
FIG. 17A illustrates a cross-sectional view of an improved double-shoulder connection with a curved primary shoulder and a standard secondary shoulder according to an embodiment of the present invention.
Figure 17B:
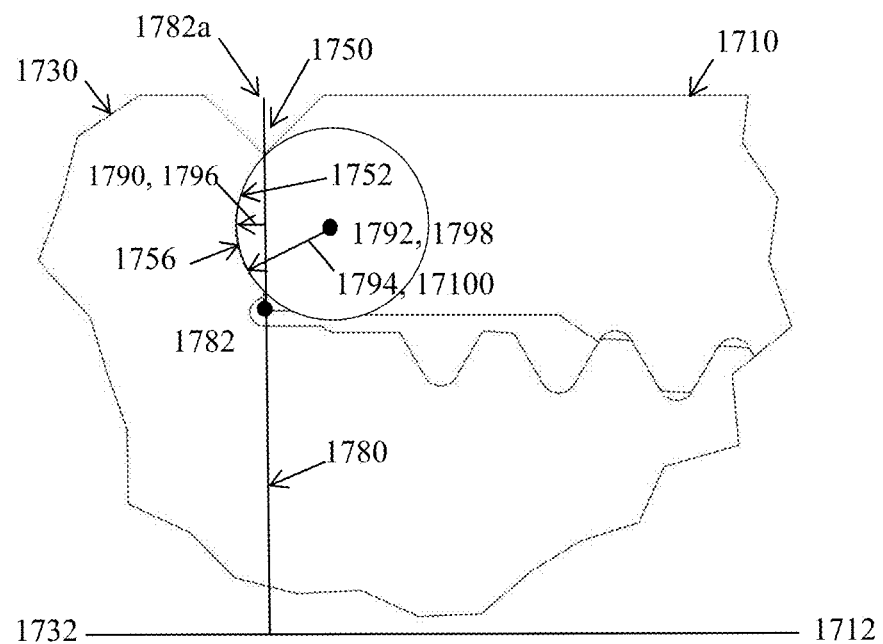
FIG. 17B illustrates a detailed view E in FIG. 17A, showing the curved primary shoulder according to an embodiment of the present invention.

In an embodiment, the primary shoulder 150, 1750 may be a curved primary shoulder. As shown in FIGS. 17A-17B, the primary shoulder 1750 comprises a primary box shoulder 1752 defined by a primary axial box radius height 1790, a primary box center point 1792 and a primary box radius 1794, and a primary pin shoulder defined by a primary axial pin radius height 1796, a primary pin center point 1798 and a primary pin radius 17100. See also FIG. 1A: 112 & FIG. 1B: 132 (showing box and pin made up).

Figure 19B:
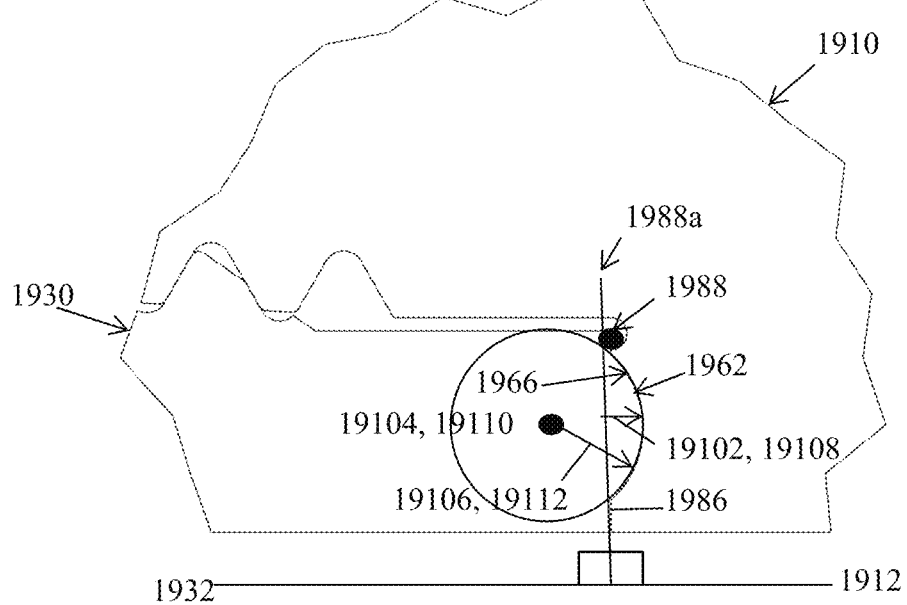
FIG. 19B illustrates a detailed view G in FIG. 19A, showing the curved secondary shoulder according to an embodiment of the present invention.
Figure 19A:
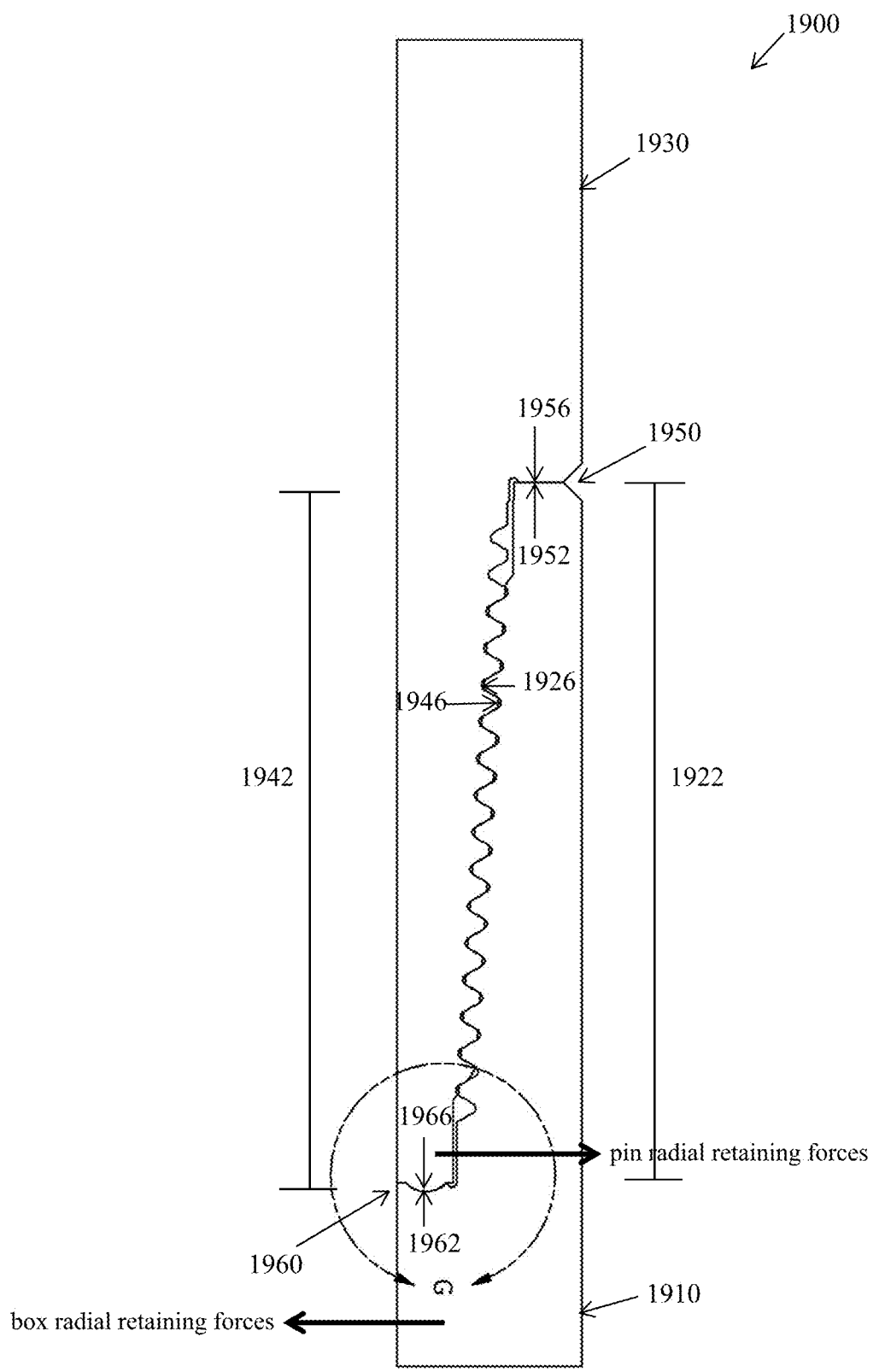
FIG. 19A illustrates a cross-sectional view of an improved double-shoulder connection with a standard primary shoulder and a curved secondary shoulder according to an embodiment of the present invention, showing box radial retaining forces and pin radial retaining forces.

In an embodiment, the secondary shoulder 160, 1960 may be a curved secondary shoulder. As shown in FIGS. 19A-19B, the secondary shoulder 1960 comprises a secondary box shoulder 1962 defined by a secondary box axial box radius height 19102, a secondary box center point 19104 and a secondary box radius 19106, and a secondary pin shoulder 1966 defined by a secondary axial pin radius height 19106, a secondary pin center point 19110 and a secondary pin radius 19112. See also FIG. 1A: 112 & FIG. 1B: 132 (showing box and pin made up).

Double-Shoulder Connection with Box and Pin Made-Up

Figure 1B:
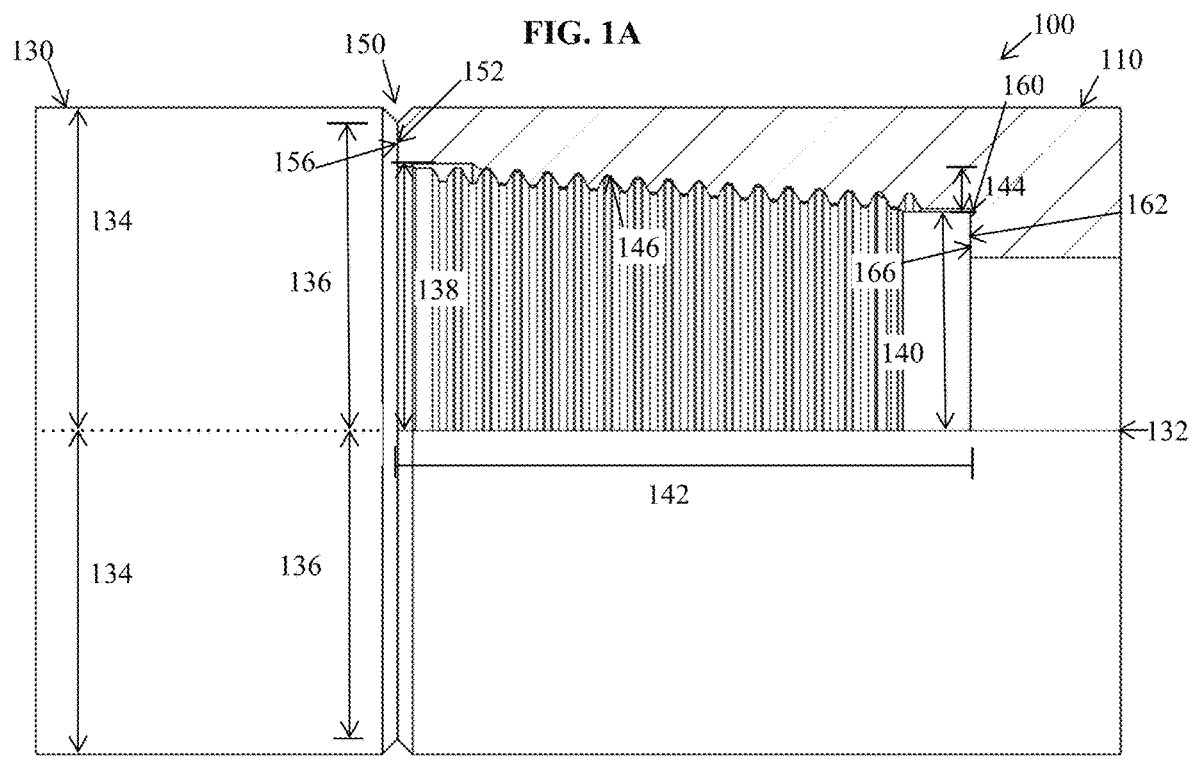
FIG. 1B illustrates the double-shoulder connection of FIG. 1A, showing pin connection features.

FIG. 1A illustrates a partial cross-sectional view of a double-shoulder connection 100 with a pin and box made-up (screwed together), showing box connection 110 features; and FIG. 1B illustrates the double-shoulder connection 100 of FIG. 1A, showing pin connection 130 features. As shown in FIGS. 1A & 1B, the double-shoulder connection 100 comprises a box connection 110 having a box axis (centerline) 112, a pin connection 130 having a pin axis (centerline) 132, a primary shoulder 150 and a secondary shoulder 160.

In an embodiment, the box connection 110 comprises a box axis (centerline) 112, a box outer radius 114, a box bevel radius 116, a box counter bore radius 118, a box inner radius 120, a box depth 122, a box taper 124 and box threads 126 cut along the box taper 124. The box connection 110 is a female, internally threaded half of the double-shoulder connection 100, similar to a nut. See FIGS. 1A & 1B.

In an embodiment, the pin connection 130 comprises a pin axis (centerline) 132, a pin outer radius 134, a pin bevel radius 136, a pin cylinder radius 138, a pin nose radius 140, a pin length 142, a pin taper 144 and pin threads 146 cut along the pin taper 144. The pin connection 130 is a male, externally threaded half of the double-shoulder connection 100, similar to a bolt. See FIGS. 1A & 1B.

In an embodiment, any suitable connection box/pin taper 124, 144 may be used for the box/pin connection 100. For example, suitable connection box/pin taper 124, 144 may be from about ¾ inch per foot to about 3 inches per foot, and any range or value there between.

In an embodiment, any suitable thread pitch may be used for the box threads 426, 526, 626, 726, 826, 926, 1026, 1226, 1426, 1726, 1826, 19, 26, 2026, 2126, 2226, 2326, 2426, 2626 and/or pin threads 446, 546, 646, 746, 846, 946, 1046, 1246, 1446, 1746, 1846, 1946, 2046, 2146, 2246, 2346, 2446, 2646. For example, suitable thread pitches may be from about 3 threads per inch to about 5 threads per inch, and any range or value there between.

In an embodiment, any suitable thread form 1100 may be used for the box threads 426, 526, 626, 726, 826, 926, 1026, 1226, 1426, 1726, 1826, 1926, 2026, 2126, 2226, 2326, 2426, 2626 and/or pin threads 446, 546, 646, 746, 846, 946, 1046, 1246, 1446, 1746, 1846, 1946, 2046, 2146, 2246, 2346, 2446, 2646. Suitable thread forms 1100 may have various crest 1110, 1112, flank 1130, 1140 and root 1160 shapes with an included angle 1150 from about 29 degrees to about 90 degrees, and any range or value there between, as discussed below.

Standard (Typical) Double Shoulder Connections

Figure 2A:
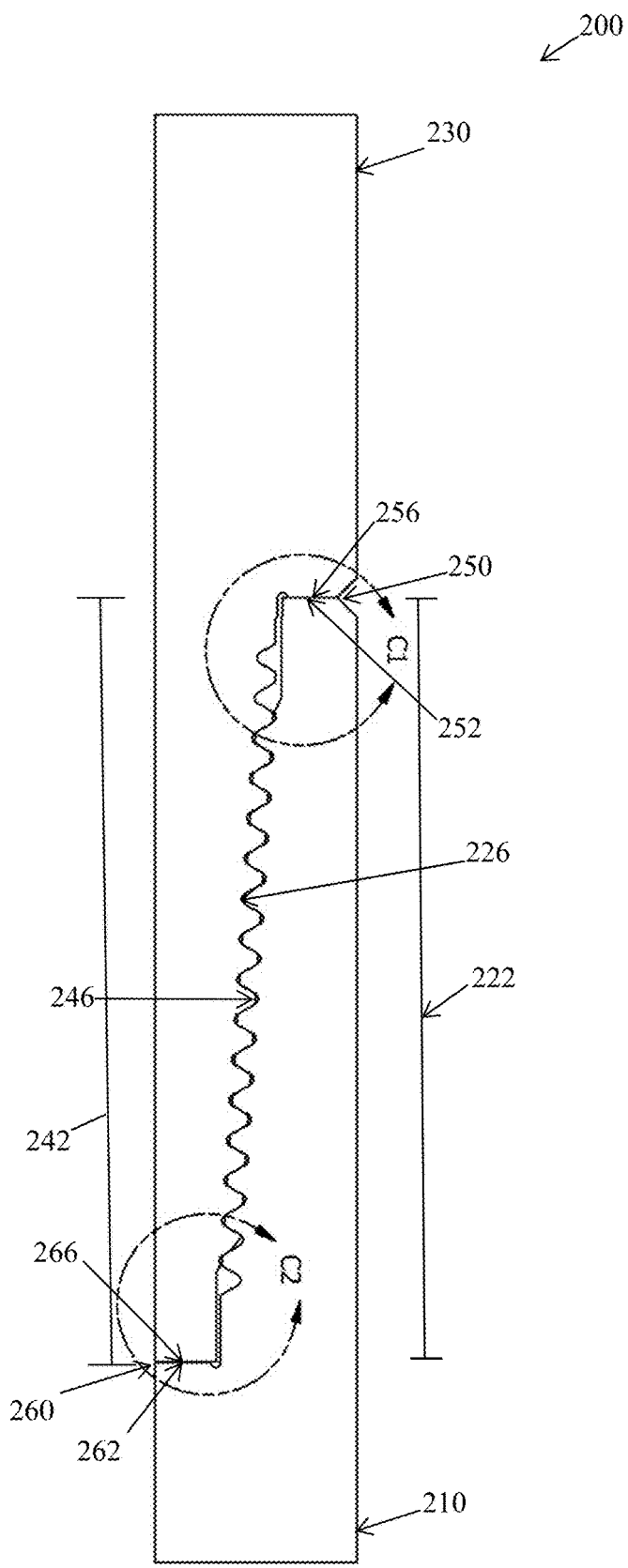
FIG. 2A illustrates a cross-sectional view of a standard (typical) double-shoulder connection, showing a standard primary shoulder connection and a standard secondary shoulder connection.

FIG. 2A illustrates a cross-sectional view of a standard (typical) double-shoulder 200 connection, showing a standard primary shoulder connection 250 and a standard secondary shoulder connection 260. As shown in FIG. 2A, the standard (typical) double-shoulder connection 200 comprises a box connection 210 having a box axis 112, a pin connection 230 having a pin axis 132, a primary shoulder 250 and a secondary shoulder 260.

The primary shoulder 250 comprises a primary box shoulder 252 at a primary box angle with respect to a first perpendicular 280 to the box axis 112 at a first end point 282 of the box connection; and a primary pin shoulder 256 at a primary pin angle with respect to the first perpendicular 280 to the pin axis 132 at the first end point 282 of the pin connection. See also FIG. 1A: 112 & FIG. 1B: 132 (showing box and pin made-up).

In a standard double-shoulder connection, the primary box angle is 0 degrees (i.e., primary box shoulder 252 is perpendicular to the box axis 112) and the primary pin angle is 0 degrees (i.e., primary pin shoulder 256 is perpendicular to the pin axis 132).

The secondary shoulder 260 comprises a secondary box shoulder 262 at a secondary box angle with respect to the box axis 112; and a secondary pin shoulder 266 at a secondary pin angle with respect to the pin axis 132. See also FIG. 1A: 112 & FIG. 1B: 132 (showing box and pin made-up).

In a standard double-shoulder connection, the secondary box angle is 0 degrees (i.e., secondary box shoulder 262 is perpendicular to the box axis 112) and the secondary pin angle is 0 degrees (i.e., secondary pin shoulder 266 is perpendicular to the pin axis 132).

Figure 2B:
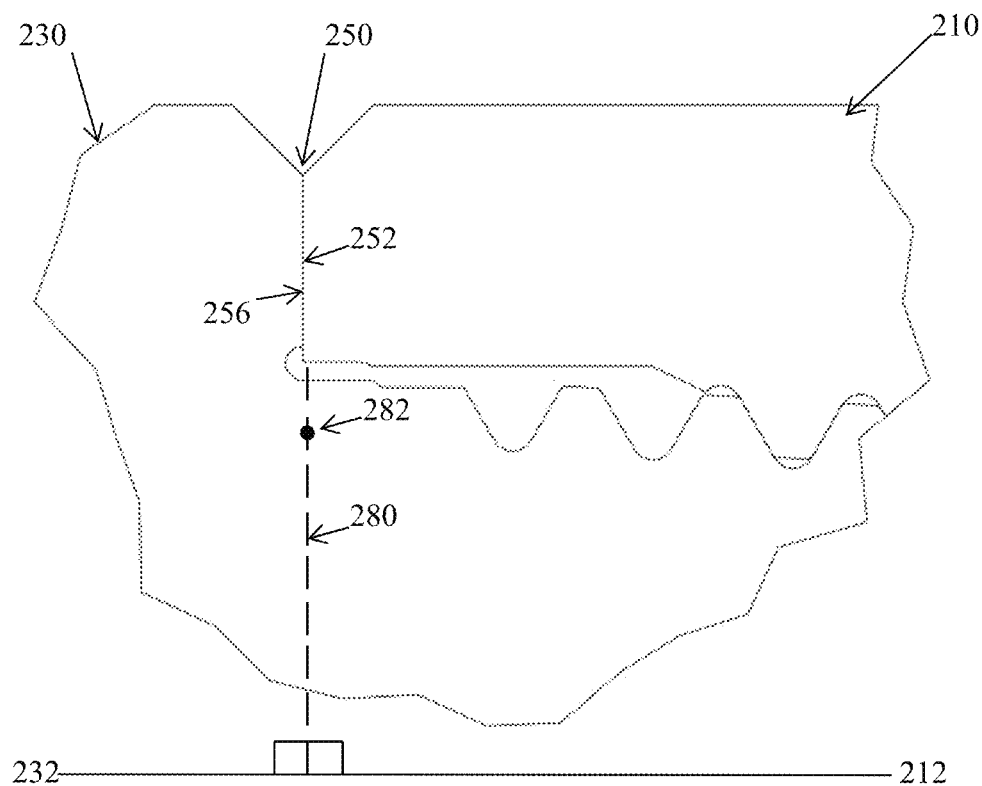
FIG. 2B illustrates a detailed view C1 in FIG. 2A, showing the standard primary shoulder connection.

FIG. 2B illustrates a detailed view C1 in FIG. 2A, showing the standard primary shoulder connection. As shown in FIG. 2B, the primary box angle is 0 degrees and the primary pin angle is 0 degrees.

Figure 2C:
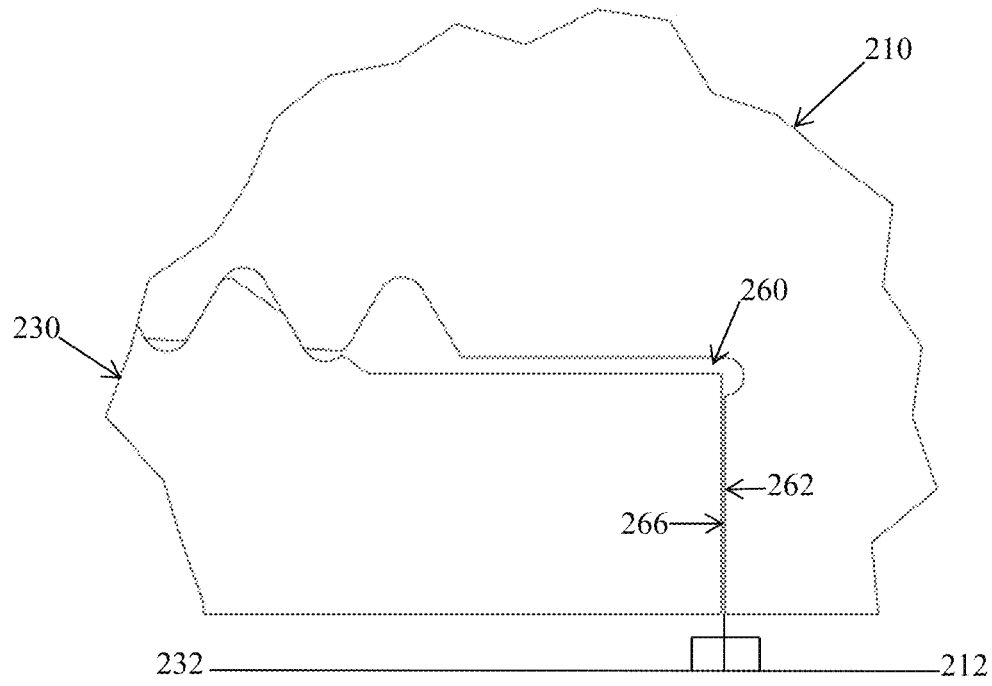
FIG. 2C illustrates a detailed view C2 in FIG. 2A, showing the standard secondary shoulder connection.

FIG. 2C illustrates a detailed view C2 in FIG. 2A, showing the standard secondary shoulder connection. As shown in FIG. 2C, the secondary box angle is 0 degrees and the secondary pin angle is 0 degrees.

Figure 3A:
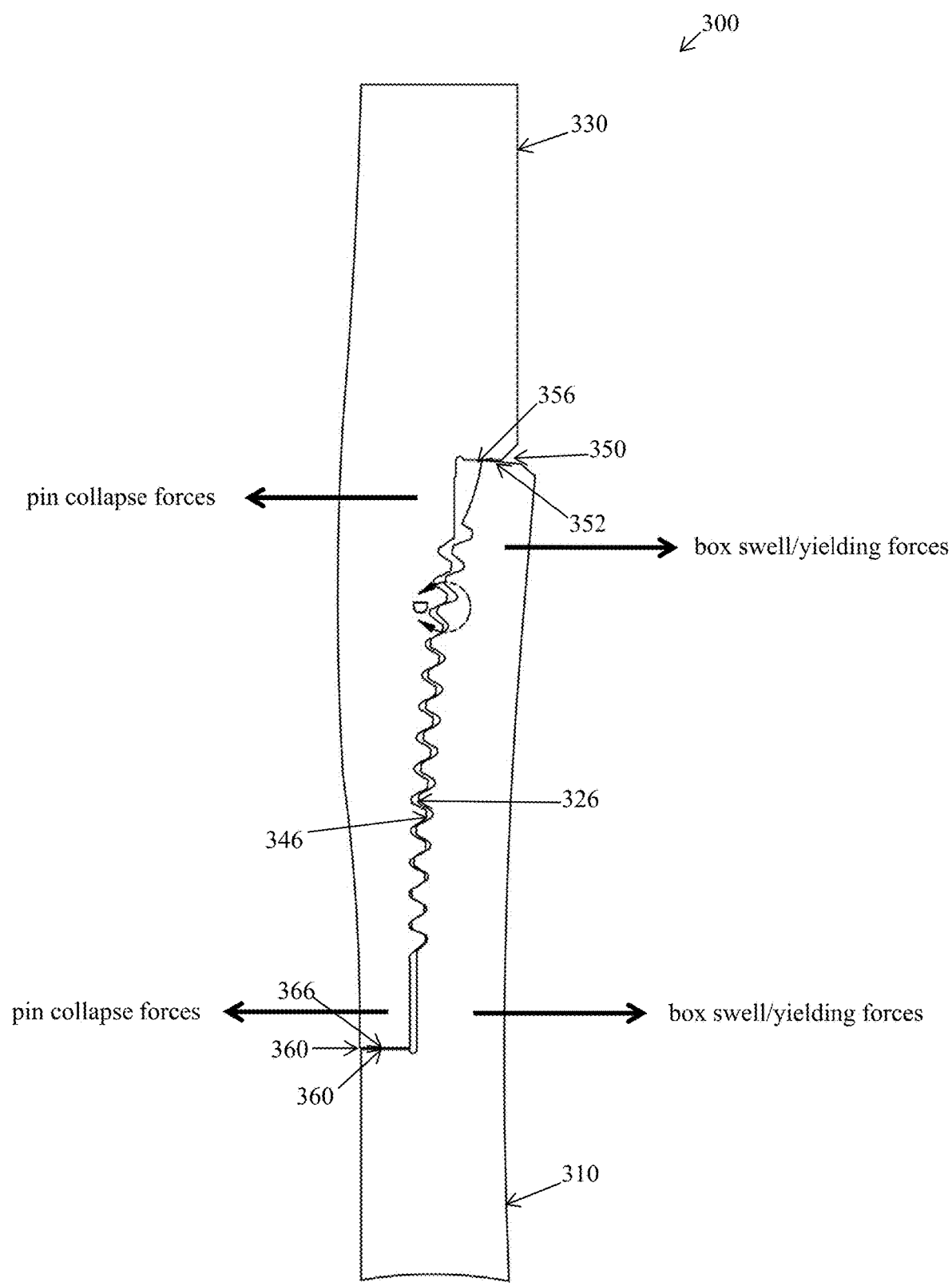
FIG. 3A illustrates a cross-sectional view of the standard (typical) double shoulder connection shown in FIG. 2A, showing an exaggerated deformation of the box connection and the pin connection for clarity purposes.

As discussed in the "Background of the Invention" section, standard (typical) double-shoulder connections 300 and standard (typical) single-shoulder connections suffer from the problem of box "swell" (e.g., box material yields) due to tapered threads, included thread profile angle (see FIG. 11: 1150) and high generated axial compressive loads. FIG. 3A illustrates a cross-sectional view of the standard (typical) double-shoulder connection 200, 300 shown in FIG. 2A, showing an exaggerated deformation of the box connection 210, 310 and the pin connection 230, 330 for clarity purposes.

Standard (typical) double shoulder connection 200, 300 and standard (typical) single shoulder connections suffer from the problem of box swell (e.g., box material yields). As shown in FIG. 3A, the box swell/yielding forces force the primary shoulder 350 of the box connection 310 outward such that the box connection 210, 310 swells (e.g., box material yields), causing deformation of and/or permanent damage to the box connection 210, 310.

Standard (typical) double-shoulder connections 200, 300 and standard (typical) single-shoulder connections also suffer from the problem of pin collapse. As shown in FIG. 3A, the pin collapse forces push a portion of the pin nose inward, causing deformation of and/or permanent damage to the pin connection 230, 330.

Figure 3B:
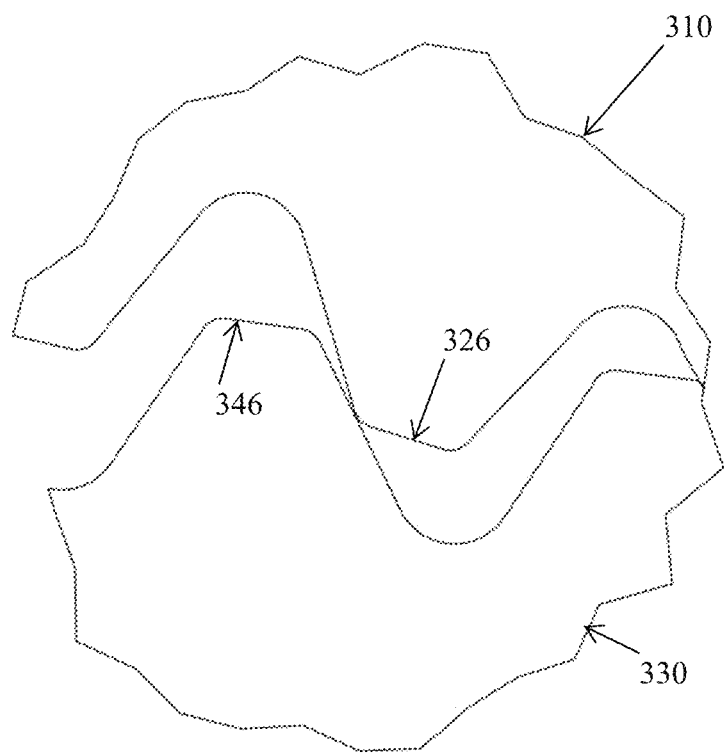
FIG. 3B illustrates a detailed view D in FIG. 3A, showing a thread misalignment.

Further, the cyclic box swell/yielding forces are transmitted into, for example, a first pin thread and a second pin thread resulting in damage to the first pin thread and the second pin thread (i.e., initially causing cracks at the root of the pin threads and, ultimately, failure of the pin threads). This combination of box swell (e.g., box material yields) and pin collapse can lead to misalignment of the box threads 226, 326 and the pin threads 246, 346, as well as permanent damage to the box connection 210, 310 and/or the pin connection 230, 330. FIG. 3B illustrates a detailed view D in FIG. 3A, showing a thread misalignment. As shown in FIG. 3B, the box threads 226, 326 are misaligned with the pin threads 246, 346, causing damage to the box threads 226, 326 and/or the pin threads 246, 346.

In addition, this combination of box swell and pin collapse, in conjunction with high alternating axial, torsional, and bending loads, can lead to premature fatigue failure (e.g., material yields) of the standard (typical) double-shoulder connection 200, 300 and the standard (typical) single-shoulder connection, damage to the box threads 226, 326 and/or the pin threads 246, 346, and permanent deformation of the box connection 210, 310 and/or the pin connection 230, 330.

Improved Double-Shoulder Connections with Angled Primary Shoulder and/or Secondary Shoulder An angled primary shoulder 450 reduces box swell (e.g., box materials yields) and provides better alignment of the box threads 426 and pin threads 446 in an improved double-shoulder connection 400. The angled primary shoulder 450 provides an avenue for compressive forces and elevated torques while drilling to move axially and inward into the pin connection, reducing box swell. The angled primary shoulder 450 also balances compressive forces between the primary and secondary shoulder connections. FIG. 4A illustrates a cross-sectional view of an improved double-shoulder connection 400 with an angled primary shoulder 450 and a standard secondary shoulder 460 according to an embodiment of the present invention. As shown in FIG. 4A, the improved double-shoulder connection 400 comprises a box connection 410 having a box axis (centerline) 412, a pin connection 430 having a pin axis (centerline) 432, a primary shoulder 450, and a secondary shoulder 460.

In an embodiment, the primary shoulder 450 comprises a primary box shoulder 452 at a primary box angle 454 with respect to a first perpendicular 480 to the box axis 412 at a first end point 482 of the box connection; and a primary pin shoulder 456 at a primary pin angle 458 with respect to a first perpendicular 480 to the pin axis 432 at the first end point 482 of the pin connection. See also FIG. 1A: 112 & FIG. 1B: 132 (showing box and pin made up). In an embodiment, the first end point 482 may be equal to a datum intersection, as discussed below.

In an embodiment, the primary box shoulder 452 may be any suitable shape. For example, suitable shapes include, but are not limited to, conical shaped, cylindrical shaped, conical-cylindrical shaped, and variations thereof. In an embodiment, the primary box shoulder 452 may be conical shaped (outside of cone, male).

In an embodiment, the primary pin shoulder 456 may be any suitable shape. For example, suitable shapes include, but are not limited to, conical shaped, cylindrical shaped, conical-cylindrical shaped, and variations thereof. In an embodiment, the primary pin shoulder 456 may be conical shaped (inside of cone, female).

In an embodiment, the primary box shoulder 452 may be any suitable profile. For example, suitable profiles include, but are not limited to angled profiles. In an embodiment, the primary box shoulder 452 may be an angled profile defined by a primary box angle 454, as discussed below.

In an embodiment, the primary box angle 454 may be from greater than about 0 degrees to less than or equal to about 15 degrees, and any range or value there between. In an embodiment, the primary box angle 454 may be from greater than about 0 degrees to less than or equal to about 10 degrees. In an embodiment, the primary box angle 454 may be about 5 degrees.

In an embodiment, the primary pin shoulder 456 may be any suitable profile. For example, suitable profiles include, but are not limited to, angled profiles. In an embodiment, the primary pin shoulder 456 may be an angled profile defined by a primary pin angle 458, as discussed below.

In an embodiment, the primary pin angle 458 may be from greater than about 0 degrees to less than or equal to about 15 degrees, and any range or value there between. In an embodiment, the primary pin angle 458 may be from greater than about 0 degrees to less than or equal to about 10 degrees. In an embodiment, the primary pin angle 458 may be about 5 degrees.

In an embodiment, the primary box angle 454 may be about equal to the primary pin angle 458 to form a first seal.

In an embodiment, the primary box angle 454 may be slightly different from the primary pin angle 458 to form a first seal. In an embodiment, the first seal may be a gas-tight seal.

FIG. 4B illustrates a detailed view E in FIG. 4A, showing the angled primary shoulder 450 according to an embodiment of the present invention. As shown in FIG. 4B, the primary box angle may be from greater than about 0 degrees to less than or equal to about 15 degrees, and the primary pin angle may be from greater than about 0 degrees to less than or equal to about 15 degrees. See also FIG. 2B (showing a standard primary shoulder 250).

In an embodiment, the secondary shoulder 460 comprises a secondary box shoulder 462 at a secondary box angle with respect to a second perpendicular to the box axis at a second end point of the box connection; and a secondary pin shoulder 466 at a secondary pin angle with respect to the second perpendicular to the pin axis at the second end point of the pin connection. See also FIG. 1A: 112 & FIG. 1B: 132 (showing box and pin made-up).

In an embodiment, the secondary box shoulder 462 may be any suitable shape. For example, suitable shapes include, but are not limited to, conical shaped, cylindrical shaped, conical-cylindrical shaped, and variations thereof. In an embodiment, the secondary box shoulder 462 may be conical shaped (outside of cone, male).

In an embodiment, the secondary pin shoulder 466 may be any suitable shape. For example, suitable shapes include, but are not limited to, conical shaped, cylindrical shaped, conical-cylindrical shaped, and variations thereof. In an embodiment, the secondary pin shoulder 466 may be conical shaped (inside of cone, female).

In an embodiment, the secondary box shoulder 462 may be any suitable profile. For example, suitable profiles include, but are not limited to angled profiles. In an embodiment, the secondary box shoulder 462 may be an angled profile defined by a secondary box angle, as discussed below.

In an embodiment, the secondary box angle may be from greater than or equal to about 0 degrees to less than or equal to about 15 degrees, and any range or value there between. In an embodiment, the secondary box angle may be from greater than or equal to about 0 degrees to less than or equal to about 10 degrees. In an embodiment, the secondary box angle may be about 5 degrees. In an embodiment, the secondary box angle may be about 0 degrees. See FIG. 4A-4B.

In an embodiment, the secondary pin shoulder 466 may be any suitable profile. For example, suitable profiles include, but are not limited to, angled profiles. In an embodiment, the secondary pin shoulder 466 may be an angled profile defined by a primary pin angle, as discussed below.

In an embodiment, the secondary pin angle may be from greater than to equal to about 0 degrees to less than or equal to about 15 degrees, and any range or value there between. In an embodiment, the secondary pin angle may be from greater than or equal to about 0 degrees to less than or equal to about 10 degrees. In an embodiment, the secondary pin angle may be about 5 degrees. In an embodiment, the secondary pin angle may be about 0 degrees. See FIGS. 4A-4B.

In a standard secondary shoulder 460, the secondary box angle is 0 degrees (i.e., secondary box shoulder 462 is perpendicular to the box axis 412) and the secondary pin angle is 0 degrees (i.e., secondary pin shoulder 466 is perpendicular to the pin axis 432).

In an embodiment, the secondary box angle may be about equal to the secondary pin angle to form a torque shoulder.

In an embodiment, the secondary box angle may be slightly different from the secondary pin angle to form a torque shoulder that is a second seal. In an embodiment, the torque shoulder or the second seal may be a gas-tight seal.

FIG. 4A illustrates the standard secondary shoulder 460 according to an embodiment of the present invention. As shown in FIG. 4A, the secondary box angle is 0 degrees; and the secondary pin angle is 0 degrees. See also FIG. 2C (showing a standard secondary shoulder).

Figure 5A:
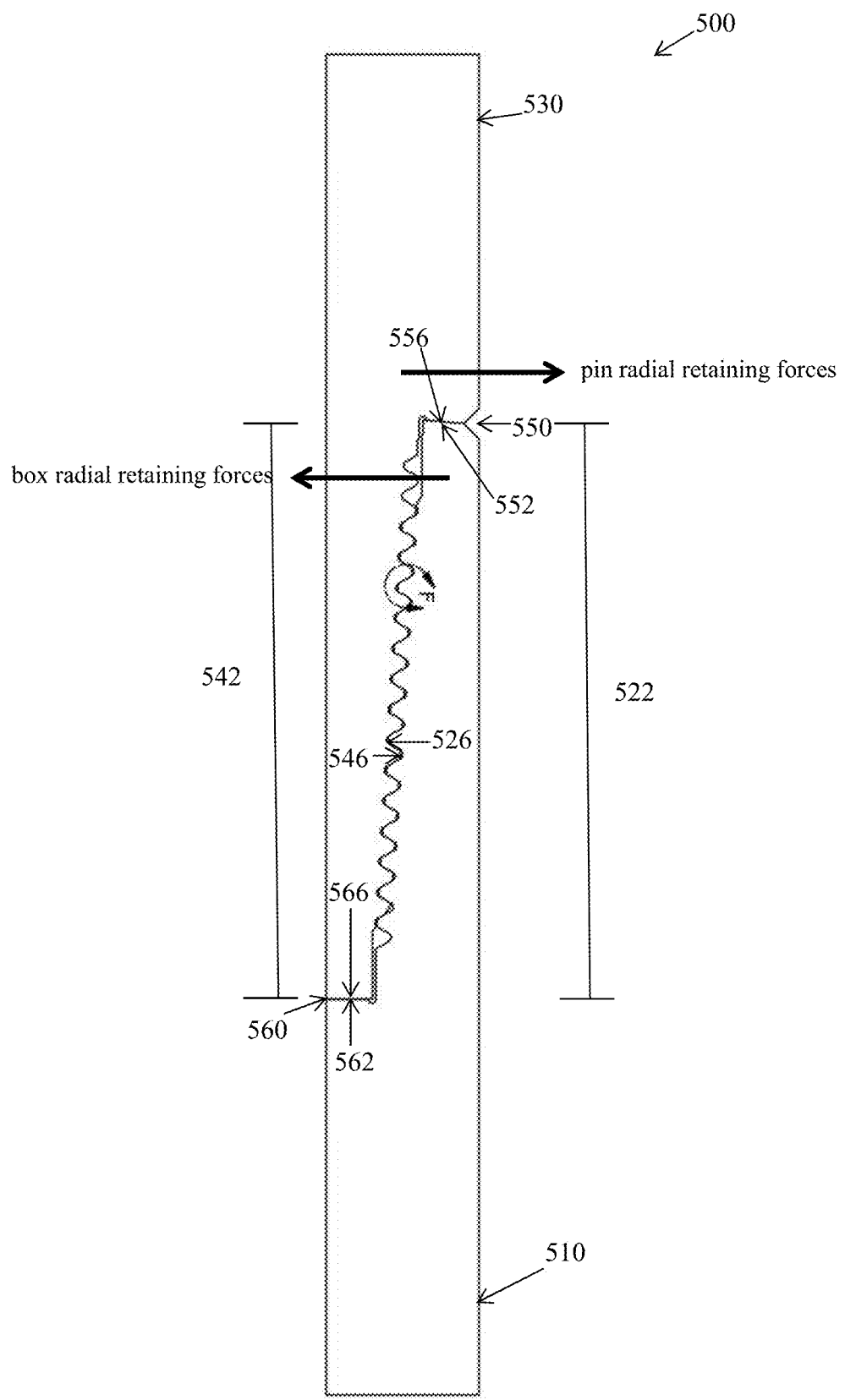
FIG. 5A illustrates a cross-sectional view of the improved double-shoulder connection of FIG. 4A, showing box radial retaining forces and pin radial retaining forces.

As discussed above, an angled primary shoulder 450, 550 reduces box swell (e.g., box materials yields) and provides better alignment of the box threads 426, 526 and pin threads 446, 546 in an improved double-shoulder connection 400, 500. The angled primary shoulder 450, 550 provides an avenue for compressive forces and elevated torques while drilling to move axially and radially (i.e., inward) into the pin connection, reducing box swell (e.g., box material yields). The angle primary shoulder 450, 550 also balances compressive forces between the primary and secondary shoulder connections. FIG. 5A illustrates a cross-sectional view of the improved double-shoulder connection 400, 500 of FIG. 4A, showing box radial retaining forces and pin radial retaining forces. As shown in FIG. 5A, the angled primary shoulder 450, 550 reduces the box swell/yielding forces shown in FIG. 3A. See also FIG. 3A (showing a standard primary shoulder 350). In other words, the box radial retaining forces generated by the angled primary shoulder 450, 550 reduce the box swell/yielding forces, reducing box swell (e.g., box material yield).

As shown in FIG. 5A, the angled primary shoulder 450, 550 also reduces the pin collapse forces shown in FIG. 3A. See also. FIG. 3A (showing a standard primary shoulder 350). In other words, the pin radial retaining forces generated by the angled primary shoulder 450, 550 reduce the pin collapse forces, reducing pin collapse.

Figure 5B:
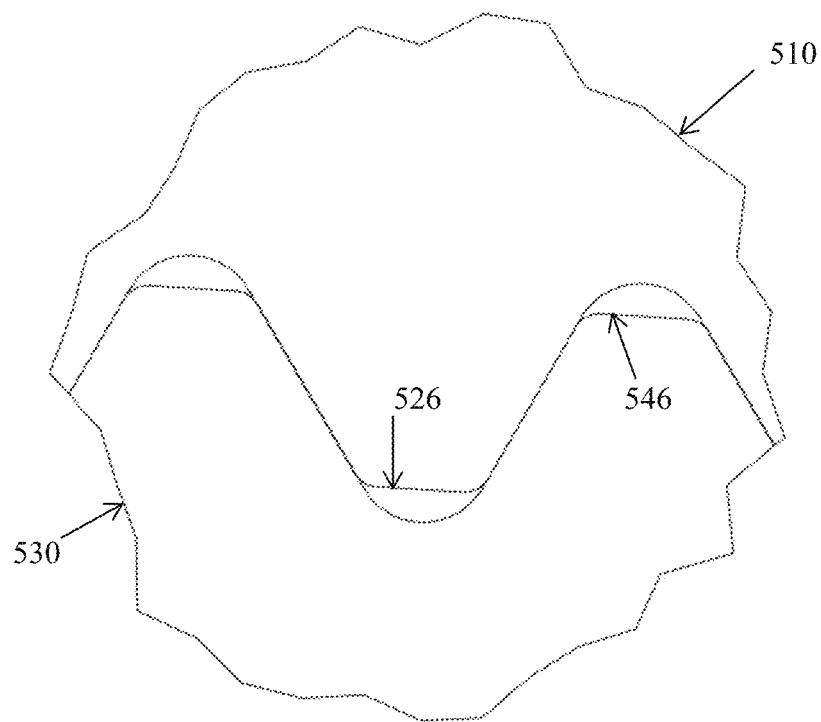
FIG. 5B illustrates a detailed view F in FIG. 5A, showing improved thread alignment.

As discussed with respect to the standard double-shoulder connection, the combination of box swell and pin collapse can lead to misalignment of the box threads 426, 526 and the pin threads 446, 546, as well as permanent damage to the box connection 410, 510 and/or the pin connection 430, 530. See also FIG. 3A (showing a standard primary shoulder 350) & 3B (showing misaligned threads 326, 346). FIG. 5B illustrates a detailed view F in FIG. 5A, showing improved thread alignment. As shown in FIG. 5B, the box threads 526 are aligned with the pin threads 546.

Figure 7:
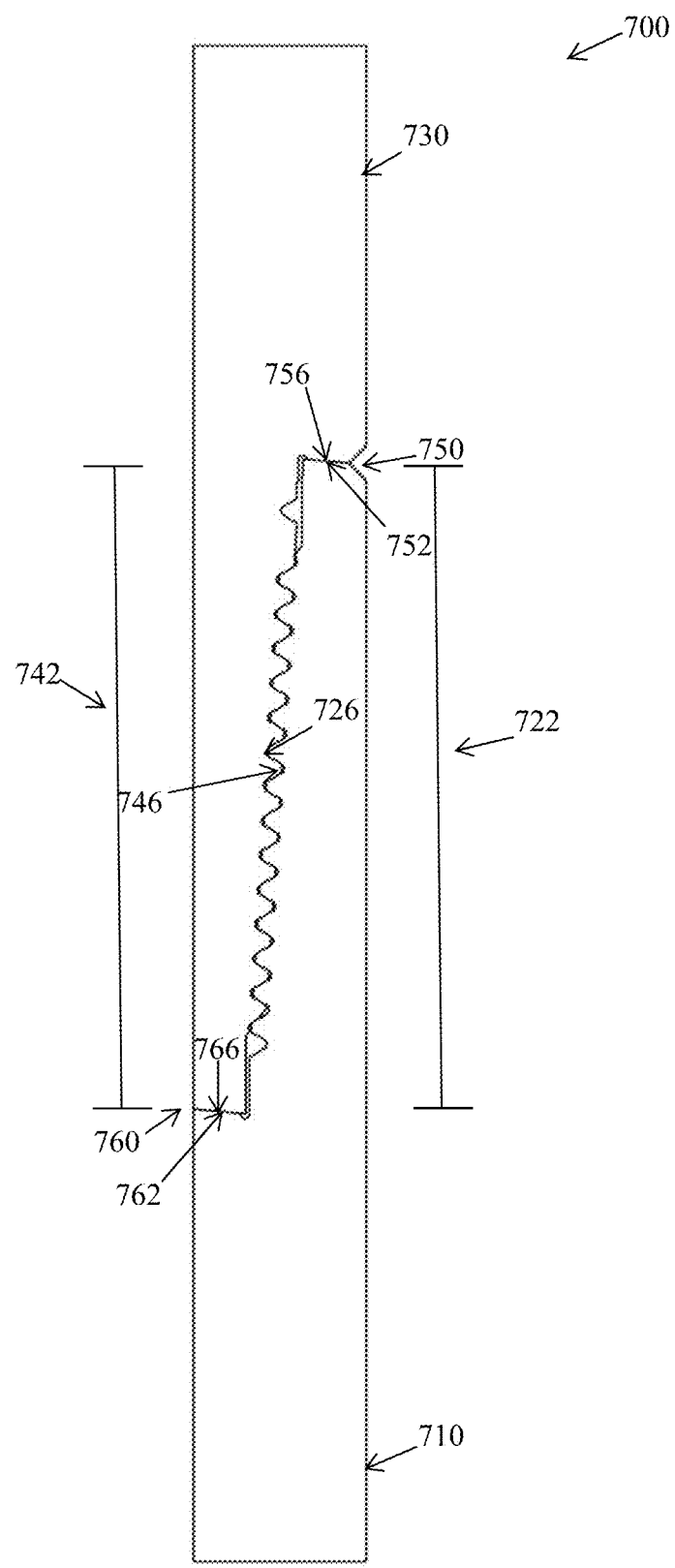
FIG. 7 illustrates a cross-sectional view of an improved double-shoulder connection with an angled primary shoulder and an angled secondary shoulder according to an embodiment of the present invention.

FIG. 6A illustrates a cross-sectional view of an improved double-shoulder connection 600 with a standard primary shoulder 650 and an angled secondary shoulder 660 according to an embodiment of the present invention; and FIG. 7 illustrates a cross-sectional view of an improved double-shoulder connection with an angled primary shoulder and an angled secondary shoulder according to an embodiment of the present invention. As shown in FIGS. 6A and 7, the improved double-shoulder connection 600, 700 comprises a box connection 610, 710 having a box axis (centerline) 612, a pin connection 630, 730 having a pin axis (centerline) 632, a primary shoulder 650, 750, and a secondary shoulder 660, 760.

In an embodiment, the primary shoulder 650, 750 comprises a primary box shoulder 652, 752 at a primary box angle with respect to a first perpendicular to the box axis 612 at a first end point of the box connection; and a primary pin shoulder 656, 756 at a primary pin angle with respect to the first perpendicular to the pin axis 632 at the first end point of the pin connection. See also FIG. 1A: 112 & FIG. 1B: 132 (showing box and pin made-up). In an embodiment, the first end point may be equal to a datum intersection, as discussed below.

In an embodiment, the primary box shoulder 652, 752 may be any suitable shape. For example, suitable shapes include, but are not limited to, conical shaped, cylindrical shaped, conical-cylindrical shaped, and variations thereof. In an embodiment, the primary box shoulder 752 may be conical shaped (outside of cone, male).

In an embodiment, the primary pin shoulder 656, 756 may be any suitable shape. For example, suitable shapes include, but are not limited to, conical shaped, cylindrical shaped, conical-cylindrical shaped, and variations thereof. In an embodiment, the primary pin shoulder 756 may be conical shaped (inside of cone, female).

In an embodiment, the primary box shoulder 652, 752 may be any suitable profile. For example, suitable profiles include, but are not limited to angled profiles. In an embodiment, the primary box shoulder 652, 752 may be an angled profile defined by a primary box angle, as discussed below.

In an embodiment, the primary box angle may be from greater than or equal to about 0 degrees to less than or equal to about 15 degrees, and any range or value there between. See FIG. 7. In an embodiment, the primary box angle may be from greater than or equal to about 0 degrees to less than or equal to about 10 degrees. In an embodiment, the primary box angle may be about 5 degrees. In an embodiment, the primary box angle is about 0 degrees. See FIGS. 6A-6B.

In an embodiment, the primary pin shoulder 656, 756 may be any suitable profile. For example, suitable profiles include, but are not limited to, angled profiles. In an embodiment, the primary pin shoulder 656, 756 may be an angled profile defined by a primary pin angle, as discussed below.

In an embodiment, the primary pin angle may be from greater than or equal to about 0 degrees to less than or equal to about 15 degrees, and any range or value there between. See FIG. 7. In an embodiment, the primary pin angle may be from greater than or equal to about 0 degrees to less than or equal to about 10 degrees. In an embodiment, the primary pin angle may be about 5 degrees. In an embodiment, the primary pin angle may be about 0 degrees. See FIGS. 6A-6B.

In a standard primary shoulder 650, the primary box angle is 0 degrees (i.e., primary box shoulder 652 is perpendicular to the box axis 112) and the primary pin angle is 0 degrees (i.e., primary pin shoulder 656 is perpendicular to the pin axis 132). See FIGS. 6A-6B.

In an embodiment, the primary box angle may be about equal to the primary pin angle to form a first seal.

In an embodiment, the primary box angle may be slightly different from the primary pin angle to form a first seal. In an embodiment, the first seal may be a gas-tight seal.

In an embodiment, the secondary shoulder 660, 760 comprises a secondary box shoulder 662, 762 at a secondary box angle 664 with respect to a second perpendicular 686 to the box axis 612 at a second end point 688 of the box connection; and a secondary pin shoulder 666, 766 at a secondary pin angle 668 with respect to the second perpendicular 686 to the pin axis 632 at the second end point 688 of the pin connection. See also FIG. 1A: 112 & FIG. 1B: 132 (showing box and pin made-up).

In an embodiment, the secondary box shoulder 662, 762 may be any suitable shape. For example, suitable shapes include, but are not limited to, conical shaped, cylindrical shaped, conical-cylindrical shaped, and variations thereof. In an embodiment, the secondary shoulder 662, 762 may be conical shaped (outside of cone, male).

In an embodiment, the secondary pin shoulder 666, 766 may be any suitable shape. For example, suitable shapes include, but are not limited to, conical shaped, cylindrical shaped, conical-cylindrical shaped, and variations thereof. In an embodiment, the secondary pin shoulder 666, 766 may be conical shaped (inside of cone, female).

In an embodiment, the secondary box shoulder 662, 762 may be any suitable profile. For example, suitable profiles include, but are not limited to, angled profiles. In an embodiment, the secondary box shoulder 662, 762 may be an angled profile defined by a secondary box angle 664, as discussed below.

In an embodiment, the secondary box angle 664 may be from greater than or equal to about 0 degrees to less than or equal to about 15 degrees, and any range or value there between. See also FIG. 7. In an embodiment, the secondary box angle 664 may be from greater than or equal to about 0 degrees to less than or equal to about 10 degrees. In an embodiment, the secondary box angle 664 may be about 5 degrees.

In an embodiment, the secondary pin shoulder 666, 766 may be any suitable profile. For example, suitable profiles include, but are not limited to, angled profiles. In an embodiment, the secondary pin shoulder 666, 766 may be an angled profile defined by a secondary pin angle 668, as discussed below.

In an embodiment, the secondary pin angle 668 may be from greater than or equal to about 0 degrees to less than or equal to about 15 degrees, and any range or value there between. See also FIG. 7. In an embodiment, the secondary pin angle 668 may be from greater than or equal to about 0 degrees to less than or equal to about 10 degrees. In an embodiment, the secondary pin angle 668 may be about 5 degrees.

In an embodiment, the secondary box angle 664 may be about equal to the secondary pin angle 668 to form a torque shoulder.

In an embodiment, the secondary box angle 664 may be slightly different from the secondary pin angle 668 to form a torque shoulder. In an embodiment, the torque shoulder may be a gas-tight seal.

FIG. 6B illustrates a detailed view G in FIG. 6A, showing the angled secondary shoulder 660 according to an embodiment of the present invention. As shown in FIG. 6B, the secondary box angle 664 may be from greater than or equal to about 0 degrees to less than or equal to about 15 degrees; and the secondary pin angle 668 may be from greater than or equal to about 0 degrees to less than or equal to about 15 degrees.

As discussed above, an angled secondary shoulder 660 reduces box swell (e.g., box materials yields) in an improved double-shoulder connection 600. The angled secondary shoulder 660 provides an avenue for compressive forces and elevated torques while drilling to move axially and radially (i.e., inward) into the pin connection, reducing box swell (e.g., box material yields). The angled secondary shoulder 660 also balances compressive forces between the primary and secondary shoulder connections. FIG. 6A illustrates a cross-sectional view of the improved double-shoulder connection 600, showing box radial retaining forces and pin radial retaining forces. As shown in FIG. 6A, the angled secondary shoulder 660 reduces the box swell/yielding forces shown in FIG. 3A. See also FIG. 3A (showing a standard secondary shoulder 360). In other words, the box radial retaining forces generated by the angled secondary shoulder 660 reduce the box swell/yielding forces, reducing box swell (e.g., box material yields).

As shown in FIG. 6A, the angled secondary shoulder 660 also reduces the pin collapse forces shown in FIG. 3A. See also. FIG. 3A (showing a standard secondary shoulder 360). In other words, the pin radial retaining forces generated by the angled secondary shoulder 660 reduce the pin collapse forces, reducing pin nose diving.

As discussed with respect to the standard double-shoulder connection, the combination of box swell and pin collapse can lead to permanent damage to the box connection 610 and/or the pin connection 630 as shown in FIG. 3A. See also FIG. 3A (showing a standard secondary shoulder 360).

In an embodiment, the improved double-shoulder connection 400, 500, 600, 700, 1200, 1400 may be made of any suitable material. For example, suitable materials include, but are not limited to, low alloy steels (e.g., 4140, 4145, 4330, etc.), stainless steels (e.g., 17-4, 304, 316, etc.), super alloys (e.g., Inconel), titanium alloys (e.g., Ti-6Al-4V, Ti-6Al-6V-25n, etc.), copper alloys (e.g., Beryllium copper), cobalt alloys (e.g., Stellite), aluminum alloys (e.g., 2024, 6061, 7075, etc.), and combinations and variations thereof. In an embodiment, the improved double-shoulder connection 400, 500, 600, 700, 1200, 1400 may be low alloy steels or stainless steels.

In an embodiment, the improved double-shoulder connection 400, 500, 600, 700, 1200, 1400 may be applied to any suitable product. For example, suitable products include, but are not limited to, drill pipe (DP), heavy weight drill pipe (HWDP), drill collars (DC), pup joints, crossover subs, saver subs, bit subs, float subs, pump-in subs, inside blowout preventers (IBOP), top drive shafts, top drive valves, safety valves, kelly valves, hoisting equipment (e.g., lift subs, lift plugs), swivels, fishing tools, mud motors, rotary steerable tools, drill bits, directional drilling bottom hole assembly (BHA) components, measurement while drilling (MWD) components, logging while drilling (LWD) components, well cleanout tools (e.g., brushes, magnets), completion tools, and combinations and variations thereof. In an embodiment, the improved double-shoulder connection 400, 500, 600, 700, 1200, 1400 may be applied to drill pipe (DP) or heavy weight drill pipe (HWDP) or drill collars (DC) or pup joints.

In an embodiment, the improved double-shoulder connection 400, 500, 600, 700, 1200, 1400 may be applied to any suitable diameter drill pipe (DP). For example, suitable diameter DP includes, but is not limited to, from about 2⅜-inch outer diameter (OD) to about 7⅝-inch OD, and any range or value there between.

In an embodiment, the improved double-shoulder connection 400, 500, 600, 700, 1200, 1400 may be applied to any suitable heavy weight diameter drill pipe (HWDP). For example, suitable diameter HWDP includes, but is not limited to, from about 2⅞-inch OD to about 6⅝-inch OD, and any range or value there between.

In an embodiment, the improved double-shoulder connection 400, 500, 600, 700, 1200, 1400 may be applied to any suitable drill collars (DC). For example, suitable diameter DC includes, but is not limited to, from about 3⅛-inch OD to about 11-inch OD, and any range or value there between.

In an embodiment, the improved double-shoulder connection 400, 500, 600, 700, 1200, 1400 may be applied to any suitable pup joints. For example, suitable diameter pup joints includes, but is not limited to, from about 2⅜-inch OD to about 7⅝-inch OD, and any range or value there between.

Improved Double-Shoulder Connections with Curved Primary Shoulder and/or Secondary Shoulder A curved primary shoulder 1750 reduces box swell (e.g., box material yields) and provides better alignment of the box threads 1726 and pin threads 1746 in an improved double-shoulder connection 1700. The curved primary shoulder 1750 provides an avenue for compressive forces and elevated torques while drilling to move axially and inward into the pin connection, reducing box swell. The curved primary shoulder 1750 also balances compressive forces between the primary and secondary shoulder connections. FIG. 17A illustrates a cross-sectional view of an improved double-shoulder connection 1700 with a curved primary shoulder 1750 and a standard secondary shoulder 1760 according to an embodiment of the present invention. As shown in FIG. 17A, the improved double-shoulder connection 1700 comprises a box connection 1710 having a box axis (centerline) 1712, a pin connection 1730 having a pin axis (centerline) 1732, a primary shoulder 1750, and a secondary shoulder 1760.

In an embodiment, the primary shoulder 1750 comprises a primary box shoulder 1752; and a primary pin shoulder 1756. See also FIG. 1A: 112 & FIG. 1B: 132 (showing box and pin made-up).

Primary Box Shoulder

In an embodiment, the primary box shoulder 1752 may be any suitable shape. For example, suitable shapes include, but are not limited to, concave shaped, conical shaped, convex shaped, cylindrical shaped, conical-cylindrical shaped, and variations thereof. In an embodiment, the primary shoulder 1752 may be convex shaped.

In an embodiment, the primary box shoulder 1752 may be any suitable profile. For example, suitable profiles include, but are not limited to, angled profiles, curved profiles and variations thereof. In an embodiment, the primary box shoulder 1752 may be an angled profile defined by a primary box angle with respect to a first perpendicular 1780 to the box axis 1712 at a first end point 1782 of the box connection, as discussed below. In an embodiment, the first end point 1782 may be equal to a datum intersection, as discussed below.

In an embodiment, the primary box angle may be from greater than or equal to about 0 degrees to less than or equal to about 15 degrees, and any range or value there between. In an embodiment, the primary box angle may be from greater than or equal to about 0 degrees to less than or equal to about 10 degrees. In an embodiment, the primary box angle may be about 5 degrees. In an embodiment, the primary box angle may be about 0 degrees.

In an embodiment, the primary box shoulder 1752 may be a curved profile defined by a primary axial box radius height 1790, a primary box center point 1792 and a primary box radius 1794, as discussed below.

In an embodiment, the primary axial box radius height 1790 may be from about 0.000 inch to about the length of the primary box radius 1794 in inches, and any range or value there between.

In an embodiment, the primary box center point 1792 may be located between a box counter bore diameter (i.e., two time a box counter bore radius 118) and a pin bevel diameter (i.e., two times a pin bevel radius 136). In an embodiment, the primary box center point 1792 may be about half-way between the box counter bore diameter (i.e., two time a box counter bore radius 118) and the pin bevel diameter (i.e., two times a pin bevel radius 136). In an embodiment, the primary box center point 1792 may be about [(box counter bore diameter (i.e., two times a box counter bore radius 118)+pin bevel diameter (i.e., two times a pin bevel radius 136))/2].

In an embodiment, the primary box radius 1794 may be greater than about [(pin bevel diameter (i.e., two times pin bevel radius 136)−box counter bore diameter (i.e., two times box counter bore radius 118))/4] inches, and any range or value there between.

In an embodiment, the primary box radius 1794 may be greater than about [(pin bevel diameter (i.e., two times pin bevel radius 136)−box counter bore diameter (i.e., two times box counter bore radius 118))/4] inches, and any range or value there between.

Primary Pin Shoulder

In an embodiment, the primary pin shoulder 1756 may be any suitable shape. For example, suitable shapes include, but are not limited to, concave shaped, conical shaped, convex shaped, cylindrical shaped, conical-cylindrical shaped, and variations thereof. In an embodiment, the primary pin shoulder 1756 may be concave shaped.

In an embodiment, the primary pin shoulder 1756 may be any suitable profile. For example, suitable profiles include, but are not limited to, angled profiles, curved profiles, and variations thereof. In an embodiment, the primary pin shoulder 1756 may be an angled profile defined by a primary pin angle with respect to a first perpendicular 1780 to the pin axis 1732 at the first end point 1782 of the pin connection, as discussed below. In an embodiment, the first end point 1782 may be equal to a datum intersection.

In an embodiment, the primary pin angle may be from greater than or equal to about 0 degrees to less than or equal to about 15 degrees, and any range or value there between. In an embodiment, the primary pin angle may be from greater than or equal to about 0 degrees to less than or equal to about 10 degrees. In an embodiment, the primary pin angle may be about 5 degrees. In an embodiment, the primary pin angle may be about 0 degrees.

In an embodiment, the primary pin shoulder 1756 may be a curved profile defined by a primary axial pin radius height 1796, a primary pin center point 1798 and a primary pin radius 17100, as discussed below.

In an embodiment, the primary axial pin radius height 1796 may be from about 0.000 inch to about the length of the primary pin radius 17100 in inches, and any range or value there between.

In an embodiment, the primary axial box radius height 1790 may be about equal to the primary axial pin radius height 1796.

In an embodiment, the primary pin center point 1798 may be located between a box counter bore diameter (i.e., two time a box counter bore radius 118) and a pin bevel diameter (i.e., two times a pin bevel radius 136). In an embodiment, the primary pin center point 1798 may be about half-way between the box counter bore diameter (i.e., two times a box counter bore radius 118) and the pin bevel diameter (i.e., two times a pin bevel radius 136). In an embodiment, the primary pin center point 1798 may be about [(box counter bore diameter (i.e., two times a box counter bore radius 118)+pin bevel diameter (i.e., two times a pin bevel radius 136))/2].

In an embodiment, the primary box center point 1792 may be about equal to the primary pin center point 1798.

In an embodiment, the primary pin radius 17100 may be greater than about [(pin bevel diameter (i.e., two times pin bevel radius 136)−box counter bore diameter (i.e., two times box counter bore radius 118))/4 inches, and any range or value there between.

In an embodiment, the primary pin radius 17100 may be greater than about [(pin bevel diameter (i.e., two times pin bevel radius 136)−box counter bore diameter (i.e., two times box counter bore radius 118))/4 inches, and any range or value there between.

In an embodiment, the primary box angle may be about equal to the primary pin angle to form a first seal. In an embodiment, the primary box angle may be slightly different from the primary pin angle to form a first seal. In an embodiment, the first seal may be a gas-tight seal.

In an embodiment, the primary box radius 1794 may be about equal to the primary pin radius 17100 to form a first seal. In an embodiment, the primary box radius 1794 may be slightly different from the primary pin radius 17100 to form a first seal. In an embodiment, the first seal may be a gas-tight seal.

FIG. 17B illustrates a detailed view E in FIG. 17A, showing the curved primary shoulder 1750 according to an embodiment of the present invention. As shown in FIG. 17B, the primary box radius 1794 and the primary pin radius 17100 may be greater than about [(pin bevel diameter (i.e., two times pin bevel radius 136)−box counter bore diameter (i.e., two times box counter bore radius 118))/4] inches. See also FIG. 2B (showing a standard primary shoulder 250).

In an embodiment, the secondary shoulder 1760 comprises a secondary box shoulder 1762; and a secondary pin shoulder 1766. See also FIG. 1A: 112 & FIG. 1B: 132 (showing box and pin made-up).

Secondary Box Shoulder

In an embodiment, the secondary box shoulder 1762 may be any suitable shape. For example, suitable shapes include, but are not limited to, concave shaped, conical shaped, convex shaped, cylindrical shaped, conical-cylindrical shaped, and variations thereof. In an embodiment, the secondary box shoulder 1762 may be conical shaped (outside of cone, male).

In an embodiment, the secondary box shoulder 1762 may be any suitable profile. For example, suitable profiles include, but are not limited to, angled profiles, curved profiles and variations thereof. In an embodiment, the secondary box shoulder 1762 may be an angled profile defined by a secondary box angle with respect to a second perpendicular to the box axis 1712 at a second end point of the box connection, as discussed below.

In an embodiment, the secondary box angle may be from greater than or equal to about 0 degrees to less than or equal to about 15 degrees, and any range or value there between. In an embodiment, the secondary box angle may be from greater than or equal to about 0 degrees to less than or equal to 10 degrees. In an embodiment, the secondary box angle may be about 5 degrees. In an embodiment, the secondary box angle may be about 0 degrees.

In a standard secondary shoulder 1760, the secondary box angle is 0 degrees (i.e., secondary box shoulder 1762 is perpendicular to the box axis 1712).

In an embodiment, the secondary box shoulder 1762 may be a curved profile defined by a secondary axial box radius height, a secondary box center point and a secondary box radius, as discussed below.

In an embodiment, the secondary axial box radius height may be from about 0.000 inch to about the length of the secondary box radius in inches, and any range or value there between.

In an embodiment, the secondary box center point may be located between a pin nose outer diameter (i.e., two times pin nose radius 140) and a pin nose inner diameter (i.e., two time pin nose inner radius 240a), and any range or value there between. In an embodiment, the secondary box center point may be located about half-way between the pin nose outer diameter (i.e., two times pin nose radius 140) and the pin nose inner diameter (i.e., two times pin nose inner radius 240a). In an embodiment, the secondary box center point may be about [(pin nose outer diameter (i.e., two times pin nose radius 140)+pin nose inner diameter (i.e., two times pin nose inner radius 240a))/2].

In an embodiment, the secondary box radius may be greater than about [(pin nose outer diameter (i.e., two times pin nose radius 140)−pin nose inner diameter (i.e., two times pin nose inner radius 240a))/4] inches, and any range or value there between.

Secondary Pin Shoulder

In an embodiment, the secondary pin shoulder 1766 may be any suitable shape. For example, suitable shapes include, but are not limited to, concave shaped, conical shaped, convex shaped, cylindrical shaped, conical-cylindrical shaped, and variations thereof. In an embodiment, the secondary pin shoulder 1766 may be conical shaped (inside of cone, female).

In an embodiment, the secondary pin shoulder 1766 may be any suitable profile. For example, suitable profiles include, but are not limited to, angled profiles, curved profiles and variations thereof. In an embodiment, the secondary pin shoulder 1766 may be an angled profile defined by a secondary pin angle with respect to the second perpendicular to the pin axis 1732 at the second end point of the pin connection, as discussed below.

In an embodiment, the secondary pin angle may be from greater than or equal to about 0 degrees to less than or equal to about 15 degrees, and any range or value there between. In an embodiment, the secondary pin angle may be from greater than or equal to about 0 degrees to less than or equal to about 10 degrees. In an embodiment, the secondary pin angle may be about 5 degrees. In an embodiment, the secondary pin angle may be about 0 degrees.

In a standard secondary shoulder 1760, the secondary pin angle is 0 degrees (i.e., secondary pin shoulder 1766 is perpendicular to the pin axis 1732).

In an embodiment, the secondary pin shoulder 1766 may be a curved profile defined by a secondary axial pin radius height, a secondary pin center point and a secondary pin radius, as discussed below.

In an embodiment, the secondary axial pin radius height may be from about 0.000 inch to about the length of the secondary pin radius in inches, and any range or value there between.

In an embodiment, the secondary axial box radius height may be about equal to the secondary axial pin radius height.

In an embodiment, the secondary pin center point may be located between a pin nose outer diameter (i.e., two times pin nose radius 140) and a pin nose inner diameter (i.e., two times pin nose inner radius 240a), and any range or value there between. In an embodiment, the secondary pin center point may be located about half-way between the pin nose outer diameter (i.e., two times pin nose radius 140) and the pin nose inner diameter (i.e., two times pin nose inner radius 240a). In an embodiment, the secondary pin center point may be about [(pin nose outer diameter (i.e., two times pin nose radius 140)+pin nose inner diameter (i.e., two times pin nose inner radius 240a))/2].

In an embodiment, the secondary box center point may be about equal to the secondary pin center point.

In an embodiment, the secondary pin radius may be greater than about [(pin nose outer diameter (i.e., two times pin nose radius 140)−pin nose inner diameter (i.e., two times pin nose inner radius 240a))/4] inches, and any range or value there between.

In an embodiment, the secondary box angle may be about equal to the secondary pin angle to form a torque shoulder.

In an embodiment, the secondary box angle may be slightly different from the secondary pin angle to form a torque shoulder that is a second seal. In an embodiment, the torque shoulder or the second seal may be a gas-tight seal.

In an embodiment, the secondary box radius may be about equal to the secondary pin radius to form a torque shoulder.

In an embodiment, the secondary box radius may be slightly different from the secondary pin radius to form a torque shoulder that is a second seal. In an embodiment, the torque shoulder or the second seal may be a gas-tight seal.

FIG. 17A illustrates the standard secondary shoulder 1760 according to an embodiment of the present invention. As shown in FIG. 17A, the secondary box angle is 0 degrees; and the secondary pin angle is 0 degrees. See also FIG. 2C (showing a standard secondary shoulder).

Figure 18A:
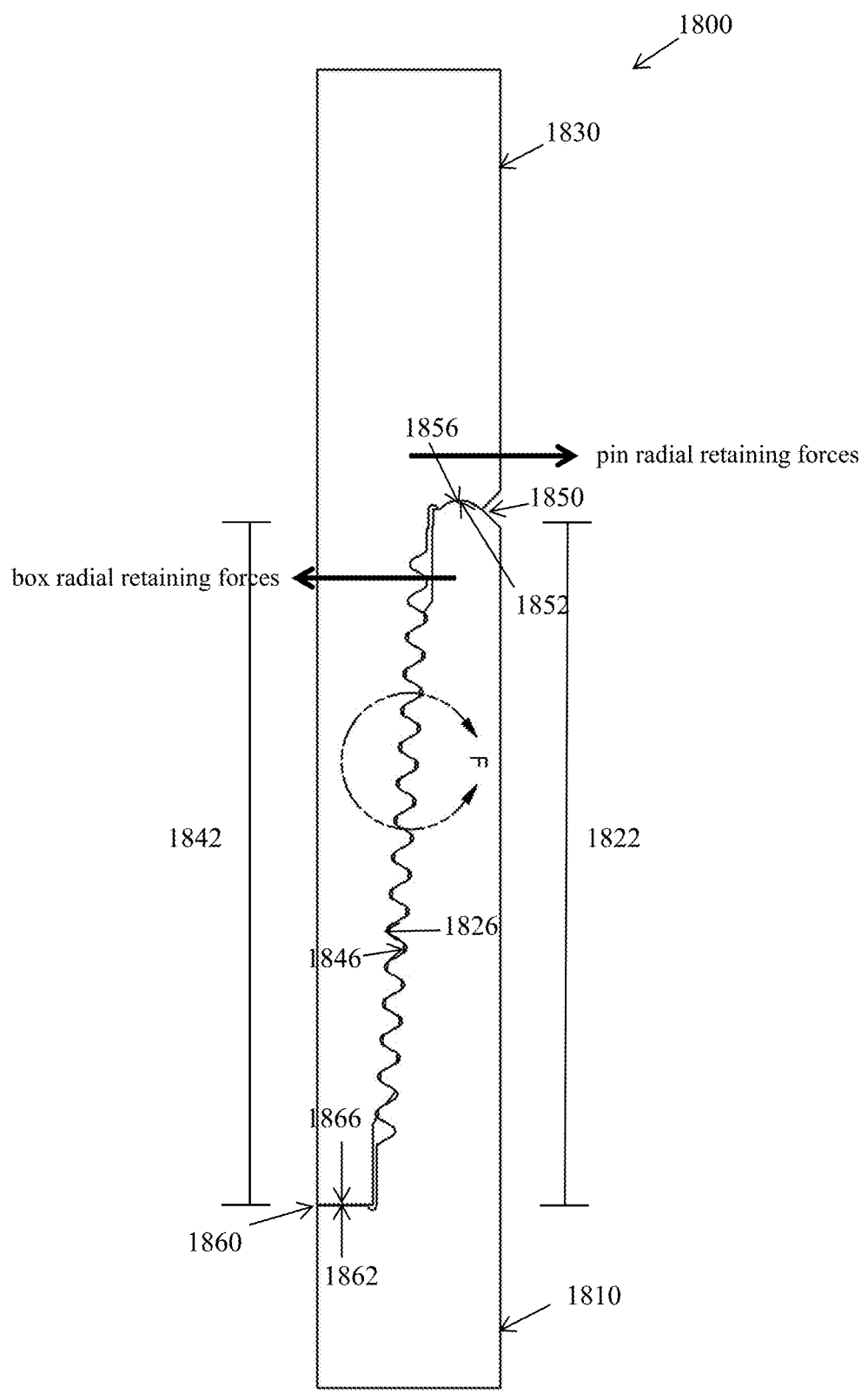
FIG. 18A illustrates a cross-sectional view of the improved double-shoulder connection of FIG. 17A, showing box radial retaining forces and pin radial retaining forces.
Figure 18B:
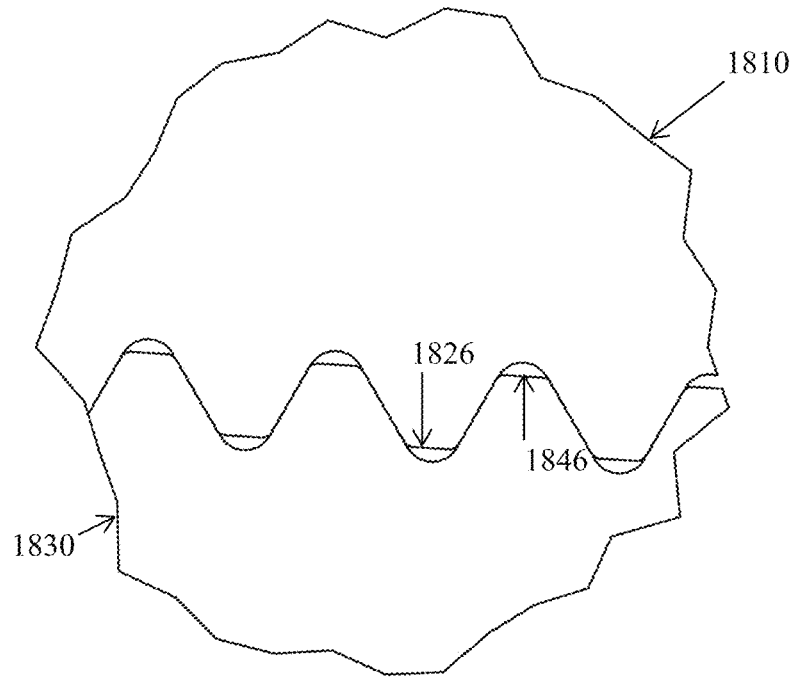
FIG. 18B illustrates a detailed view F in FIG. 18A, showing improved thread alignment.

As discussed above, a curved primary shoulder 1750, 1850 reduces box swell (e.g., box material yields) and provides better alignment of the box threads 1726, 1826 and pin threads 1746, 1846 in an improved double-shoulder connection 1700, 1800. The curved primary shoulder 1750, 1850 provides an avenue for compressive forces and elevated torques while drilling to move axially and radially (i.e., inward) into the pin connection, reducing box swell (e.g., box material yields). The curved primary shoulder 1750, 1850 also balances compressive forces between the primary and secondary shoulder connections. FIG. 18A illustrates a cross-sectional view of the improved double-shoulder connection 1700, 1800 of FIG. 17A, showing box radial retaining forces and pin radial retaining forces. As shown in FIG. 18A, the curved primary shoulder 1750, 1850 reduces the box swell/yielding forces shown in FIG. 3A. See also FIG. 3A (showing a primary shoulder 350). In other words, the box radial retaining forces generated by the curved primary shoulder 1750, 1850 reduce box swell/yielding forces, reducing box swell (e.g., box material yields).

Figure 20:
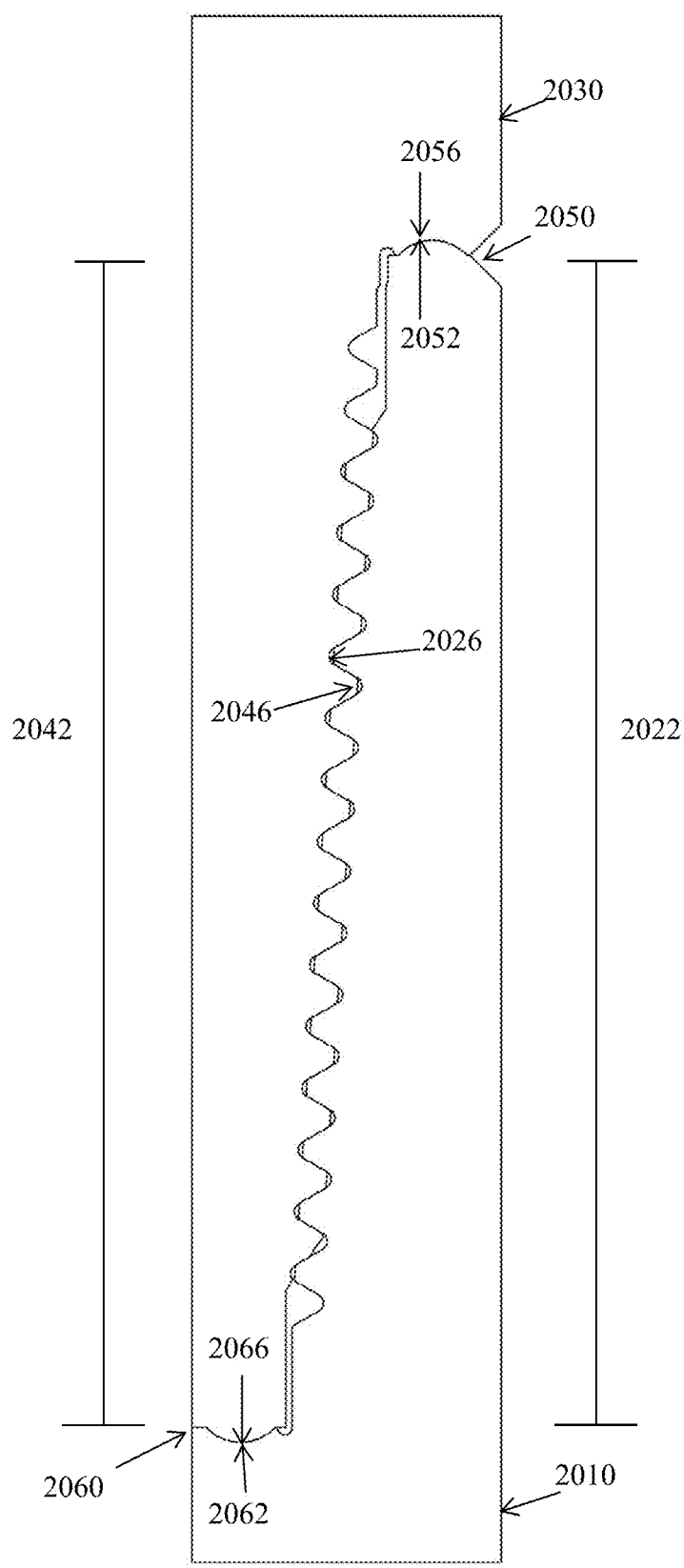
FIG. 20 illustrates a cross-sectional view of an improved double-shoulder connection with an a curved primary shoulder and a curved secondary shoulder according to an embodiment of the present invention.

FIG. 19A illustrates a cross-sectional view of an improved double-shoulder connection 1900 with a standard primary shoulder 1950 and a curved secondary shoulder 1960 according to an embodiment of the present invention; and FIG. 20 illustrates a cross-sectional view of an improved double-shoulder connection with a curved primary shoulder and a curved secondary shoulder according to an embodiment of the present invention. As shown in FIGS. 19A and 20, the improved double-shoulder connection 1900, 2000 comprises a box connection 1910, 2010 having a box axis (centerline) 1912, a pin connection 1930, 2030 having a pin axis (centerline) 1932, a primary shoulder 1950, 2050, and a secondary shoulder 1960, 2060.

In an embodiment, the primary shoulder 1950, 2050 comprises a primary box shoulder 1952, 2052; and a primary pin shoulder 1956, 2056. See also FIG. 1A: 112 & FIG. 1B: 132 (showing box and pin made-up).

Primary Box Shoulder

In an embodiment, the primary box shoulder 1952, 2052 may be any suitable shape. For example, suitable shapes include, but are not limited to, concave shaped, conical shaped, convex shaped, cylindrical shaped, conical-cylindrical shaped, and variations thereof. In an embodiment, the primary box shoulder 1952 may be conical shaped (outside of cone, male). In an embodiment, the primary box shoulder 2052 may be convex shaped.

In an embodiment, the primary box shoulder 1952, 2052 may be any suitable profile. For example, suitable profiles include, but are not limited to, angled profiles, curved profiles, and variations thereof. In an embodiment, the primary box shoulder 1952 may be an angled profile defined by a primary box angle with respect to a first perpendicular to the box axis 1912 at a first end point of the box connection, as discussed below. In an embodiment, the first end point may be equal to a datum intersection.

In an embodiment, the primary box angle may be from greater than or equal to about 0 degrees to less than or equal to about 15 degrees, and any range or value there between. In an embodiment, the primary box angle may be from greater than or equal to about 0 degrees to less than or equal to about 10 degrees. In an embodiment, the primary box angle may be about 5 degrees. In an embodiment, the primary box angle may be about 0 degrees.

In an embodiment, the primary box shoulder 2052 may be a curved profile defined by a primary axial box radius height, a primary box center point and a primary box radius, as discussed below.

In an embodiment, the primary axial box radius height may be from about 0.000 inch to about the length of the primary box radius in inches, and any range or value there between.

In an embodiment, the primary box center point may be located between a box counter bore diameter (i.e., two times a box counter bore radius 118) and a pin bevel diameter (i.e., two times a pin bevel radius 136). In an embodiment, the primary box center point may be about half-way between the box counter bore diameter (i.e., two times a box counter bore radius 118) and the pin bevel diameter (i.e., two times a pin bevel radius 136). In an embodiment, the primary box center point may be about [(box counter bore diameter (i.e., two times a box counter bore radius 118)+pin bevel diameter (i.e., two times a pin bevel radius 136))/2].

In an embodiment, the primary box radius may be greater than about [(pin bevel diameter (i.e., two times pin bevel radius 136)−box counter bore diameter (i.e., two times box counter bore radius 118))/4] inches, and any range or value there between.

In an embodiment, the primary box radius may be greater than about [(pin bevel diameter (i.e., two times pin bevel radius 166)−box counter bore diameter (i.e., two times box counter bore radius 118))/4] inches, and any range or value there between.

Primary Pin Shoulder

In an embodiment, the primary pin shoulder 1956, 2056 may be any suitable shape. For example, suitable shapes include, but are not limited to, concave shaped, conical shaped, convex shaped, cylindrical shaped, conical-cylindrical shaped, and variations thereof. In an embodiment, the primary pin shoulder 1956 may be conical shaped (inside of cone, female). In an embodiment, the primary pin shoulder 2065 may be concave shaped.

In an embodiment, the primary pin shoulder 1956, 2056 may be any suitable profile. For example, suitable profiles include, but are not limited to, angled profiles, curved profiles, and variations thereof. In an embodiment, the primary pin shoulder 1956 may be an angled profile defined by a primary pin angle with respect to the first perpendicular to the pin axis 1932 at the first end point of the pin connection, as discussed below. In an embodiment, the first end point may be equal to a datum intersection.

In an embodiment, the primary pin angle may be from greater than or equal to about 0 degrees to less than or equal to about 15 degrees, and any range or value there between. In an embodiment, the primary pin angle may be from greater than or equal to about 0 degrees to less than or equal to about 10 degrees. In an embodiment, the primary pin angle may be about 5 degrees. In an embodiment, the primary pin angle may be about 0 degrees.

In an embodiment, the primary pin shoulder 2056 may be a curved profile defined by a primary axial pin radius height, a primary pin center point and a primary pin radius, as discussed below.

In an embodiment, the primary pin axial pin radius height may be from about 0.000 inch to about the length of the primary pin radius in inches, and any range or value there between.

In an embodiment, the primary axial box radius height may be about equal to the primary axial pin radius height.

In an embodiment, the primary pin center point may be located between a box counter bore diameter (i.e., two times a box counter bore radius 118) and a pin bevel diameter (i.e., two times a pin bevel radius 136). In an embodiment, the primary pin center point may be about half-way between the box counter bore diameter (i.e., two times a box counter bore radius 118) and the pin bevel diameter (i.e., two times a pin bevel radius 136). In an embodiment, the primary pin center point may be about [(box counter bore diameter (i.e., two times a box counter bore radius 118)+pin bevel diameter (i.e., two times a pin bevel radius 136))/2].

In an embodiment, the primary pin radius may be greater than about [(pin bevel diameter (i.e., two times pin bevel radius 136)−box counter bore diameter (i.e., two times box counter bore radius 118))/4] inches, and any range or value there between.

In an embodiment, the primary pin radius may be greater than about [(pin bevel diameter (i.e., two times pin bevel radius 136)−box counter bore diameter (i.e., two times box counter bore radius 118))/4] inches, and any range or value there between.

In an embodiment, the primary box angle may be about equal to the primary pin angle to form a first seal. In an embodiment, the primary box angle may be slightly different from the primary pin angle to form a first seal. In an embodiment, the first seal may be a gas-tight seal.

In an embodiment, the primary box center point may be about equal to the primary pin center point.

In an embodiment, the primary box radius may be about equal to the primary pin radius to form a first seal. In an embodiment, the primary box radius may be slightly different from the primary pin radius to form a first seal. In an embodiment, the first seal may be a gas-tight seal.

In an embodiment, the secondary shoulder 1960, 2060 comprises a secondary box shoulder 1962, 2062; and a secondary pin shoulder 1966, 2066. See also FIG. 1A: 112 & FIG. 1B: 132 (showing box and pin made-up).

Secondary Box Shoulder

In an embodiment, the secondary box shoulder 1962, 2062 may be any suitable shape. For example, suitable shapes include, but are not limited to, concave shaped, conical shaped, convex shaped, cylindrical shaped, conical-cylindrical shaped, and variations thereof. In an embodiment, the secondary box shoulder 1962, 2062 may be concave shaped.

In an embodiment, the secondary box shoulder 1962, 2062 may be any suitable profile. For example, suitable profiles include, but are not limited to, angled profiles, curved profiles, and variations thereof. In an embodiment, the secondary box shoulder 1962, 2062 may be an angled profile defined by a secondary box angle with respect to a second perpendicular 1986 to the box axis 1912 at a second end point 1988 of the box connection, as discussed below.

In an embodiment, the secondary box angle may be from greater than or equal to about 0 degrees to less than or equal to about 15 degrees, and any range or value there between. In an embodiment, the secondary box angle may be from greater than or equal to about 0 degrees to less than or equal to about 10 degrees. In an embodiment, the secondary box angle may be about 5 degrees. In an embodiment, the secondary box angle may be about 0 degrees.

In an embodiment, the secondary box shoulder 1962, 2062 may be a curved profile defined by a secondary box axial box radius height 19102, a secondary box center point 19104 and a secondary box radius 19106, as discussed below.

In an embodiment, the secondary axial box radius height 19102 may be from about 0.000 inch to about the length of the primary box radius 19106 in inches, and any range or value there between.

In an embodiment, the secondary box center point 19104 may be located between a pin nose outer diameter (i.e., two times pin nose radius 140) and a pin nose inner diameter (i.e., two times pin nose inner radius 240*a*), and any range or value there between. In an embodiment, the secondary box center point 19104 may be located about half-way between a pin nose outer diameter (i.e., two times pin nose radius 140) and a pin nose inner diameter (i.e., two times pin nose inner radius 240*a*). In an embodiment, the secondary box center point 19104 may be about [(pin nose outer diameter (i.e., two times pin nose radius 140)+pin nose inner diameter (i.e., two time pin nose inner radius 240*a*))/2].

In an embodiment, the secondary box radius 19106 may be greater than about [(pin nose outer diameter (i.e., two times pin nose radius 140)−pin nose inner diameter (i.e., two times pin nose inner radius 240*a*))/4] inches, and any range or value there between.

Secondary Pin Shoulder

In an embodiment, the secondary pin shoulder 1966, 2066 may be any suitable shape. For example, suitable shapes include, but are not limited to, concave shaped, conical shaped, convex shaped, cylindrical shaped, conical-cylindrical shaped, and variations thereof. In an embodiment, the secondary pin shoulder 1966, 2066 may be convex shaped.

In an embodiment, the secondary pin shoulder 1966, 2066 may be any suitable profile. For example, suitable profiles include, but are not limited to, angled profiles, curved profiles, and variations thereof. In an embodiment, the secondary pin shoulder 1966, 2066 may be an angled profile defined by a secondary pin angle with respect to the second perpendicular 1986 to the pin axis 1932 at the second end point 1988 of the pin connection, as discussed below.

In an embodiment, the secondary pin angle may be from greater than or equal to about 0 degrees to less than or equal to about 15 degrees, and any range or value there between. In an embodiment, the secondary pin angle may be from greater than or equal to about 0 degrees to less than or equal to about 10 degrees. In an embodiment, the secondary pin angle may be about 5 degrees. In an embodiment, the secondary pin angle may be about 0 degrees.

In an embodiment, the secondary pin shoulder 1966, 2066 may be a curved profile defined by a secondary axial pin radius height 19106, a secondary pin center point 19110 and a secondary pin radius 19112, as discussed below.

In an embodiment, the secondary axial pin radius height 19108 may be from about 0.000 inch to about the length of the secondary pin radius 19112 in inches, and any range or value there between.

In an embodiment, the secondary axial box radius height 19102 may be about equal to the secondary axial pin radius height 19108.

In an embodiment, the secondary pin center point 19110 may be located between a pin nose outer diameter (i.e., two times pin nose radius 140) and a pin nose inner diameter (i.e., two times pin nose inner radius 240*a*), and any range or value there between. In an embodiment, the secondary pin center point 19110 may be located about half-way between a pin nose outer diameter (i.e., two times pin nose radius 140) and a pin nose inner diameter (i.e., two times pin nose inner radius 240*a*). In an embodiment, the secondary pin center point 19110 may be about [(pin nose outer diameter (i.e., two times pin nose radius 140)+pin nose inner diameter (i.e., two times pin nose inner radius 240*a*))/2].

In an embodiment, the secondary pin radius 19112 may be greater than about [(pin nose outer diameter (i.e., two times pin nose radius 140)−pin nose inner diameter (i.e., two times pin nose inner radius 240*a*))/4] inches, and any range or value there between.

In an embodiment, the secondary box angle may be about equal to the secondary pin angle to form a torque shoulder.

In an embodiment, the secondary box angle may be slightly different from the secondary pin angle to form a torque shoulder that is a second seal. In an embodiment, the torque shoulder or the second seal may be a gas-tight seal.

In an embodiment, the secondary box center point 19104 may be about equal to the secondary pin center point 19110.

In an embodiment, the secondary box radius 19106 may be about equal to the secondary pin radius 19112 to form a torque shoulder.

In an embodiment, the secondary box radius 19106 may be slightly different from the secondary pin radius 19112 to form a torque shoulder that is a second seal. In an embodiment, the torque shoulder or the second seal may be a gas-tight seal.

FIG. 19B illustrates a detailed view G in FIG. 19A, showing the curved secondary shoulder 1960 according to an embodiment of the present invention. As shown in FIG. 19B, the secondary box radius 19106 and the secondary pin radius 19112 may be greater than about [(pin nose outer diameter (i.e., two times pin nose radius 140)−pin nose inner diameter (i.e., two times pin nose inner radius 240*a*))/4] inches, and any range or value there between. See also FIG. 2C (showing a standard secondary shoulder 260).

As discussed above, a curved secondary shoulder 1960 reduces box swell (e.g., box material yields) in an improved double-shoulder connection 1900. The curved secondary shoulder 1960 provides an avenue for compressive forces and elevated torques while drilling to move axially and radially (i.e., inward) into the pin connection, reducing box swell (e.g., box material yields). The curved secondary shoulder 1960 also balances compressive forces between the primary and secondary shoulder connections. FIG. 19A illustrates a cross-sectional view of the improved double-shoulder connection 1900, showing box radial retaining forces and pin radial retaining forces. As shown in FIG. 19A, the curved secondary shoulder 1960 reduces the box swell/yielding forces shown in FIG. 3A. See also FIG. 3A (showing standard secondary shoulder 360). In other words, the box radial retaining forces generated by the curved secondary shoulder 1960 reduce the box swell/yielding forces, reducing box swell (e.g., box material yields).

As shown in FIG. 19A, a curved secondary shoulder 1960 also reduces the pin collapse forces shown in FIG. 3A. See also FIG. 3A (showing a standard secondary shoulder 360). In other words, the pin radial retaining forces generated by the curved secondary shoulder 1960 reduce the pin collapse forces, reducing pin nose diving.

As discussed with respect to the standard double-shoulder connection, the combination of box swell and pin collapse can lead to permanent damage to the box connection 1910 and/or the pin connection 1930. See also FIG. 3A (showing a standard secondary shoulder 360).

In an embodiment, the improved double-shoulder connection 1700, 1800, 1900, 2000, 2400, 2600 may be made of any suitable material. For example, suitable materials include, but are not limited to, low alloy steels (e.g., 4140, 4145, 4330, etc.), stainless steels (e.g., 17-4, 304, 316, etc.), super alloys (e.g., Inconel), titanium alloys (e.g., Ti-6Al-4V, Ti-6Al-6V-2Sn, etc.), copper alloys (e.g., Beryllium copper), cobalt alloys (e.g., Stellite), aluminum alloys (e.g., 2024, 6061, 7075, etc.), and combinations and variations thereof. In an embodiment, the improved double-shoulder connection 1700, 1800, 1900, 2000, 2400, 2600 may be low alloy steels or stainless steels.

In an embodiment, the improved double-shoulder connection 1700, 1800, 1900, 2000, 2400, 2600 may be applied to any suitable product. For example, suitable products include, but are not limited to, drill pipe (DP), heavy weight drill pipe (HWDP), drill collars (DC), pup joints, crossover subs, saver subs, bit subs, float subs, pump-in subs, inside blowout preventers (IBOP), top drive shafts, top drive valves, safety valves, kelly valves, hoisting equipment (e.g., lift subs, lift plugs), swivels, fishing tools, mud motors, rotary steerable tools, drill bits, directional drilling bottom hole assembly (BHA) components, measurement while drilling (MWD) components, logging while drilling (LWD) components, well cleanout tools (e.g., brushes, magnets), completion tools, and combinations and variations thereof. In an embodiment, the improved double-shoulder connection 1700, 1800, 1900, 2000, 2400, 2600 may be applied to drill pipe (DP) or heavy weight drill pipe (HWDP) or drill collars (DC) or pup joints.

In an embodiment, the improved double-shoulder connection 1700, 1800, 1900, 2000, 2400, 2600 may be applied to any suitable diameter drill pipe (DP). For example, suitable diameter DP includes, but is not limited to, from about 2⅜-inch outer diameter (OD) to about 7⅝-inch OD, and any range or value there between.

In an embodiment, the improved double-shoulder connection 1700, 1800, 1900, 2000, 2400, 2600 may be applied to any suitable heavy weight diameter drill pipe (HWDP). For example, suitable diameter HWDP includes, but is not limited to, from about 2⅞-inch OD to about 6⅝-inch OD, and any range or value there between.

In an embodiment, the improved double-shoulder connection 1700, 1800, 1900, 2000, 2400, 2600 may be applied to any suitable drill collars (DC). For example, suitable diameter DC includes, but is not limited to, from about 3⅛-inch OD to about 11-inch OD, and any range or value there between.

In an embodiment, the improved double-shoulder connection 1700, 1800, 1900, 2000, 2400, 2600 may be applied to any suitable pup joints. For example, suitable diameter pup joints includes, but is not limited to, from about 2⅜-inch OD to about 7⅝-inch OD, and any range or value there between.

Improved Single-Shoulder Connections with Angled Primary Shoulder

Figure 8A:
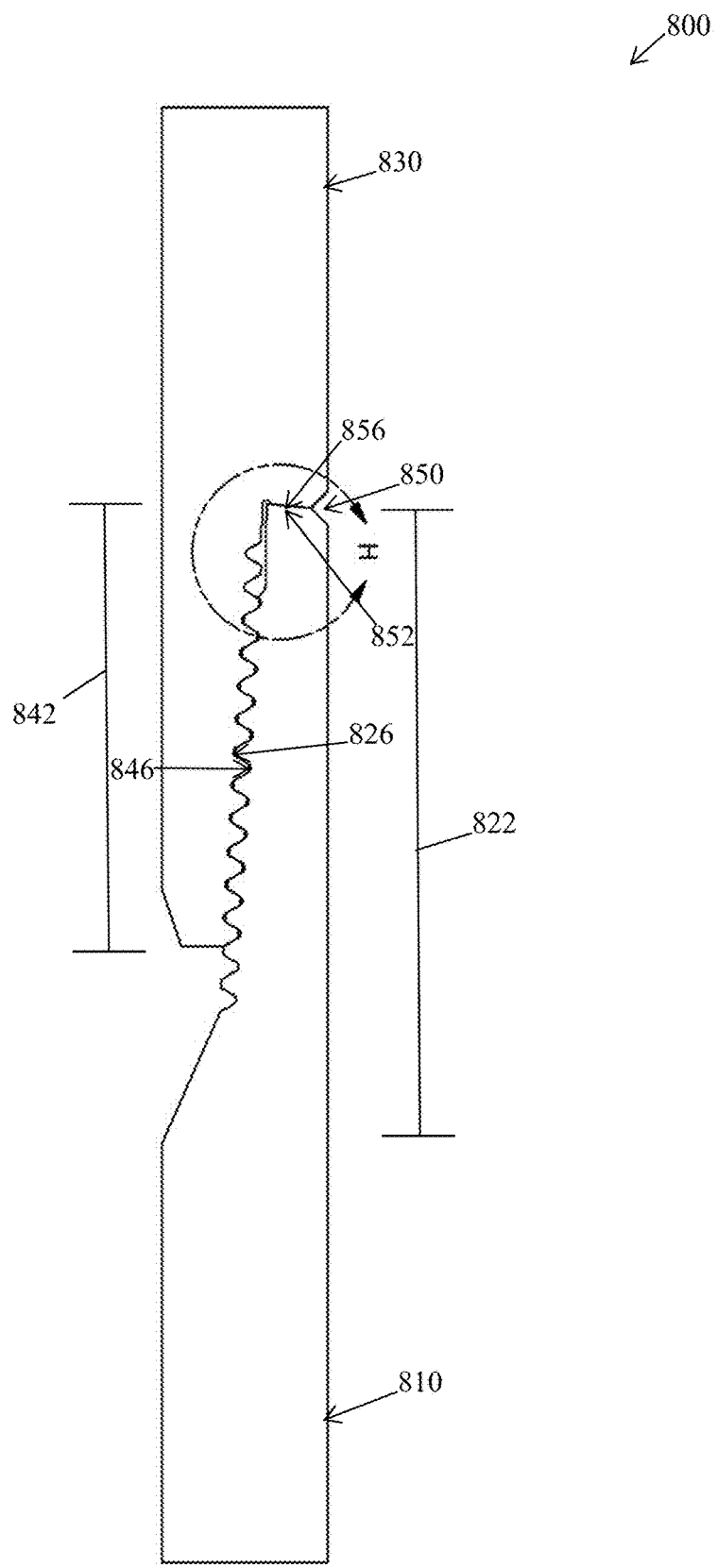
FIG. 8A illustrates a cross-sectional view of an improved single-shoulder connection with an angled primary shoulder according to an embodiment of the present invention.
Figure 9:
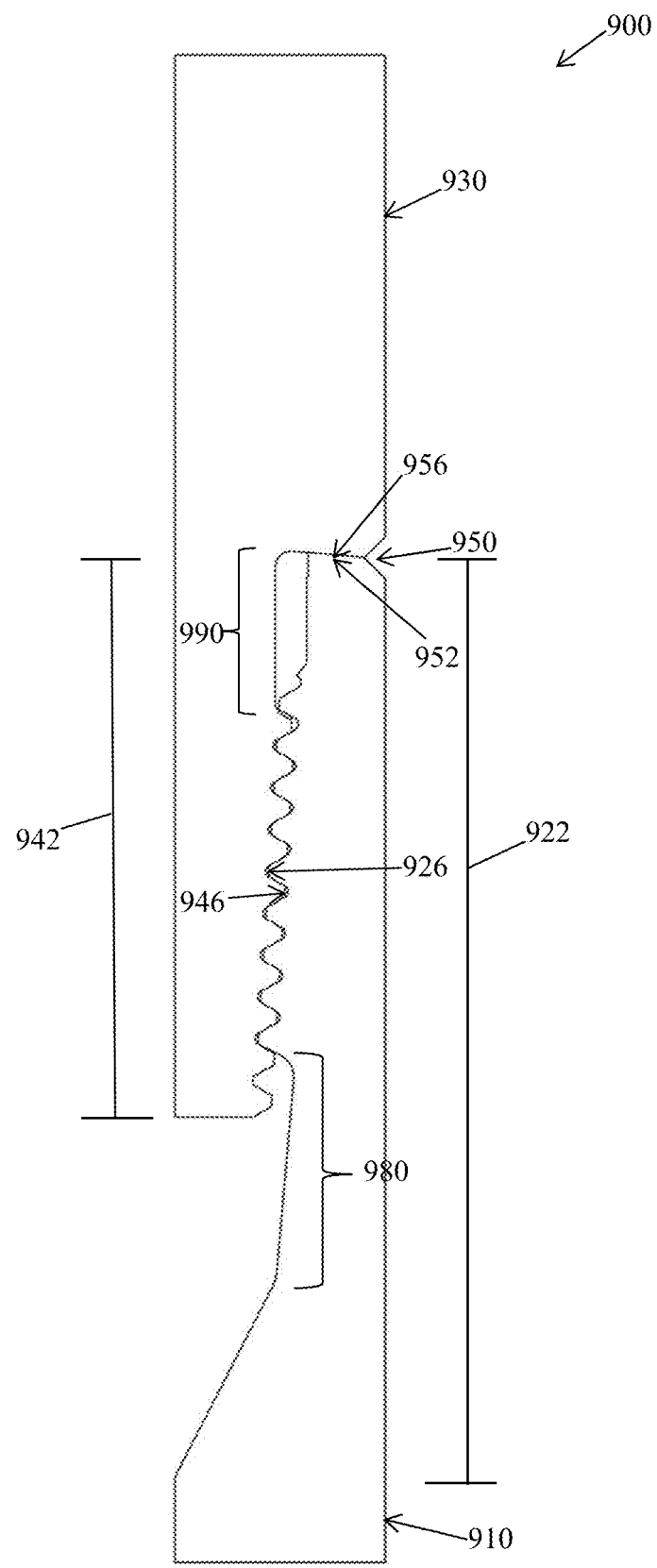
FIG. 9 illustrates a cross-sectional view of an improved single-shoulder connection with box and pin stress relief grooves according to an embodiment of the present invention.
Figure 10:
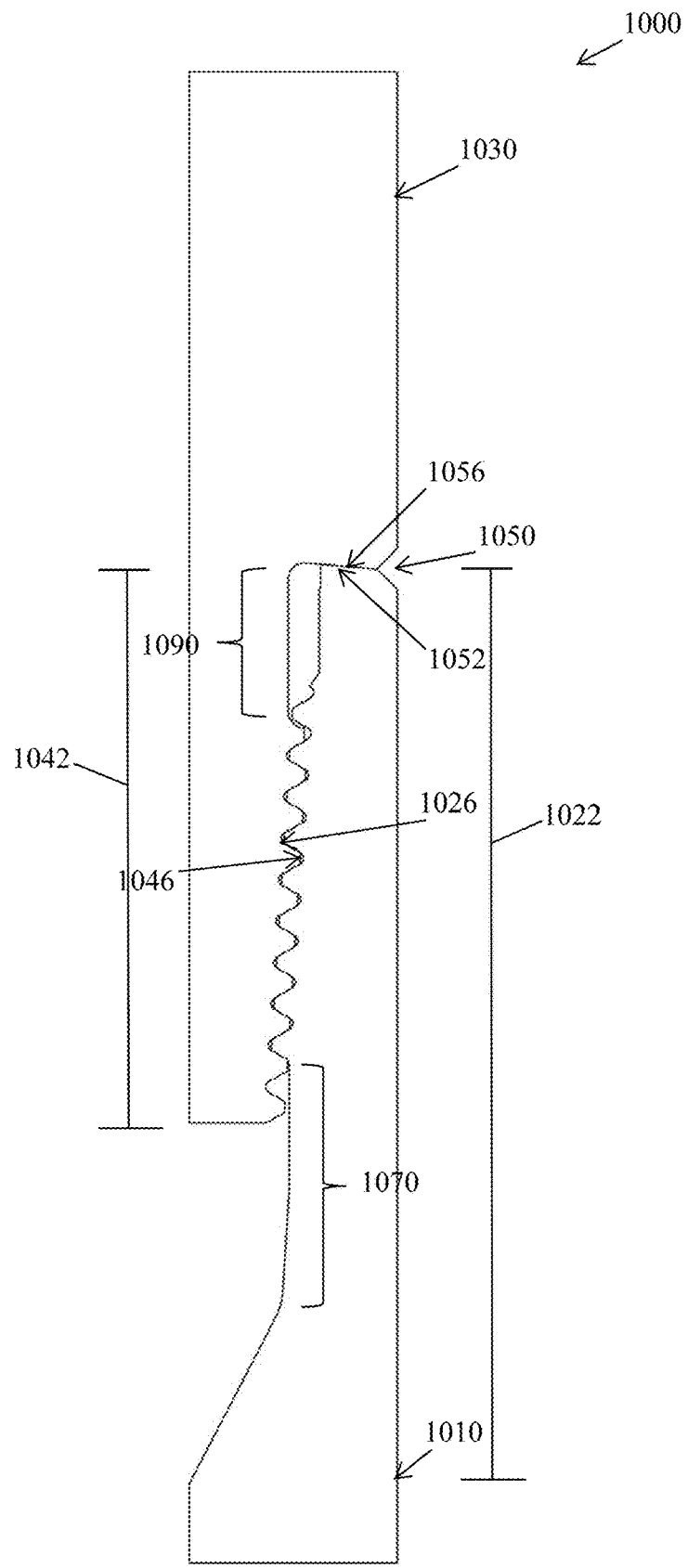
FIG. 10 illustrates a cross-sectional view of an improved single-shoulder connection with a box boreback and a pin stress relief groove according to an embodiment of the present invention.

Similar to the double-shoulder connections 400, 500, 600, 700, 1200, 1400 discussed above, an angled primary shoulder 850, 950, 1050, 1250 reduces box swell (e.g., box material yields) and provides better alignment of the box threads 826, 926, 1026 and pin threads 846, 946, 1046 in an improved single-shoulder connection 800, 900, 1000, 1200. The angled primary shoulder 850, 950, 1050 provides an avenue for compressive forces and elevated torques while drilling to move axially and radially (i.e., inward) into the pin connection, reducing box swell. FIGS. 8A, 9 and 10 illustrate a cross-sectional view of an improved single-shoulder connection 800, 900, 1000 with an angled primary shoulder 850, 950, 1050 according to an embodiment of the present invention. As shown in FIGS. 8A, 9 and 10, the improved single-shoulder connection 800, 900, 1000 comprises a box connection 810, 910, 1010 having a box axis (centerline) 812, a pin connection 830, 930, 1030 having a pin axis (centerline) 832, and a primary shoulder 850, 950, 1050.

In an embodiment, the primary shoulder 850 comprises a primary box shoulder 852 at a primary box angle 854 with respect to a first perpendicular 880 to the box axis 812 at a first end point 882 of the box connection; and a primary pin shoulder 856 at a primary pin angle 858 with respect to the first perpendicular 880 to the pin axis 832 at the first end point 882 of the pin connection. See also FIG. 1A: 112 & FIG. 1B: 132 (showing box and pin made-up). In an embodiment, the first end point 882 may be equal to a datum intersection, as discussed below.

In an embodiment, the primary box shoulder 852 may be any suitable shape. For example, suitable shapes include, but are not limited to, conical shaped, cylindrical shaped, conical-cylindrical shaped, and variations thereof. In an embodiment, the primary shoulder 852 may be conical shaped (outside of cone, male).

In an embodiment, the primary pin shoulder 856 may be any suitable shape. For example, suitable shapes include, but are not limited to, conical shaped, cylindrical shaped, conical-cylindrical shaped, and variations thereof. In an embodiment, the primary pin shoulder 856 may be conical shaped (inside of cone, female).

In an embodiment, the primary box shoulder 852 may be any suitable profile. For example, suitable profiles include, but are not limited to, angled profiles. In an embodiment, the primary box shoulder 852 may be an angled profile defined by a primary box angle 854, as discussed below.

In an embodiment, the primary box angle 854 may be from greater than about 0 degrees to less than or equal to about 15 degrees, and any range or value there between. In an embodiment, the primary box angle 854 may be from greater than about 0 degrees to less than or equal to about 10 degrees. In an embodiment, the primary box angle 854 may be about 5 degrees.

In an embodiment, the primary pin shoulder 856 may be any suitable profile. For example, suitable profiles include, but are not limited to, angled profiles. In an embodiment, the primary pin shoulder 856 may be an angled profile defined by a primary pin angle 858, as discussed below.

In an embodiment, the primary pin angle 858 may be from greater than about 0 degrees to less than or equal to about 15 degrees, and any range or value there between. In an embodiment, the primary pin angle 858 may be from greater than about 0 degrees to less than or equal to about 10 degrees. In an embodiment, the primary pin angle 858 may be about 5 degrees.

In an embodiment, the primary box angle 854 may be about equal to the primary pin angle 858 to form a first seal.

In an embodiment, the primary box angle 854 may be slightly different from the primary pin angle 858 to form a first seal. In an embodiment, the first seal may be a gas-tight seal.

Figure 8B:
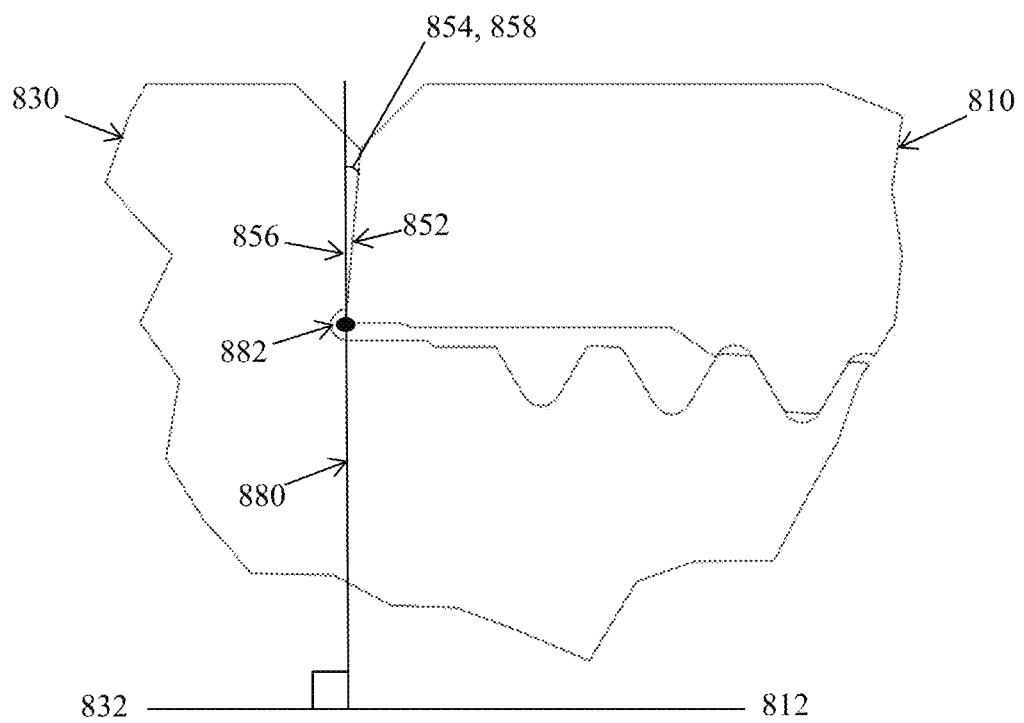
FIG. 8B illustrates a detailed view H in FIG. 8A, showing the angled primary shoulder according to an embodiment of the present invention.

FIG. 8B illustrates a detailed view H in FIG. 8A, showing the angled primary shoulder 850 according to an embodiment of the present invention. As shown in FIG. 8B, the primary box angle 854 may be from greater than about 0 degrees to less than or equal to about 15 degrees; and the primary pin angle 858 may be from greater than about 0 degrees to less than or equal to about 15 degrees. See also FIG. 2B (showing a standard primary shoulder 250).

In an embodiment, the improved single-shoulder connection 800, 900, 1000, 1200 may be made of any suitable material. For example, suitable materials include, but are not limited to, low alloy steels (e.g., 4140, 4145, 4330, etc.), stainless steels (e.g., 17-4, 304, 316, etc.), super alloys (e.g., Inconel), titanium alloys (e.g., Ti-6Al-4V, Ti-6Al-6V-2Sn, etc.), copper alloys (e.g., Beryllium copper), cobalt alloys (e.g., Stellite), aluminum alloys (e.g., 2024, 6061, 7075, etc.), and combinations and variations thereof. In an embodiment, the improved single-shoulder connection 800, 900, 1000, 1200 may be low alloy steels or stainless steels.

In an embodiment, the improved single-shoulder connection 800, 900, 1000, 1200 may be applied to any suitable product. For example, suitable products include, but are not limited to, drill pipe (DP), heavy weight drill pipe (HWDP), drill collars (DC), pup joints, crossover subs, saver subs, bit subs, float subs, pump-in subs, inside blowout preventers (IBOP), top drive shafts, top drive valves, safety valves, kelly valves, hoisting equipment (e.g., lift subs, lift plugs), swivels, fishing tools, mud motors, rotary steerable tools, drill bits, directional drilling bottom hole assembly (BHA) components, measurement while drilling (MWD) components, logging while drilling (LWD) components, well cleanout tools (e.g., brushes, magnets), completion tools and combinations and variations thereof. In an embodiment, the improved single-shoulder connection 800, 900, 1000, 1200 may be applied to drill pipe (DP) or heavy weight drill pipe (HWDP) or drill collars (DC) or pup joints.

In an embodiment, the improved single-shoulder connection 800, 900, 1000, 1200 may be applied to any suitable diameter drill pipe (DP). For example, suitable diameter DP include, but are not limited to, from about 2⅜-inch outer diameter (OD) to about 7⅝-inch OD, and any range or value there between.

In an embodiment, the improved single-shoulder connection 800, 900, 1000, 1200 may be applied to any suitable heavy weight diameter drill pipe (HWDP). For example, suitable diameter HWDP include, but are not limited to, from about 2⅞-inch OD to about 6⅝-inch OD, and any range or value there between.

In an embodiment, the improved single-shoulder connection 800, 900, 1000, 1200 may be applied to any suitable drill collars (DC). For example, suitable diameter DC include, but are not limited to, from about 3⅛-inch OD to about 11-inch OD, and any range or value there between.

In an embodiment, the improved single-shoulder connection 800, 900, 1000, 1200 may be applied to any suitable pup joints. For example, suitable diameter pup joints include, but are not limited to, from about 2⅜-inch OD to about 7⅝-inch OD, and any range or value there between.

Improved Single-Shoulder Connections with Curved Primary Shoulder

Figure 21A:
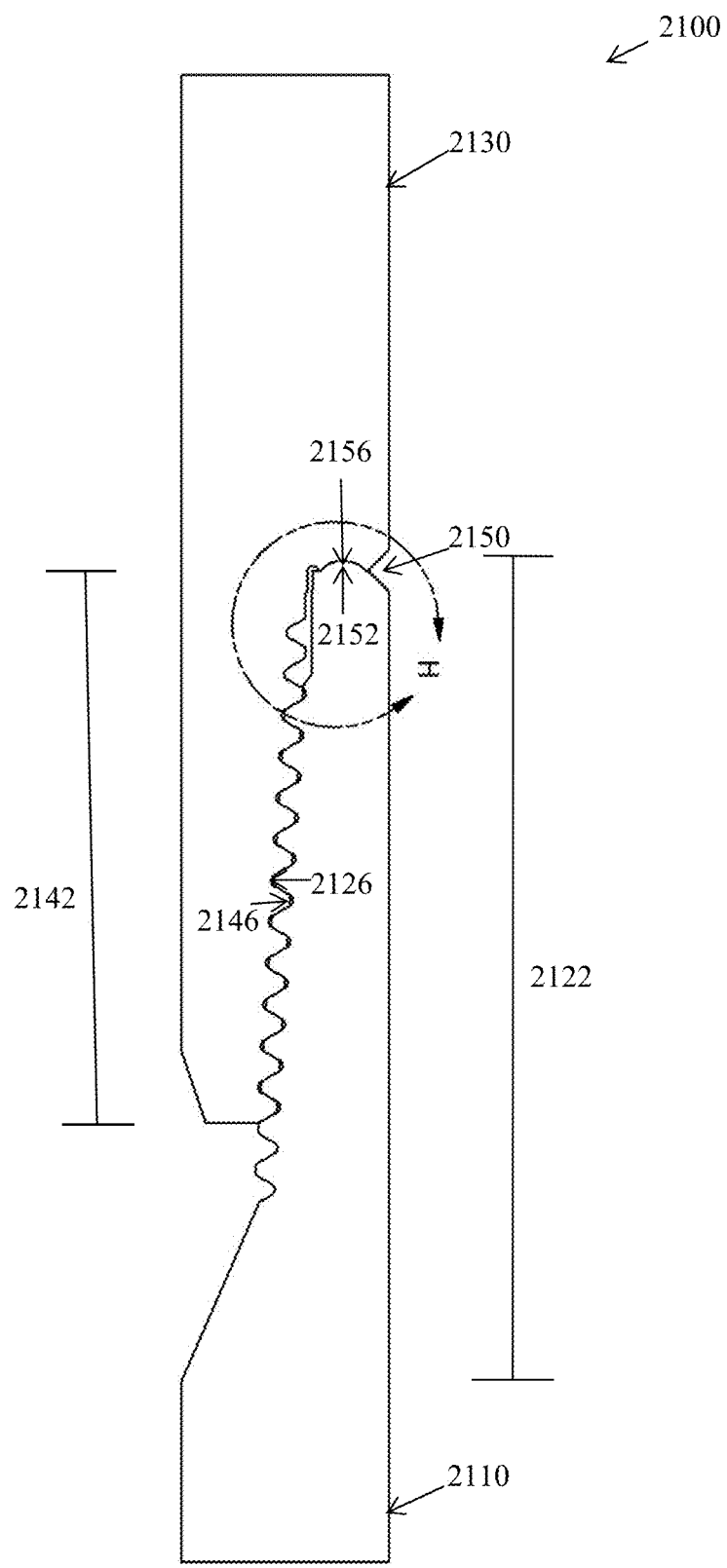
FIG. 21A illustrates a cross-sectional view of an improved single-shoulder connection with a curved primary shoulder according to an embodiment of the present invention.
Figure 22:
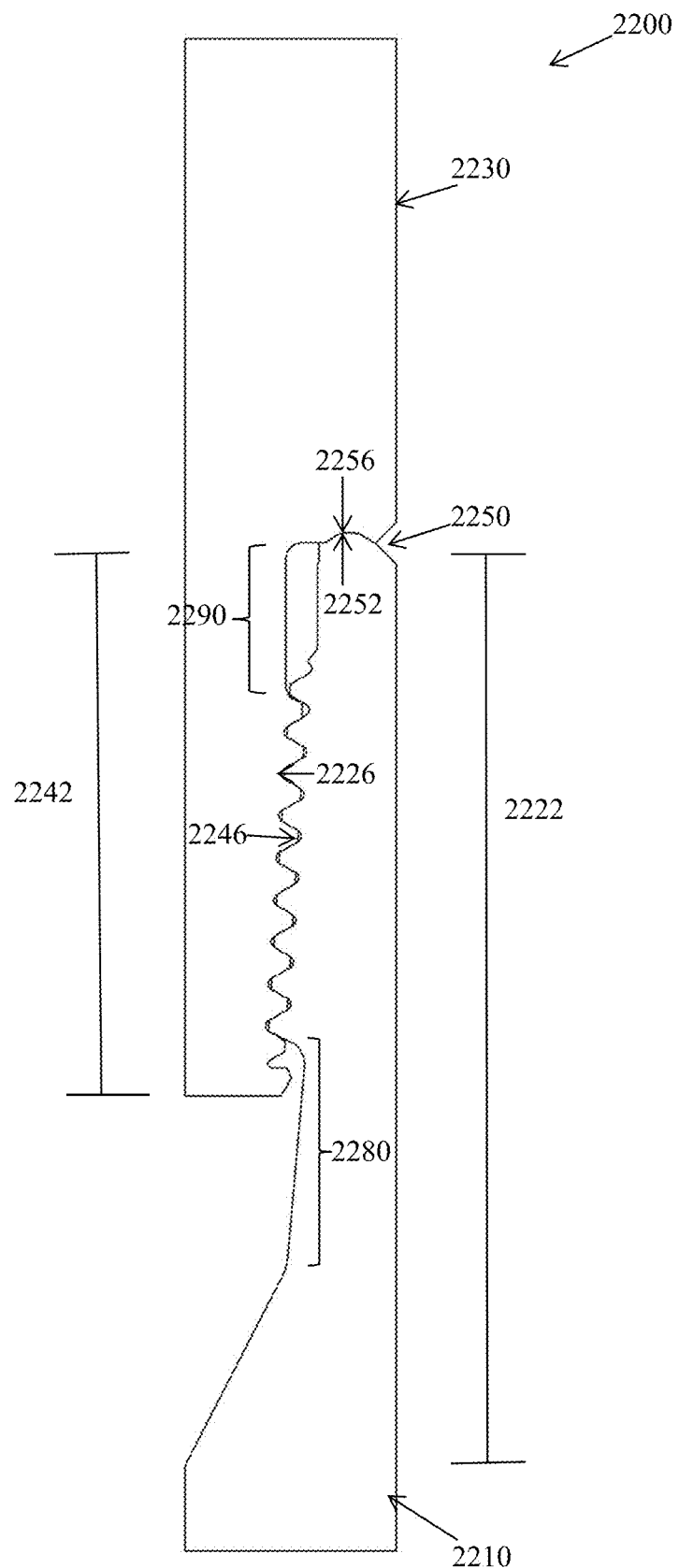
FIG. 22 illustrates a cross-sectional view of an improved single-shoulder connection with box and pin stress relief grooves according to an embodiment of the present invention.
Figure 23:
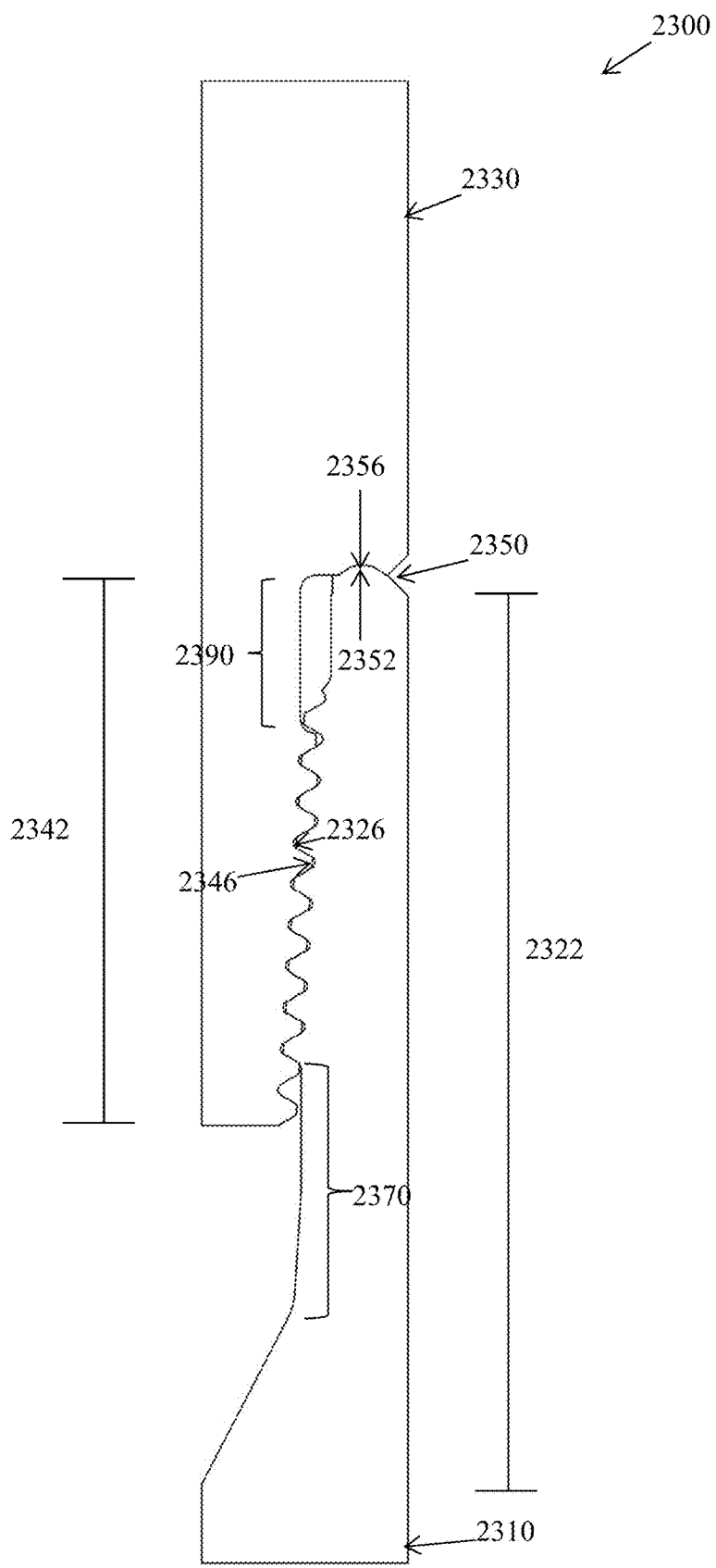
FIG. 23 illustrates a cross-sectional view of an improved single-shoulder connection with a box boreback and a pin stress relief groove according to an embodiment of the present invention.

Similar to the double-shoulder connections 1700, 1800, 1900, 2000, 2400, 2600, discussed above, a curved primary shoulder 2150, 2250, 2350, 2450 reduces box swell (e.g., box material yields) and provides better alignment of the box threads 2126, 2226, 2326 and pin threads 2146, 2246, 2346 in an improved single-shoulder connection 2100, 2200, 2300, 2400. The curved primary shoulder 2150, 2250, 2350 provides an avenue for compressive forces and elevated torques while drilling to move axially and radially (i.e., inward) into the pin connection, reducing box swell. FIGS. 21A, 22 and 23 illustrate a cross-sectional view of an improved single-shoulder connection 2100, 2200, 2300 with a curved primary shoulder 2150, 2250, 2350 according to an embodiment of the present invention. As shown in FIGS. 21A, 22 and 23, the improved single-shoulder connection 2100, 2200, 2300 comprises a box connection 2110, 2210, 2310 having a box axis (centerline) 2112, a pin connection 2130, 2230, 2330 having a pin axis (centerline) 2132, and a primary shoulder 2150, 22950, 2350.

In an embodiment, the primary shoulder 2150 comprises a primary box shoulder 2152; and a primary pin shoulder 2156. See also FIG. 1A: 112 & FIG. 1B: 132 (showing box and pin made-up).

Primary Box Shoulder

In an embodiment, the primary box shoulder 2152 may be any suitable shape. For example, suitable shapes include, but are not limited to, concave shaped, convex shaped, and variations thereof. In an embodiment, the primary shoulder 2152 may be convex shaped.

In an embodiment, the primary box shoulder 2152 may be any suitable profile. For example, suitable profiles include, but are not limited to, curved profiles, and variations thereof. In an embodiment, the primary box shoulder 2152 may be a curved profile defined by a primary axial box radius height 2190, a primary box center point 2192 and a primary box radius 2194, as discussed below.

In an embodiment, the primary axial box radius height 2190 may be from about 0.000 inch to about the length of the primary box radius 2194 in inches, and any range or value there between.

In an embodiment, the primary box center point 2192 may be located between a box counter bore diameter (i.e., two times a box counter bore radius 118) and a pin bevel diameter (i.e., two times a pin bevel radius 136). In an embodiment, the primary box center point 2192 may be about half-way between the box counter bore diameter (i.e., two times a box counter bore radius 118) and the pin bevel diameter (i.e., two times a pin bevel radius 136). In an embodiment, the primary box center point 2192 may be about [(box counter bore diameter (i.e., two times a box counter bore radius 118)+pin bevel diameter (i.e., two times a pin bevel radius 136))/2].

In an embodiment, the primary box radius 2194 may be greater than about [(pin bevel diameter (i.e., two times pin bevel radius 136)−box counter bore diameter (i.e., two times box counter bore radius 118))/4] inches, and any range or value there between.

In an embodiment, the primary box radius 2194 may be greater than about [(pin bevel diameter (i.e., two times pin bevel radius 136)−box counter bore diameter (i.e., two times box counter bore radius 118))/4] inches, and any range or value there between.

Primary Pin Shoulder

In an embodiment, the primary pin shoulder 2156 may be any suitable shape. For example, suitable shapes include, but are not limited to, concave shaped, convex shaped, and variations thereof. In an embodiment, the primary pin shoulder 2156 may be concave shaped.

In an embodiment, the primary pin shoulder 2156 may be any suitable profile. For example, suitable profiles include, but are not limited to, curved profiles, and variations thereof. In an embodiment, the primary pin shoulder 2156 may be a curved profile defined by a primary axial pin radius height 2196, a primary pin center point 2198 and a primary pin radius 21100, as discussed below.

In an embodiment, the primary axial pin radius height 2196 may be from about 0.000 inch to about the length of the primary pin radius 21100 in inches, and any range or value there between.

In an embodiment, the primary pin center point 2198 may be located between a box counter bore diameter (i.e., two times a box counter bore radius 118) and a pin bevel diameter (i.e., two times a pin bevel radius 136). In an embodiment, the primary pin center point 2198 may be about half-way between the box counter bore diameter (i.e., two times a box counter bore radius 118) and the pin bevel diameter (i.e., two times a pin bevel radius 136). In an embodiment, the primary pin center point 2198 may be about [(box counter bore diameter (i.e., two times a box counter bore radius 118)+pin bevel diameter (i.e., two times a pin bevel radius 136))/2].

In an embodiment, the primary pin radius 21100 may be greater than about [(pin bevel diameter (i.e., two times pin bevel radius 136)−box counter bore diameter (i.e., two times box counter bore radius 118))/4] inches, and any range or value there between.

In an embodiment, the primary pin radius 21100 may be greater than about [(pin bevel diameter (i.e., two times pin bevel radius 136)−box counter bore diameter (i.e., two times box counter bore radius 118))/4] inches, and any range or value there between.

In an embodiment, the primary box center point 2192 may be about equal to the primary pin center point 2198.

In an embodiment, the primary box radius 2194 may be about equal to the primary pin radius 21100 to form a first seal. In an embodiment, the primary box radius 2194 may be slightly different from the primary pin radius 21100 to form a first seal. In an embodiment, the first seal may be a gas-tight seal.

Figure 21B:
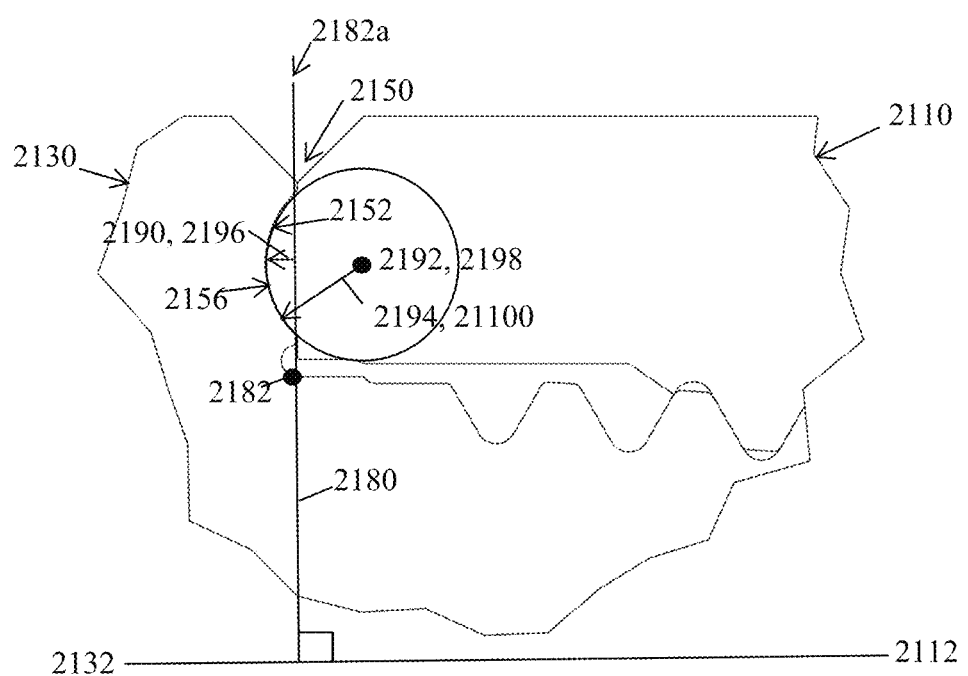
FIG. 21B illustrates a detailed view H in FIG. 21A, showing the curved primary shoulder according to an embodiment of the present invention.

FIG. 21B illustrates a detailed view H in FIG. 21A, showing the curved primary shoulder 2150 according to an embodiment of the present invention. As shown in FIG. 21B, the primary box radius 2194 and the primary pin radius 21100 may be greater than about [(pin bevel diameter (i.e., two times pin bevel radius 136)−box counter bore diameter (i.e., two times box counter bore radius 118))/4] inches. Cf. FIG. 2B (showing a standard primary shoulder 250).

In an embodiment, the improved single-shoulder connection 2100, 2200, 2300, 2400 may be made of any suitable material. For example, suitable materials include, but are not limited to, low alloy steels (e.g., 4140, 4145, 4330, etc.), stainless steels (e.g., 17-4, 304, 316, etc.), super alloys (e.g., Inconel), titanium alloys (e.g., Ti-6Al-4V, Ti-6Al-6V-25n, etc.), copper alloys (e.g., Beryllium copper), cobalt alloys (e.g., Stellite), aluminum alloys (e.g., 2024, 6061, 7075, etc.), and combinations and variations thereof. In an embodiment, the improved single-shoulder connection 2100, 2200, 2300, 2400 may be low alloy steels or stainless steels.

In an embodiment, the improved single-shoulder connection 2100, 2200, 2300, 2400 may be applied to any suitable product. For example, suitable products include, but are not limited to, drill pipe (DP), heavy weight drill pipe (HWDP), drill collars (DC), pup joints, crossover subs, saver subs, bit subs, float subs, pump-in subs, inside blowout preventers (IBOP), top drive shafts, top drive valves, safety valves, kelly valves, hoisting equipment (e.g., lift subs, lift plugs), swivels, fishing tools, mud motors, rotary steerable tools, drill bits, directional drilling bottom hole assembly (BHA) components, measurement while drilling (MWD) components, logging while drilling (LWD) components, well cleanout tools (e.g., brushes, magnets), completion tools and combinations and variations thereof. In an embodiment, the improved single-shoulder connection 2100, 2200, 2300, 2400 may be applied to drill pipe (DP) or heavy weight drill pipe (HWDP) or drill collars (DC) or pup joints.

In an embodiment, the improved single-shoulder connection 2100, 2200, 2300, 2400 may be applied to any suitable diameter drill pipe (DP). For example, suitable diameter DP include, but are not limited to, from about 2⅜-inch outer diameter (OD) to about 7⅝-inch OD, and any range or value there between.

In an embodiment, the improved single-shoulder connection 2100, 2200, 2300, 2400 may be applied to any suitable heavy weight diameter drill pipe (HWDP). For example, suitable diameter HWDP include, but are not limited to, from about 2⅞-inch OD to about 6⅝-inch OD, and any range or value there between.

In an embodiment, the improved single-shoulder connection 2100, 2200, 2300, 2400 may be applied to any suitable drill collars (DC). For example, suitable diameter DC include, but are not limited to, from about 3⅛-inch OD to about 11-inch OD, and any range or value there between.

In an embodiment, the improved single-shoulder connection 2100, 2200, 2300, 2400 may be applied to any suitable pup joints. For example, suitable diameter pup joints include, but are not limited to, from about 2⅜-inch OD to about 7⅝-inch OD, and any range or value there between.

Optional Box Stress Relief Groove and/or Pin Stress Relief Groove with Improved Double-Shoulder Connections with Angled Primary Shoulder and/or Secondary Shoulder An optional box stress relief groove 980 and/or an optional pin stress relief groove 990 may be applied to a double-shoulder connection 400, 500, 600, 700, 1200, 1400 or a single-shoulder connection 800, 900, 1000, 1200 at portion(s) where premature fatigue failure of the double-shoulder connection or the single-shoulder connection may occur as a result of alternating axial, torsional and bending loads, as discussed above with respect to FIGS. 2A-3B.

FIG. 9 illustrates a cross-sectional view of an improved single-shoulder connection 900 with an optional box stress relief groove 980 and an optional pin stress relief groove 990 according to an embodiment of the present invention. As shown in FIG. 9, the optional box stress relief groove 980 and/or the optional pin stress relief groove 990 removes unengaged threads in potentially stressed portions of the single-shoulder connection 900 so that any bending occurs in portions with smooth surfaces that are relatively free of stress concentrations.

Similar to FIG. 8A, FIG. 9 illustrates a cross-sectional view of an improved single-shoulder connection 900 with an angled primary shoulder 950 according to an embodiment of the present invention. As shown in FIGS. 8 and 9, the improved single-shoulder connection 800, 900 comprises a box connection 810, 910 having a box axis (centerline) 812, a pin connection 830, 930 having a pin axis (centerline) 832, and a primary shoulder 850, 950.

In an embodiment, the primary shoulder 850, 950 comprises a primary box shoulder 852, 952 at a primary box angle 854 with respect to a first perpendicular 880 to the box axis 812 at a first end point 882 of the box connection; and a primary pin shoulder 856, 956 at a primary pin angle 858 with respect to the first perpendicular 880 to the pin axis 832 at the first end point 882 of the pin connection. See also FIG. 1A: 112 & FIG. 1B: 132 (showing box and pin made-up). In an embodiment, the first end point 882 may be equal to a datum intersection, as discussed below.

Optional Box Stress Relief Groove and/or Pin Stress Relief Groove with Improved Double-Shoulder Connections with a Curved Primary Shoulder and/or Secondary Shoulder An optional box stress relief groove 2280 and/or an optional pin stress relief groove 2290 may be applied to a double-shoulder connection 1700, 1800, 1900, 2000, 2400, 2600 or a single-shoulder connection 2100, 2200, 2300, 2400 at portion(s) where premature fatigue failure of the double-shoulder connection or the single-shoulder connection may occur as a result of alternating axial, torsional and bending loads, as discussed above with respect to FIGS. 2A-3B.

FIG. 22 illustrates a cross-sectional view of an improved single-shoulder connection 2200 with an optional box stress relief groove 2280 and an optional pin stress relief groove 2290 according to an embodiment of the present invention. As shown in FIG. 22, the optional box stress relief groove 2280 and/or the optional pin stress relief groove 2290 removes unengaged threads in potentially stressed portions of the single-shoulder connection 2200 so that any bending occurs in portions with smooth surfaces that are relatively free of stress concentrations.

Similar to FIG. 21A, FIG. 22 illustrates a cross-sectional view of an improved single-shoulder connection 2200 with a curved primary shoulder 2250 according to an embodiment of the present invention. As shown in FIGS. 21 and 22, the improved single-shoulder connection 2100, 2200 comprises a box connection 2110, 2210 having a box axis (centerline) 2112, a pin connection 2130, 2230 having a pin axis (centerline) 2132, and a primary shoulder 2150, 2250.

In an embodiment, the curved primary shoulder 2150, 2250 comprises a primary box shoulder 2152, 2252; and a primary pin shoulder 2156, 2256. See also FIG. 1A: 112 & FIG. 1B: 132 (showing box and pin made-up).

Optional Box Boreback and Pin Stress Relief Groove with Improved Single-Shoulder Connections with Angled Primary Shoulder An optional box boreback 1070 may be applied to a single-shoulder connection 800, 900, 1000, 1200 at portion(s) where fatigue may occur as a result of bending; and an optional pin stress relief groove 1090 may be applied to a double-shoulder connection 400, 500, 600, 700, 1200, 1400 or a single-shoulder connection 800, 900, 1000, 1200 at portion(s) where fatigue may occur as a result of bending. FIG. 10 illustrates a cross-sectional view of an improved single-shoulder connection with an optional box boreback 1070 and an optional pin stress relief groove 1090 according to an embodiment of the present invention. As shown in FIG. 10, the optional box boreback 1070 and/or the optional pin stress relief groove 1090 removes unengaged threads in potentially stressed portions of the single-shoulder connection 1000 so that any bending occurs in portions with smooth surfaces that are relatively free of stress concentrations.

Similar to FIG. 8A, FIG. 10 illustrates a cross-sectional view of an improved single-shoulder connection 1000 with an angled primary shoulder 1050 according to an embodiment of the present invention. As shown in FIGS. 8 and 10, the improved single-shoulder connection 800, 1000 comprises a box connection 810, 1010 having a box axis (centerline) 812, a pin connection 830, 1030 having a pin axis (centerline) 832, and a primary shoulder 850, 1050.

In an embodiment, the primary shoulder 850, 1050 comprises a primary box shoulder 852, 1052 at a primary box angle 854 with respect to a first perpendicular 880 to the box axis 812 at a first end point 882 to the box connection; and a primary pin shoulder 856, 1056 at a primary pin angle 858 with respect to the first perpendicular 880 to the pin axis 832 at the first end point 882 of the pin connection. See also FIG. 1A: 112 & FIG. 1B: 132 (showing box and pin made-up). In an embodiment, the first end point 882 may be equal to a datum intersection, as discussed below.

Optional Box Boreback and Pin Stress Relief Groove with Improved Single-Shoulder Connections with Curved Primary Shoulder An optional box boreback 2370 may be applied to a single-shoulder connection 2100, 2200, 2300, 2400 at portion(s) where fatigue may occur as a result of bending; and an optional pin stress relief groove 2390 may be applied to a double-shoulder connection 1700, 1800, 1900, 2000, 2400, 2600 or a single-shoulder connection 2100, 2200, 2300, 2400 at portion(s) where fatigue may occur as a result of bending. FIG. 23 illustrates a cross-sectional view of an improved single-shoulder connection with an optional box boreback 2370 and an optional pin stress relief groove 2390 according to an embodiment of the present invention. As shown in FIG. 23, the optional box boreback 2370 and/or the optional pin stress relief groove 2390 removes unengaged threads in potentially stressed portions of the single-shoulder connection 2300 so that any bending occurs in portions with smooth surfaces that are relatively free of stress concentrations.

Similar to FIG. 21A, FIG. 23 illustrates a cross-sectional view of an improved single-shoulder connection 2100, 2300 with a curved primary shoulder 2150, 2350 according to an embodiment of the present invention. As shown in FIGS. 21 and 23, the improved single-shoulder connection 2100, 2300 comprises a box connection 2110, 2310 having a box axis (centerline) 2112, a pin connection 2130, 2330 having a pin axis (centerline) 2132, and a primary shoulder 2150, 2350.

In an embodiment, the curved primary shoulder 2150, 2350 comprises a primary box shoulder 2152, 2352; and a primary pin shoulder 2156, 2356. See also FIG. 1A: 112 & FIG. 1B: 132 (showing box and pin made-up).

Types of Thread Forms

Figure 11:
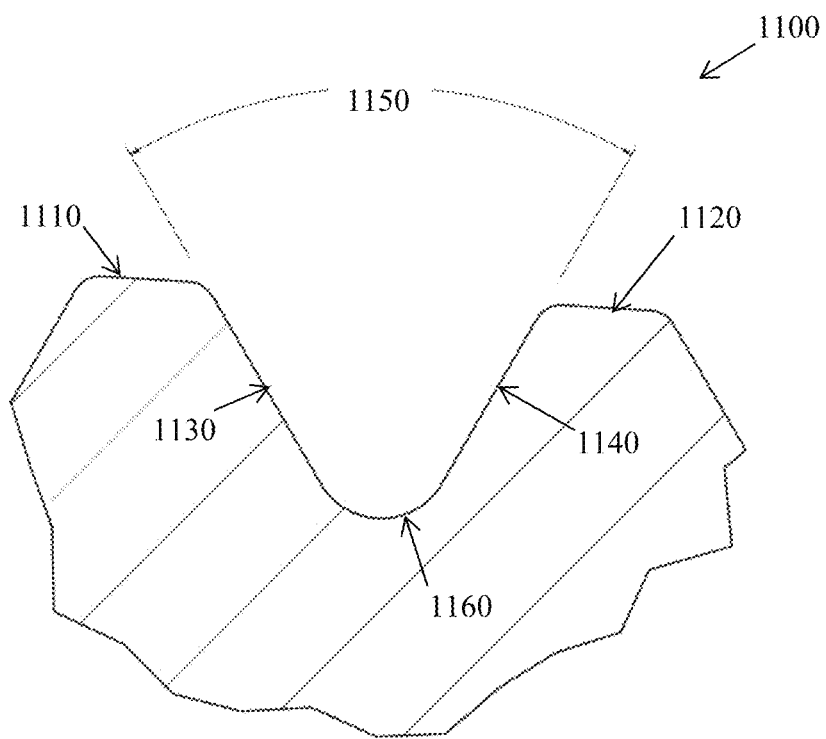
FIG. 11 illustrates a cross-sectional detailed view of a thread form according to an embodiment of the present invention.

FIG. 11 illustrates a cross-sectional detailed view of a thread form 1100 according to an embodiment of the present invention. As shown in FIG. 11, the thread form 1100 comprises a first thread crest 1110, a second thread crest 1120, a first thread flank 1130, a second thread flank 1140, an included angle 1150 between the first thread flank 1130 and second thread flank 1140, and a thread root 1160.

In an embodiment, any suitable thread form 1100 may be used for the box threads 426, 526, 626, 726, 826, 926, 1026, 1726, 1826, 1926, 2026, 2126, 2226, 2326, 2426, 2626 and/or pin threads 446, 546, 646, 746, 846, 946, 1046, 1746, 1846, 1946, 2046, 2146, 2246, 2346, 2446, 2646. For example, suitable shapes include, but are not limited to, circular, square, triangular, trapezoidal and variations thereof. In an embodiment, the thread form 1100 may be triangle shaped or a variation thereof.

For example, any suitable shape for the first thread crest 1110 and/or the second thread crest 1120 may be used for the box threads 426, 526, 626, 726, 826, 926, 1026, 1726, 1826, 1926, 2026, 2126, 2226, 2326, 2426, 2626 and/or pin threads 446, 546, 646, 746, 846, 946, 1046, 1746, 1846, 1946, 2046, 2146, 2246, 2346, 2446, 2646. For example, suitable shapes include, but are not limited to, circular, square, triangular, trapezoidal and variations thereof. In an embodiment, the first thread crest 1110 and/or the second thread crest 1120 may be triangle shaped or a variation thereof.

For example, any suitable shape for the first thread flank 1130 and/or the second thread flank 1140 may be used for the box threads 426, 526, 626, 726, 826, 926, 1026, 1726, 1826, 1926, 2026, 2126, 2226, 2326, 2426, 2626 and/or pin threads 446, 546, 646, 746, 846, 946, 1046, 1746, 1846, 1946, 2046, 2146, 2246, 2346, 2446, 2646. For example, suitable shapes include, but are not limited to, concave, convex, straight and combinations or variations thereof.

In an embodiment, any suitable shape for the thread root 1160 may be used for the box threads 426, 526, 626, 726, 826, 926, 1026, 1726, 1826, 1926, 2026, 2126, 2226, 2326, 2426, 2626 and/or pin threads 446, 546, 646, 746, 846, 946, 1046, 1746, 1846, 1946, 2046, 2146, 2246, 2346, 2446, 2646. For example, suitable shapes include, but are not limited to, circular, square, triangular, trapezoidal and variations thereof. In an embodiment, the thread root 1160 may be triangle shaped or a variation thereof.

In an embodiment, any suitable included angle 1150 may be used for the box threads 426, 526, 626, 726, 826, 926, 1026, 1726, 1826, 1926, 2026, 2126, 2226, 2326, 2426, 2626 and/or pin threads 446, 546, 646, 746, 846, 946, 1046, 1746, 1846, 1946, 2046, 2146, 2246, 2346, 2446, 2646. For example, suitable included angles 1150 may be from about 29 degrees to about 90 degrees, and any range or value there between. In an embodiment, the included angle 1150 may be about 60 degrees.

Optional Thread Treatments

An optional thread treatment may be applied to the box threads 426, 526, 626, 726, 826, 926, 1026, 1726, 1826, 1926, 2026, 2126, 2226, 2326, 2426, 2626 and/or the pin threads 446, 546, 646, 746, 846, 946, 1046, 1746, 1846, 1946, 2046, 2146, 2246, 2346, 2446, 2646 where fatigue may occur. In an embodiment, any suitable optional thread treatment may be applied to the box threads 426, 526, 626, 726, 826, 926, 1026, 1726, 1826, 1926, 2026, 2126, 2226, 2326, 2426, 2626 and/or pin threads 446, 546, 646, 746, 846, 946, 1046, 1746, 1846, 1946, 2046, 2146, 2246, 2346, 2446, 2646. For example, suitable thread treatments include, but are not limited to, cold rolling, shot peening, phosphating, fluoropolymer coating, ceramic coating, chrome plating, anodizing, and combinations or variations thereof. In an embodiment, the optional thread treatment may be cold rolling or shot peening or fluropolymer coating or anodizing.

Figure 12:
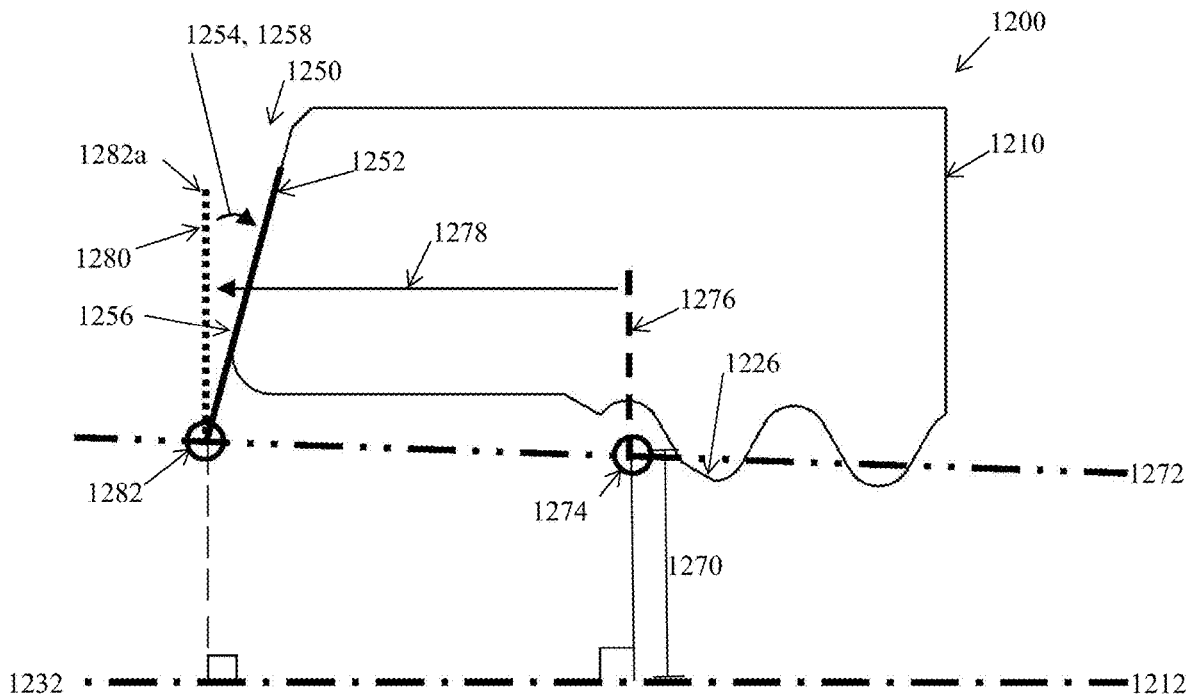
FIG. 12 illustrates a cross-sectional view of an improved primary connection shoulder according to an embodiment of the present invention.

Method for Determining a Primary Connection Shoulder Location with Angled Primary Shoulder FIG. 12 illustrates a cross-sectional view of an improved primary connection shoulder 1200 according to an embodiment of the present invention.

As shown in FIG. 12, a pitch diameter (i.e., two times the pitch radius 1270) intersects a pitch line 1272 at a first intersection 1274. A first perpendicular 1276 to the connection box/pin axis 1212, 1232 may be offset a first distance 1278 towards a primary box/pin shoulder 1250 to locate a second perpendicular 1280 to the connection box/pin axis 1212, 1232 at the first distance 1278. The pitch line 1272 intersects the second perpendicular 1280 at a second intersection 1282. In an embodiment, the second intersection 1282 may be equal to a datum intersection.

In an embodiment, the first distance 1278 may be from about 0.5 inch to about 2.50 inches, and any range or value there between. In an embodiment, the first distance 1278 may be from about 0.625 inch to about 2.250 inches. In an embodiment, the first distance 1278 may be about 0.625 inch.

In an embodiment, the primary shoulder 1250 comprises a primary box shoulder 1252 at a primary box angle 1254 with respect to a second perpendicular 1280 to the box axis 1212 at a second intersection 1282 of the box connection; and a primary pin shoulder 1256 at a primary pin angle 1258 with respect to the second perpendicular 1280 to the pin axis 1232 at the second intersection 1282 of the pin connection. See also FIG. 1A: 112 & FIG. 1B: 132 (showing box and pin made-up). In an embodiment, the second intersection 1282 may be equal to a datum intersection.

In an embodiment, the primary box shoulder 1252 may be any suitable shape. For example, suitable shapes include, but are not limited to, conical shaped, cylindrical shaped, conical-cylindrical shaped, and variations thereof. In an embodiment, the primary shoulder 1252 may be conical shaped (outside of cone, male).

In an embodiment, the primary pin shoulder 1256 may be any suitable shape. For example, suitable shapes include, but are not limited to, conical shaped, cylindrical shaped, conical-cylindrical shaped, and variations thereof. In an embodiment, the primary pin shoulder 1256 may be conical shaped (inside of cone, female).

In an embodiment, the primary box shoulder 1252 may be any suitable profile. For example, suitable profiles include, but are not limited to, angled profiles. In an embodiment, the primary box shoulder 1252 may be an angled profile defined by a primary box angle 1254, as discussed below.

In an embodiment, the primary box angle 1254 may be from greater than about 0 degrees to less than or equal to about 15 degrees, and any range or value there between. In an embodiment, the primary box angle 1254 may be from greater than about 0 degrees to less than or equal to about 10 degrees. In an embodiment, the primary box angle 1254 may be about 5 degrees.

In an embodiment, the primary pin shoulder 1256 may be any suitable profile. For example, suitable profiles include, but are not limited to, angled profiles. In an embodiment, the primary pin shoulder 1256 may be an angled profile defined by a primary pin angle 1258, as discussed below.

In an embodiment, the primary pin angle 1258 may be from greater than about 0 degrees to less than or equal to about 15 degrees, and any range or value there between. In an embodiment, the primary pin angle 1258 may be from greater than about 0 degrees to less than or equal to about 10 degrees. In an embodiment, the primary pin angle 1258 may be about 5 degrees.

In an embodiment, the primary box angle 1254 may be about equal to the primary pin angle 1258 to form a first seal.

In an embodiment, the primary box angle 1254 may be slightly different from the primary pin angle 1258 to form a first seal. In an embodiment, the first seal may be a gas-tight seal.

Figure 13:
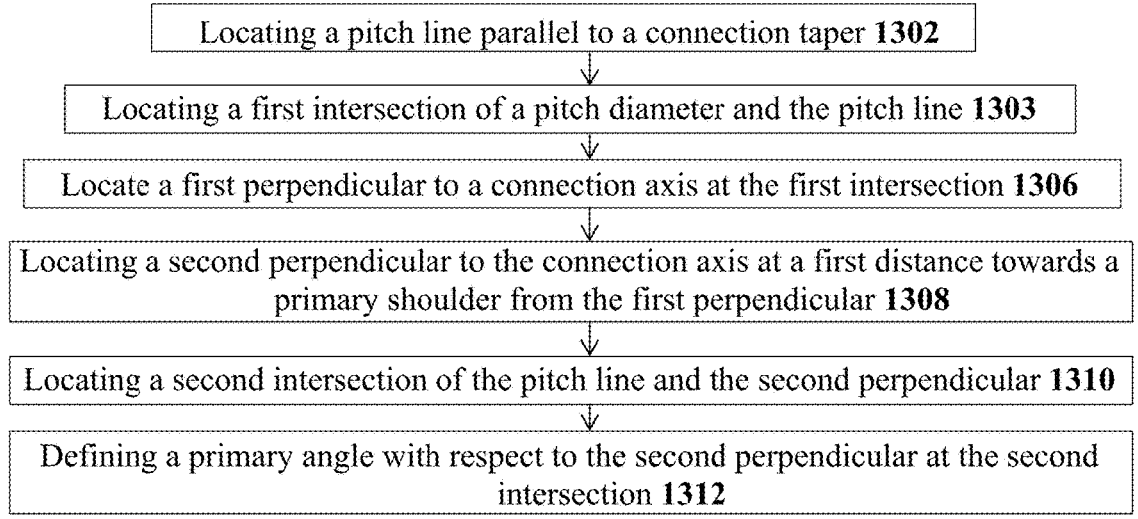
FIG. 13 illustrates a flow chart of a method for determining a primary connection shoulder location according to an embodiment of the present invention.

FIG. 13 illustrates a flowchart of a method to determine a primary connection shoulder location 1300 according to an embodiment of the present invention. As shown in FIG. 13, the method 1300 comprises locating a pitch line parallel to a connection box/pin taper 1302; locating a first intersection of a pitch diameter and the pitch line 1304; locating a first perpendicular to a connection box/pin axis at the first intersection 1306; locating a second perpendicular to the connection pin/box axis at a first distance towards a primary box/pin shoulder from the first perpendicular (and parallel to the first perpendicular) 1308; and locating a second intersection of the pitch line and the second perpendicular 1310.

In an embodiment, the method 1300 further comprises defining a primary box/pin angle with respect to the second perpendicular at the second intersection 1312.

Method for Determining a Primary Connection Shoulder Location with Curved Primary Shoulder FIGS. 24A, 24B-1 and 24B-2 illustrate cross-sectional views of an improved primary connection shoulder 2400 according to an embodiment of the present invention.

Figure 24A:
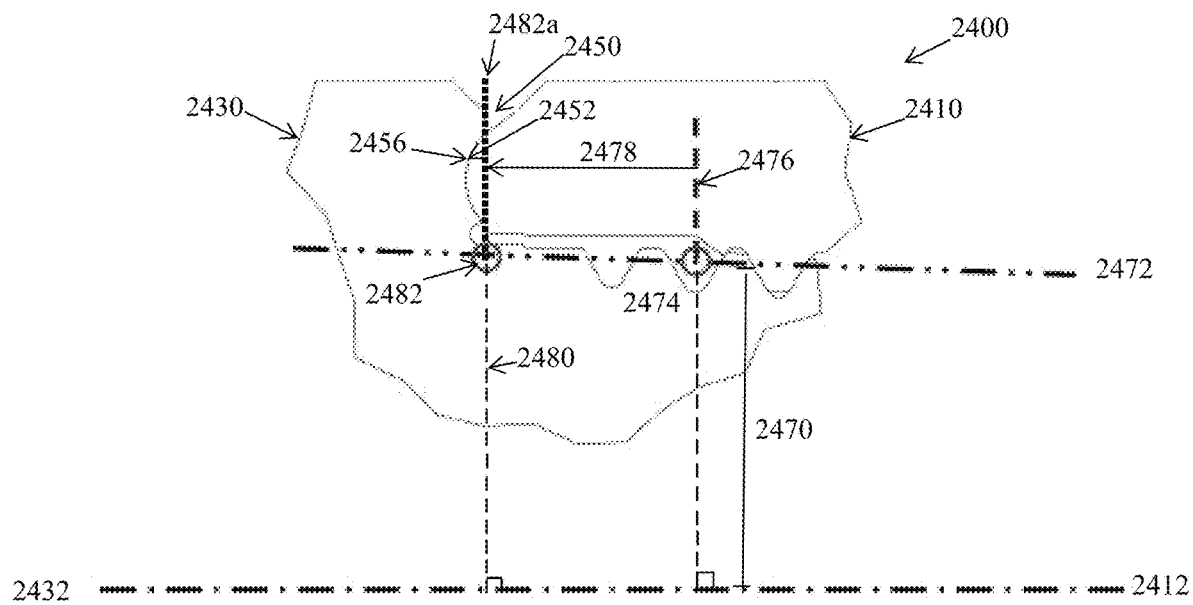
FIG. 24A illustrates a cross-sectional view of an improved double- or single-shoulder connection with a curved primary connection shoulder according to an embodiment of the present invention.
Figures 1, 24B:
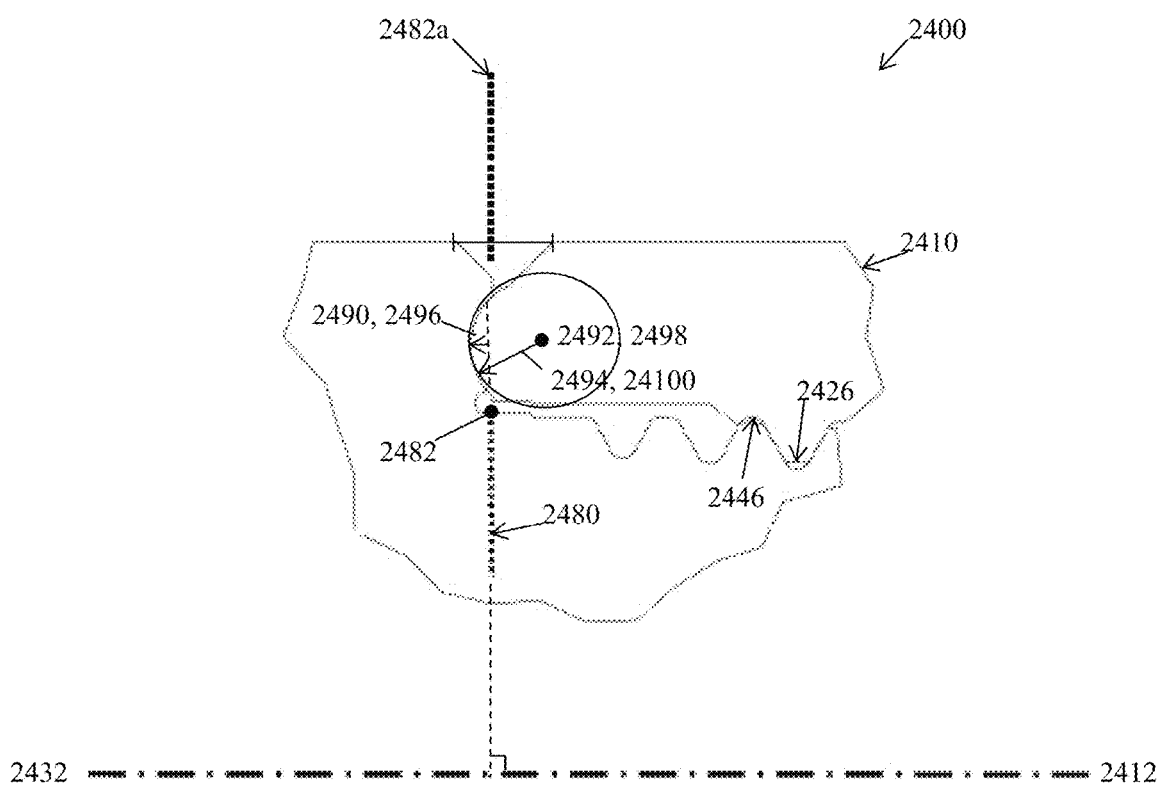
FIG. 24B-1 illustrates a detailed view of the double- or single-shoulder connection in FIG. 24A, showing the curved primary connection shoulder according to an embodiment of the present invention.

As shown in FIGS. 24A and 24B-1, a pitch diameter (i.e., two times the pitch radius 2470) intersects a pitch line 2472 at a first intersection 2474. A first perpendicular 2476 to the connection box/pin axis 2412, 2432 may be offset a first distance 2478 towards a primary box/pin shoulder 2450 to locate a second perpendicular 2480 to the connection box/pin axis 2412, 2432 at the first distance 2478. The pitch line 2472 intersects the second perpendicular 2480 at a second intersection 2482. In an embodiment, the second intersection 2482 may be equal to a datum intersection.

In an embodiment, the first distance 2478 may be from about 0.5 inch to about 2.50 inches, and any range or value there between. In an embodiment, the first distance 2478 may be from about 0.625 inch to about 2.250 inch. In an embodiment, the first distance 2478 may be about 0.625 inches.

In an embodiment, a first reference plane 2482a may be co-planer with the second perpendicular 2480 and perpendicular to the connection box/pin axis 2412, 2432.

In an embodiment, the primary shoulder 2450 comprises a primary box shoulder 2452; and a primary pin shoulder 2456. See also FIG. 1A: 112 & FIG. 1B: 132 (showing box and pin made-up).

Primary Box Shoulder

In an embodiment, the primary box shoulder 2452 may be any suitable shape. For example, suitable shapes include, but are not limited to, concave shaped, conical shaped, convex shaped, cylindrical shaped, conical-cylindrical shaped, and variations thereof. In an embodiment, the primary shoulder 2452 may be convex shaped.

In an embodiment, the primary box shoulder 2452 may be any suitable profile. For example, suitable profiles include, but are not limited to, angled profiles, curved profiles, and variations thereof. In an embodiment, the primary box shoulder 2452 may be a curved profile defined by a primary axial box radius height 2490, a primary box center point 2492 and a primary box radius 2494, as discussed below.

In an embodiment, the primary axial box radius height 2490 may be from about 0.000 inch to about the length of the primary box radius 2494 in inches, and any range or value there between.

In an embodiment, the primary box center point 2492 may be located between the box counter bore diameter (i.e., two times box counter bore radius 118) and the pin bevel diameter (i.e., two times the pin bevel radius 136), and any range or value there between. In an embodiment, the primary box center point 2492 may be about half-way between the box counter bore diameter (i.e., two times a box counter bore radius 118) and the pin bevel diameter (i.e., two times a pin bevel radius 136). In an embodiment, the primary box center point 2492 may be located at about [(pin bevel diameter (i.e., two times pin bevel radius 136)+box counter bore diameter (i.e., two times box counter bore radius 118))/2].

In an embodiment, the primary box radius 2494 may be greater than about [(pin bevel diameter (i.e., two times pin bevel radius 136)−box counter bore diameter (i.e., two times box counter bore radius 118))/4] inches.

In an embodiment, the primary box radius 2494 may be greater than about [(pin bevel diameter (i.e., two times pin bevel radius 136)−box counter bore diameter (i.e., two times box counter bore radius 118))/4] inches.

Primary Pin Shoulder

In an embodiment, the primary pin shoulder 2456 may be any suitable shape. For example, suitable shapes include, but are not limited to, concave shaped, conical shaped, convex shaped, cylindrical shaped, conical-cylindrical shaped, and variations thereof. In an embodiment, the primary pin shoulder 2456 may be concave shaped.

In an embodiment, the primary pin shoulder 2456 may be any suitable profile. For example, suitable profiles include, but are not limited to, curved profiles, and variations thereof. In an embodiment, the primary pin shoulder 2456 may be a curved profile defined by a primary axial pin radius height 2496, a primary pin center point 2498 and a primary pin radius 24100, as discussed below.

In an embodiment, the primary axial pin radius height 2496 may be from about 0.000 inch to about the length of the primary pin radius 24100 in inches, and any range or value there between.

In an embodiment, the primary axial box radius height 2490 may be about equal to the primary axial pin radius height 2496.

In an embodiment, the primary pin center point 2498 may be located between the box counter bore diameter (i.e., two times box counter bore radius 118) and the pin bevel diameter (i.e., two times the pin bevel radius 136), and any range or value there between. In an embodiment, the primary pin center point 2498 may be about half-way between the box counter bore diameter (i.e., two time a box counter bore radius 118) and the pin bevel diameter (i.e., two times a pin bevel radius 136). In an embodiment, the primary pin center point 2498 may be located at about [(pin bevel diameter (i.e., two times pin bevel radius 136)+box counter bore diameter (i.e., two times box counter bore radius 118))/2] inches.

In an embodiment, the primary pin radius 24100 may be greater than about [(pin bevel diameter (i.e., two times pin bevel radius 136)−box counter bore diameter (i.e., two times box counter bore radius 118))/4] inches.

In an embodiment, the primary pin radius 24100 may be greater than about [(pin bevel diameter (i.e., two times pin bevel radius 136)−box counter bore diameter (i.e., two times box counter bore radius 118))/4] inches.

In an embodiment, the primary box radius 2494 may be about equal to the primary pin radius 24100 to form a first seal. In an embodiment, the primary box radius 2494 may be slightly different from the primary pin radius 24100 to form a first seal. In an embodiment, the first seal may be a gas-tight seal.

Figures 2, 24B:
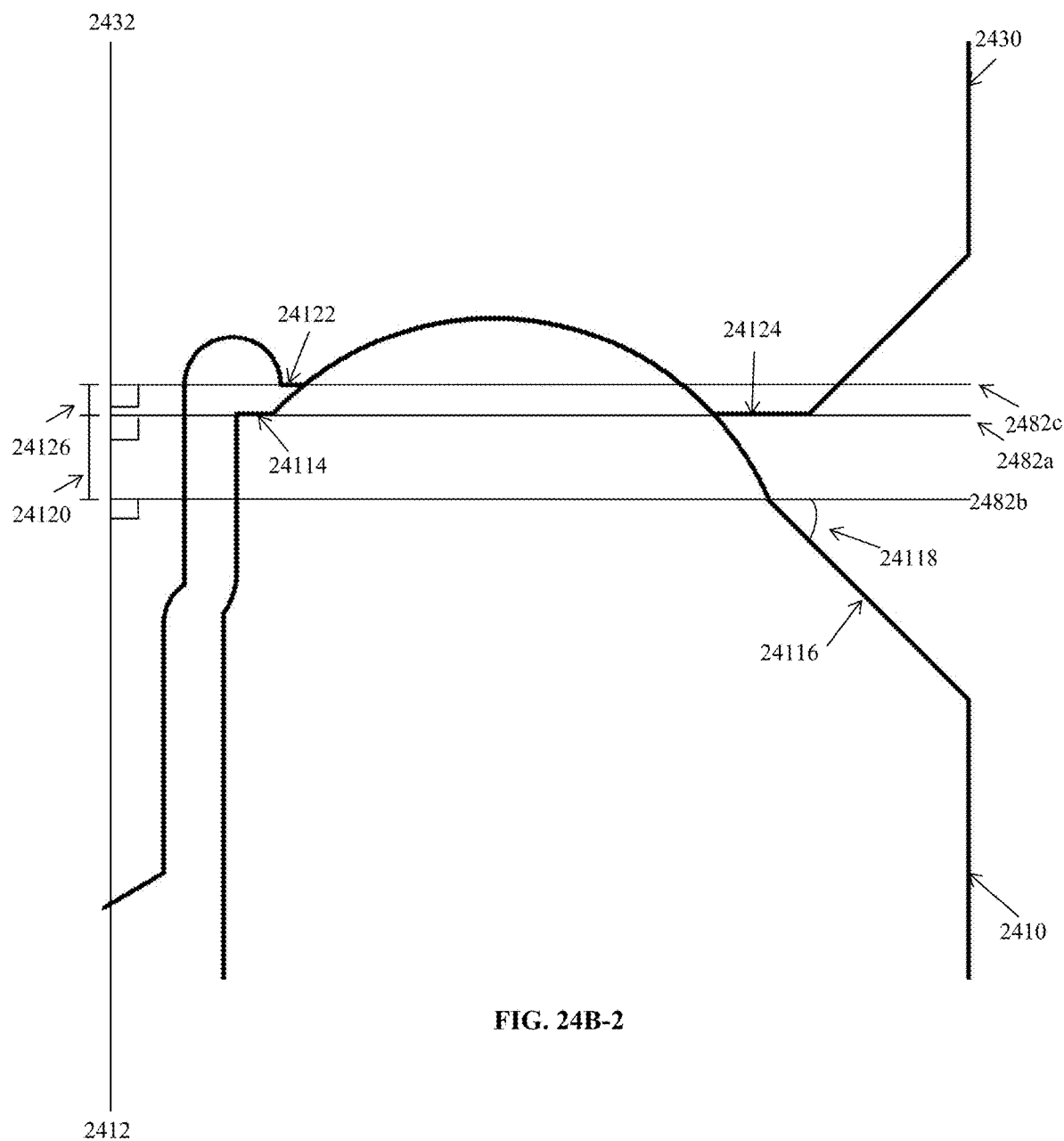

As shown in FIG. 24B-2, the primary box shoulder 2452 may have a first flat region 24114 at an inner edge of the curved profile and/or a first angled region 24116 at an outer edge of the curved profile.

In an embodiment, the first flat region 24114 may be co-planer with the first reference plane 2482a and perpendicular to the connection axis 2412, 2432.

In an embodiment, the first angled region 24116 may be at a first angled region angle 24118 with respect to a first offset reference plane 2482b. In an embodiment, the first offset reference plane 2482b may be a first offset distance 24120 from the first reference plane 2482a towards the box threads 2426.

In an embodiment, the first angled region angle 24118 may be from about 10 degrees to about 65 degrees, and any range or value there between. In an embodiment, the first angled region angle 24118 may be from about 15 degrees to about 60 degrees. In an embodiment, the first angled region angle 24118 may be about 45 degrees.

In an embodiment, the first offset distance 24120 may be from about 0.010 inch to about 0.030 inch, and any range or value there between. In an embodiment, the first offset distance 24120 may be about 0.015 inch.

As shown in FIG. 24B-2, the primary pin shoulder 2456 may have a second flat region 24122 at an inner edge of the curved profile and/or a third flat region 24124 at an outer edge of the curved profile.

In an embodiment, the second flat region 24122 at the inner edge of the curved profile may be coplanar with a second offset reference plane 2482c. In an embodiment, the second offset reference plane 2482c may be a second offset distance 24126 from the first reference plane 2482a away from the pin threads 2446.

In an embodiment, the second flat distance 24126 may be from about 0.010 inch to about 0.030 inch, and any range or value there between. In an embodiment, the second flat distance 24126 may be about 0.015 inch.

In an embodiment, the third flat region 24124 at the outer edge of the curved profile may be co-planer with the first reference plane 2482*a*.

Figure 24C:
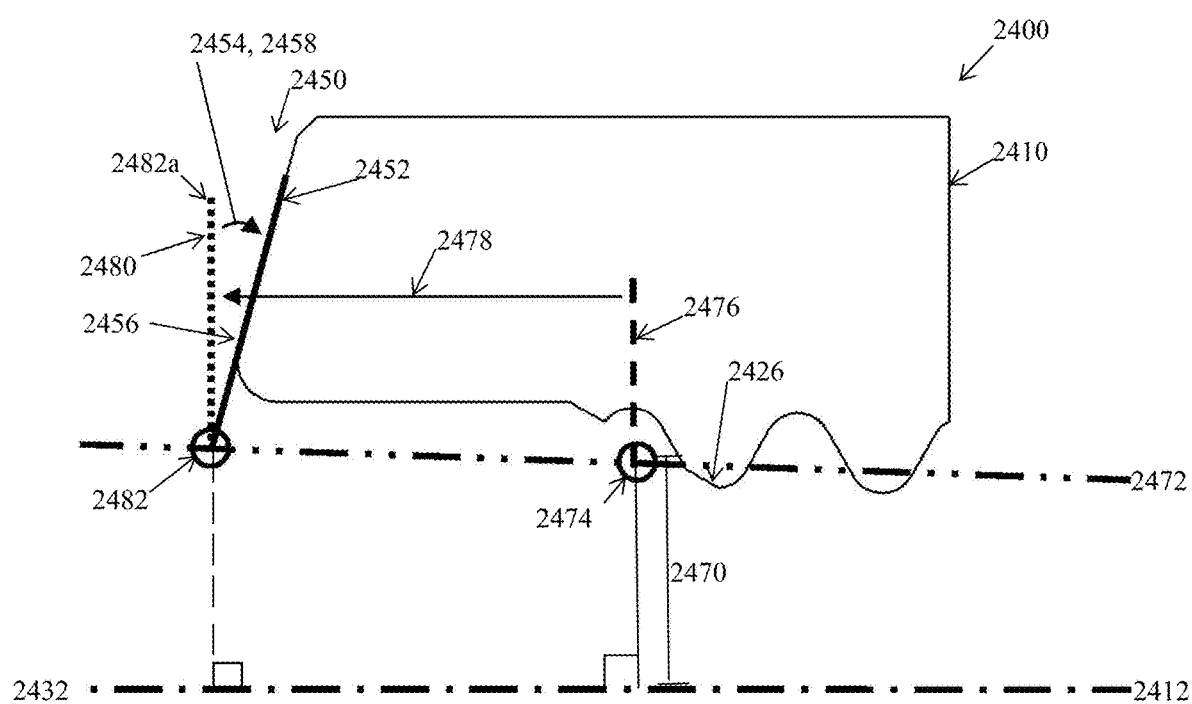
FIG. 24C illustrates a cross-sectional view of an improved double- or single shoulder connection with an angled primary connection shoulder according to an embodiment of the present invention.

FIG. 24C illustrates a cross-sectional view of an improved primary connection shoulder 2400 according to an embodiment of the present invention.

As shown in FIG. 24C, a pitch diameter (i.e., two times the pitch radius 2470) intersects a pitch line 2472 at a first intersection 2474. A first perpendicular 2476 to the connection box/pin axis 2412, 2432 may be offset a first distance 2478 towards a primary box/pin shoulder 2450 to locate a second perpendicular 2480 to the connection box/pin axis 2412, 2432 at the first distance 2478. The pitch line 2472 intersects the second perpendicular 2480 at a second intersection 2482. In an embodiment, the second intersection 2482 may be equal to a datum intersection In an embodiment, the first distance 2478 may be from about 0.5 inch to about 2.50 inches, and any range or value there between. In an embodiment, the first distance 2478 may be from about 0.625 inch to about 2.250 inches. In an embodiment, the first distance 2478 may be about 0.625 inch.

In an embodiment, the primary shoulder 2450 comprises a primary box shoulder 2452 at a primary box angle 2454 with respect to a second perpendicular 2480 to the box axis 2412 at a second intersection 2482 of the box connection; and a primary pin shoulder 2456 at a primary pin angle 2458 with respect to the second perpendicular 2480 to the pin axis 2432 at the second intersection 2482 of the pin connection. See also FIG. 1A: 112 & FIG. 1B: 132 (showing box and pin made-up). In an embodiment, the second intersection 2482 may be equal to a datum intersection.

In an embodiment, the primary box shoulder 2452 may be any suitable shape. For example, suitable shapes include, but are not limited to, conical shaped, cylindrical shaped, conical-cylindrical shaped, and variations thereof. In an embodiment, the primary shoulder 2452 may be conical shaped (outside of cone, male).

In an embodiment, the primary pin shoulder 2456 may be any suitable shape. For example, suitable shapes include, but are not limited to, conical shaped, cylindrical shaped, conical-cylindrical shaped, and variations thereof. In an embodiment, the primary pin shoulder 2456 may be conical shaped (inside of cone, female).

In an embodiment, the primary box shoulder 2452 may be any suitable profile. For example, suitable profiles include, but are not limited to, angled profiles. In an embodiment, the primary box shoulder 2452 may be an angled profile defined by a primary box angle 2454, as discussed below.

In an embodiment, the primary box angle 2454 may be from greater than about 0 degrees to less than or equal to about 15 degrees, and any range or value there between. In an embodiment, the primary box angle 2454 may be from greater than about 0 degrees to less than or equal to about 10 degrees. In an embodiment, the primary box angle 2454 may be about 5 degrees. In an embodiment, the primary box angle 2454 may be about 0 degrees.

In an embodiment, the primary pin shoulder 2456 may be any suitable profile. For example, suitable profiles include, but are not limited to, angled profiles. In an embodiment, the primary pin shoulder 2456 may be an angled profile defined by a primary pin angle 2458, as discussed below.

In an embodiment, the primary pin angle 2458 may be from greater than about 0 degrees to less than or equal to about 15 degrees, and any range or value there between. In an embodiment, the primary pin angle 2458 may be from greater than about 0 degrees to less than or equal to about 10 degrees. In an embodiment, the primary pin angle 2458 may be about 5 degrees. In an embodiment, the primary pin angle 2458 may be about 0 degrees.

In an embodiment, the primary box angle 2454 may be about equal to the primary pin angle 2458 to form a first seal.

In an embodiment, the primary box angle 2454 may be slightly different from the primary pin angle 2458 to form a first seal. In an embodiment, the first seal may be a gas-tight seal.

FIG. 25 illustrates a flowchart of a method to determine a primary connection shoulder location 2500 according to an embodiment of the present invention. As shown in FIG. 25, the method 2500 comprises locating a pitch line parallel to a connection box/pin taper 2502; locating a first intersection of a pitch diameter and the pitch line 2504; locating a first perpendicular to a connection box/pin axis at the first intersection 2506; locating a second perpendicular to the connection pin/box axis at a first distance towards a primary box/pin shoulder from the first perpendicular (and parallel to the first perpendicular) 2508; and locating a first reference plane co-planer with the second perpendicular and perpendicular to the connection box/pin axis, and, optionally, locating a second intersection of the pitch line and the second perpendicular 2510.

In an embodiment, the method 2500 further comprises selecting a primary axial box/pin radius height, selecting a primary box/pin radius and locating a primary box/pin center point between a box counter bore diameter and a pin bevel diameter 2512.

In an embodiment, the method 2500 further comprises, defining a primary box/pin curved profile with respect to primary axial box/pin radius height, the primary box/pin center point and the primary box/pin radius, and, optionally, defining a primary box/pin angle with respect to the second perpendicular at the second intersection 2514.

Figure 14:
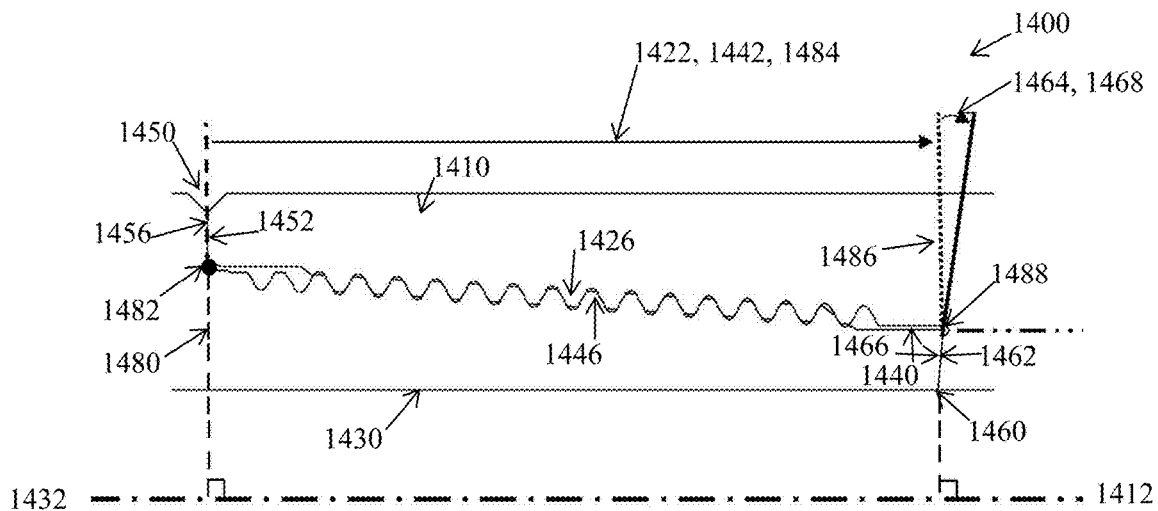
FIG. 14 illustrates a cross-sectional view of an improved secondary connection shoulder according to an embodiment of the present invention.

Method for Determining a Secondary Connection Shoulder Location with Angled Secondary Shoulder FIG. 14 illustrates a cross-sectional view of an improved secondary connection shoulder 1400 according to an embodiment of the present invention. As discussed above with respect to FIG. 12, the pitch line 1272 intersects the second perpendicular 1280, 1480 at a second intersection 1282. In an embodiment, the second intersection 1282 may be equal to a datum intersection.

A second perpendicular 1480 to the connection box/pin axis 1412, 1432 may be offset a second distance 1484 towards a secondary box/pin shoulder 1460 to locate a third perpendicular 1486 to the connection box/pin axis 1412, 1432 at the second distance 1484.

The pin nose outer diameter (i.e., two times pin nose radius 1440) intersects the third perpendicular 1486 at a third intersection 1488.

In an embodiment, the second distance 1484 may be any suitable distance. In an embodiment, the second distance 1484 may be equal to the connection length. The connection length varies with connection size.

In an embodiment, the second distance 1484 may be about 2 inches to about 8 inches, and any range or value there between.

In an embodiment, the secondary shoulder 1460 comprises a secondary box shoulder 1462 at a secondary box angle 1464 with respect to a third perpendicular 1486 to the box axis 1412 at a third intersection 1488 of the box connection; and a secondary pin shoulder 1466 at a secondary pin angle 1468 with respect to the third perpendicular 1486 to the pin axis 1432 at the third intersection 1488 of the pin connection. See also FIG. 1A: 112 & FIG. 1B: 132 (showing box and pin made-up).

In an embodiment, the secondary box shoulder 1462 may be any suitable shape. For example, suitable shapes include, but are not limited to, conical shaped, cylindrical shaped, conical-cylindrical shaped, and variations thereof. In an embodiment, the secondary shoulder 1462 may be conical shaped (outside of cone, male).

In an embodiment, the secondary pin shoulder 1466 may be any suitable shape. For example, suitable shapes include, but are not limited to, conical shaped, cylindrical shaped, conical-cylindrical shaped, and variations thereof. In an embodiment, the secondary pin shoulder 1466 may be conical shaped (inside of cone, female).

In an embodiment, the secondary box shoulder 1462 may be any suitable profile. For example, suitable profiles include, but are not limited to, angled profiles. In an embodiment, the secondary box shoulder 1462 may be an angled profile defined by a secondary box angle 1464, as discussed below.

In an embodiment, the secondary box angle 1464 may be from greater than or equal to about 0 degrees to less than or equal to about 15 degrees, and any range or value there between. In an embodiment, the secondary box angle 1464 may be from greater than or equal to about 0 degrees to less than or equal to about 10 degrees. In an embodiment, the secondary box angle 1464 may be about 5 degrees.

In an embodiment, the secondary pin shoulder 1466 may be any suitable profile. For example, suitable profiles include, but are not limited to, angled profiles. In an embodiment, the secondary pin shoulder 1466 may be an angled profile defined by a secondary pin angle 1468, as discussed below.

In an embodiment, the secondary pin angle 1468 may be from greater than or equal to about 0 degrees to less than or equal to about 15 degrees, and any range or value there between. In an embodiment, the secondary pin angle 1468 may be from greater than or equal to about 0 degrees to less than or equal to about 10 degrees. In an embodiment, the secondary pin angle 1468 may be about 5 degrees.

In an embodiment, the secondary box angle 1464 may be about equal to the secondary pin angle 1468 to form a torque shoulder.

In an embodiment, the secondary box angle 1464 may be slightly different from the secondary pin angle 1468 to form a torque shoulder that is a second seal. In an embodiment, the torque shoulder or second seal may be a gas-tight seal.

Figure 15:
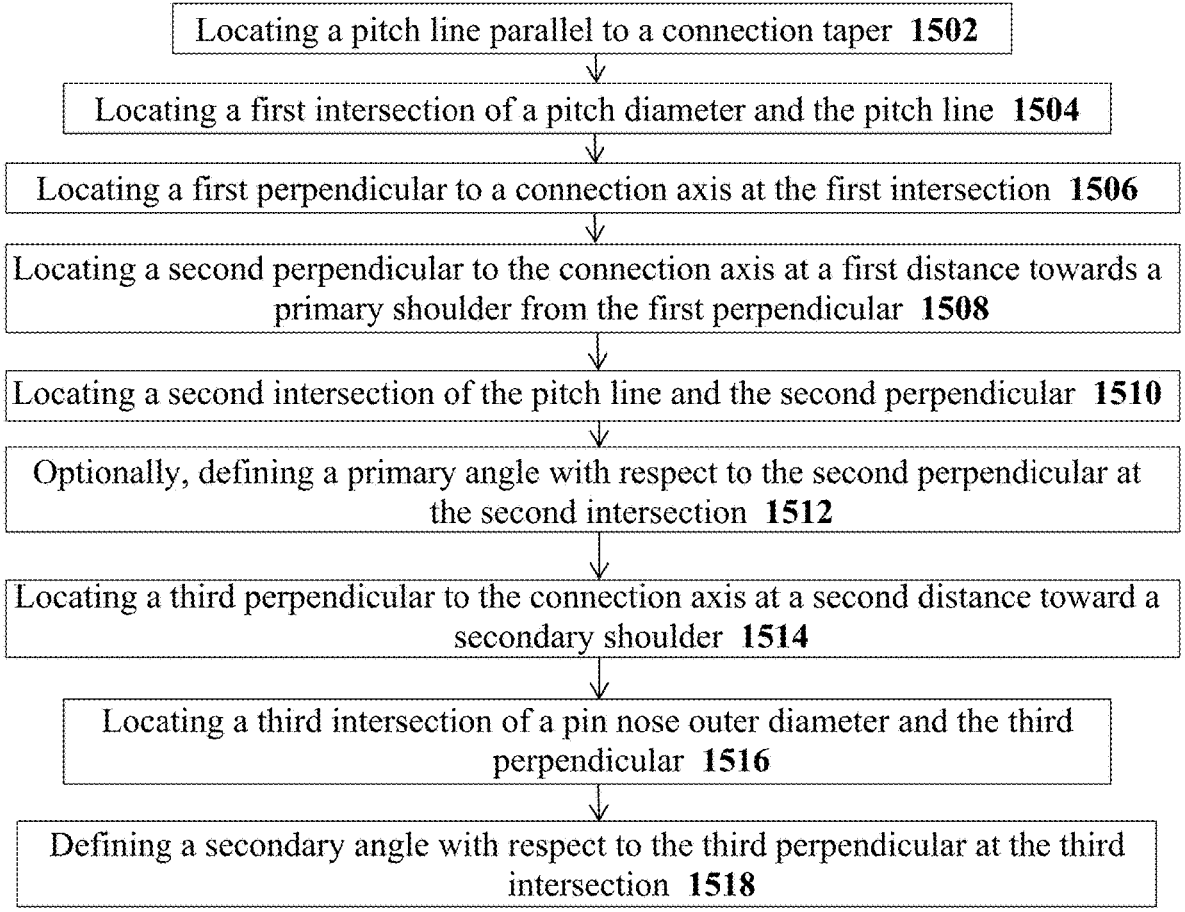
FIG. 15 illustrates a flowchart of a method for determining a secondary connection shoulder location according to an embodiment of the present invention.

FIG. 15 illustrates a flowchart of a method to determine a secondary connection shoulder location 1500 according to an embodiment of the present invention. As shown in FIG. 15, the method 1500 comprises locating a pitch line parallel to a connection box/pin taper 1502; locating a first intersection of a pitch diameter and the pitch line 1504; locating a first perpendicular to the connection box/pin axis at the first intersection 1506; locating a second perpendicular to the connection pin/box axis at a first distance towards a primary box/pin shoulder from the first perpendicular (and parallel to the first perpendicular) 1508; locating a second intersection of the pitch line and the second perpendicular 1510; optionally, defining a primary box/pin angle with respect to the second perpendicular at the second intersection 1512; locating a third perpendicular to the connection box/pin axis at a second distance (connection length) toward a secondary box/pin shoulder (and parallel to the second perpendicular) 1514; and locating a third intersection of a pin nose outer diameter and the third perpendicular 1516.

In an embodiment, the method 1500 further comprises defining a secondary box/pin angle with respect to the third perpendicular at the third intersection 1518.

Method for Determining a Secondary Connection Shoulder Location with Curved Secondary Shoulder FIGS. 26A, 26B-1 and 26B-2 illustrate cross-sectional views of an improved secondary connection shoulder 2600 according to an embodiment of the present invention. As discussed above with respect to FIG. 24, the pitch line 2472 intersects the second perpendicular 2480, 2680 at a second intersection 2482, 2682. In an embodiment, the second intersection 2482, 2682 may be equal to a datum intersection.

Figure 26A:
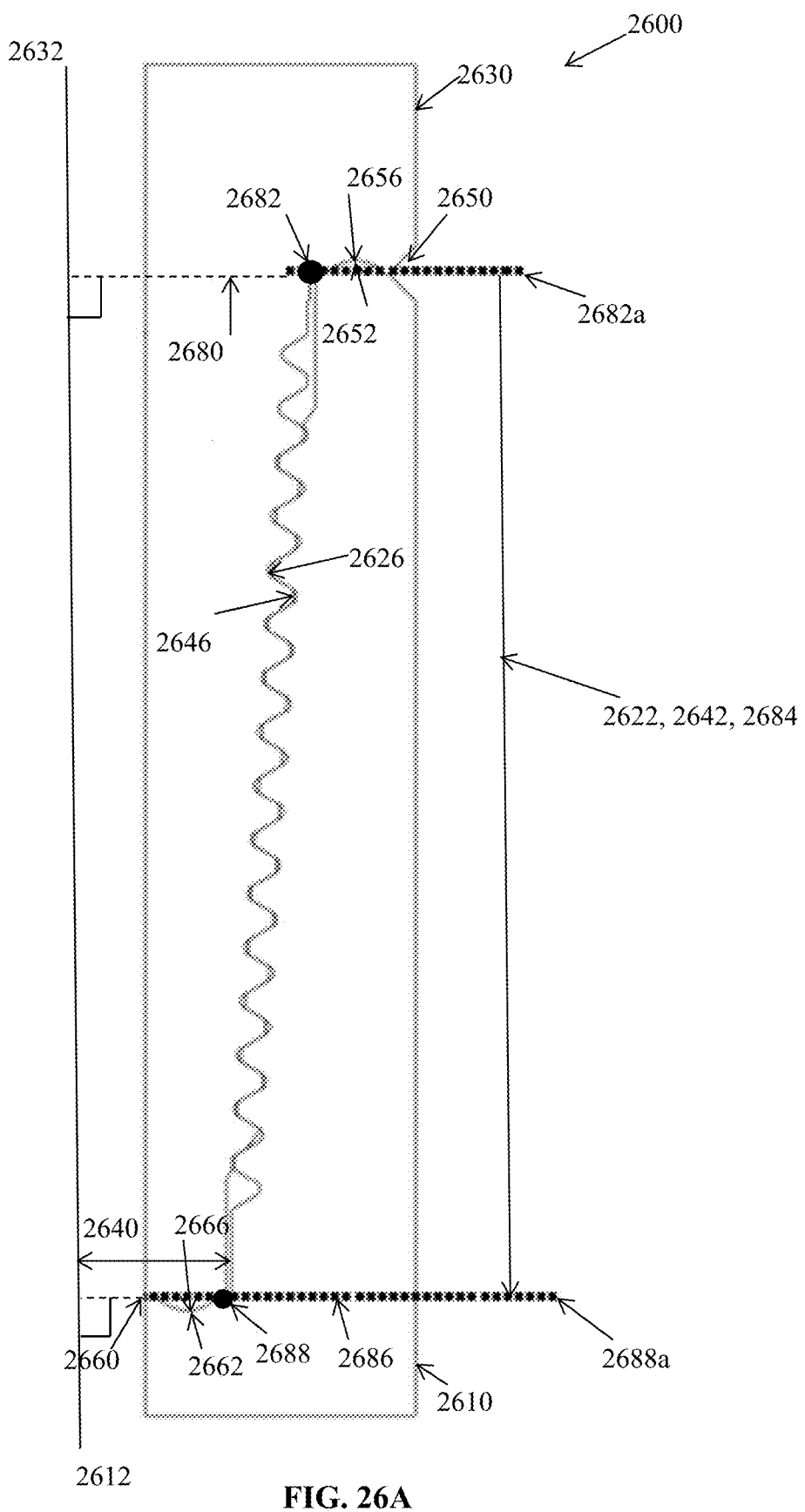
FIG. 26A illustrates a cross-sectional view of an improved double-shoulder connection with a curved primary connection shoulder and a curved secondary connection shoulder according to an embodiment of the present invention.
Figures 1, 26B:
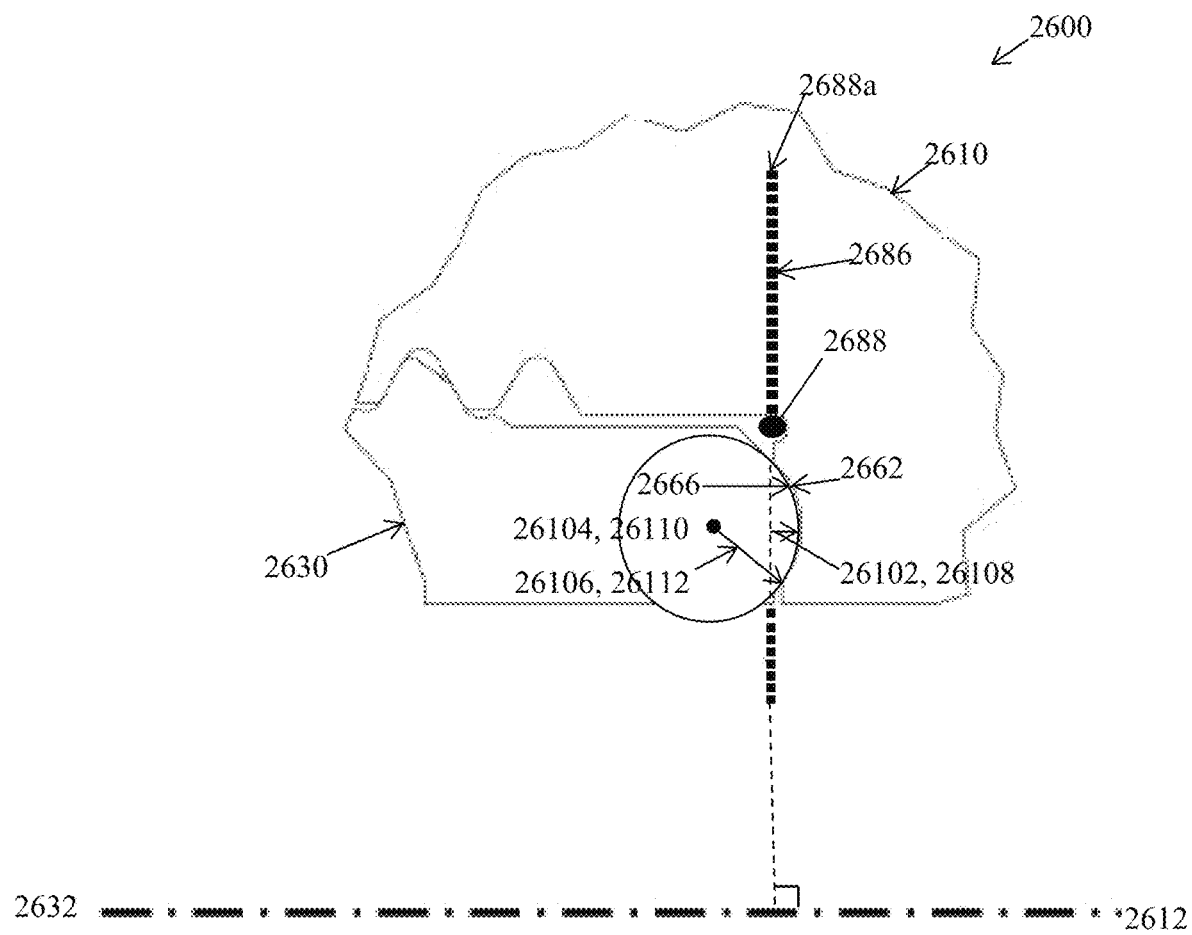
Figures 2, 26B:
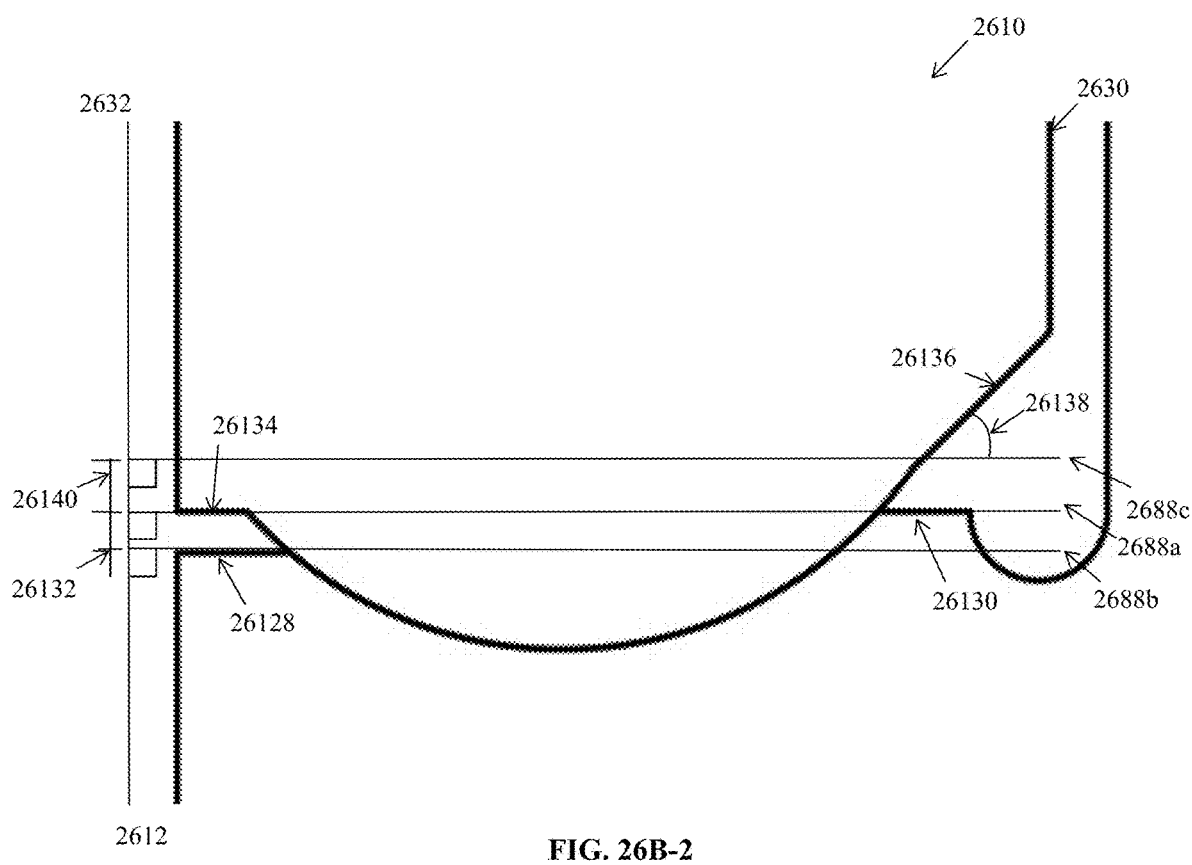

As shown in FIGS. 26A and 26B-1, a second perpendicular 2680 to the connection box/pin axis 2612, 2632 may be offset a second distance 2684 towards a secondary box/pin shoulder 2660 to locate a third perpendicular 2686 to the connection box/pin axis 2612, 2632 at the second distance 2684.

The pin nose outer diameter (i.e., two times the pin radius 2640) intersects the third perpendicular 2686 at a third intersection 2688.

In an embodiment, the second distance 2684 may be any suitable distance. In an embodiment, the second distance 2684 may be equal to the connection length. The connection length varies with connection size.

In an embodiment, the second distance 2684 may be from about 1 inch to about 8 inches, and any range or value there between. In an embodiment, the second distance 2684 may be from about 2 inches to about 8 inches.

In an embodiment, the secondary shoulder 2660 comprises a secondary box shoulder 2662; and a secondary pin shoulder 2666. See also FIG. 1A: 112 & FIG. 1B: 132 (showing box and pin made-up).

Secondary Box Shoulder

In an embodiment, the secondary box shoulder 2662 may be any suitable shape. For example, suitable shapes include, but are not limited to, concave shaped, conical shaped, convex shaped, cylindrical shaped, conical-cylindrical shaped, and variations thereof. In an embodiment, the secondary shoulder 2662 may be concave shaped.

In an embodiment, the secondary box shoulder 2662 may be any suitable profile. For example, suitable profiles include, but are not limited to, angled profiles, curved profiles, and variations thereof. In an embodiment, the secondary box shoulder 2662 may be a curved profile defined by a secondary axial box radius height 26102, a secondary box center point 26104 and a secondary box radius 26106, as discussed below.

In an embodiment, the secondary axial box radius height 26102 may be from about 0.000 inch to about the length of the secondary box radius 26106 in inches, and any range or value there between.

In an embodiment, the secondary box center point 26104 may be located between a pin nose outer diameter (i.e., two times pin nose radius 140) and a pin nose inner diameter (i.e., two times pin nose inner radius 240*a*), and any range or value there between. In an embodiment, the secondary box center point 26104 may be located about half-way between a pin nose outer diameter (i.e., two times pin nose radius 140) and a pin nose inner diameter (i.e., two times pin nose inner radius 240*a*). In an embodiment, the secondary box center point 26104 may be located about [(pin nose outer diameter (i.e., two times pin nose radius 140)+pin nose inner diameter (i.e., two times pin nose inner radius 240*a*))/2].

In an embodiment, the secondary box radius 26106 may be greater than about [(pin nose outer diameter (i.e., two times pin nose radius 140)−pin nose inner diameter (i.e., two times pin nose inner radius 240*a*))/4] inches, and any range or value there between.

Secondary Pin Shoulder

In an embodiment, the secondary pin shoulder 2666 may be any suitable shape. For example, suitable shapes include, but are not limited to, concave shaped, conical shaped, convex shaped, cylindrical shaped, conical-cylindrical shaped, and variations thereof. In an embodiment, the secondary pin shoulder 2666 may be convex shaped.

In an embodiment, the secondary pin shoulder 2666 may be any suitable profile. For example, suitable profiles include, but are not limited to, angled profiles, curved profiles, and variations thereof. In an embodiment, the secondary pin shoulder 2666 may be a curved profile defined by a secondary axial pin radius height 26108, a secondary pin center point 26110 and a secondary pin radius 26112, as discussed below.

In an embodiment, the secondary axial pin radius height 26108 may be from about 0.000 inch to about the length of the secondary pin radius 26112 in inches, and any range or value there between.

In an embodiment, the secondary axial box radius height 26102 may be about equal to the secondary pin axial height 26108.

In an embodiment, the secondary pin center point 26110 may be located between a pin nose outer diameter (i.e., two times pin nose radius 140) and a pin nose inner diameter (i.e., two time pin nose inner radius 240*a*), and any range or value there between. In an embodiment, the secondary pin center point 26110 may be located about half-way between a pin nose outer diameter (i.e., two times pin nose radius 140) and a pin nose inner diameter (i.e., two times pin nose inner radius 240*a*). In an embodiment, the secondary pin center point 26110 may be located about [(pin nose outer diameter (i.e., two times pin nose radius 140)+pin nose inner diameter (i.e., two times pin nose inner radius 240*a*))/2].

In an embodiment, the secondary pin radius 26112 may be greater than about [(pin nose outer diameter (i.e., two times pin nose radius 140)−pin nose inner diameter (i.e., two times pin nose inner radius 240*a*))/4] inches, and any range or value there between.

In an embodiment, the secondary box center point 26104 may be about equal to the secondary pin center point 26110.

In an embodiment, the secondary box radius 26106 may be about equal to the secondary pin radius 26112 to form a torque shoulder.

In an embodiment, the secondary box radius 26106 may be slightly different from the secondary pin radius 26112 to form a torque shoulder that is a second seal. In an embodiment, the torque shoulder or the second seal may be a gas-tight seal.

As shown in FIG. 26B-2, the secondary box shoulder 2662 may have a fourth flat region 26128 at an inner edge of the curved profile and/or a fifth flat region 26130 at an outer edge of the curved profile.

In an embodiment, the fourth flat region 26128 at the inner edge of the curved profile may be coplanar with a third offset reference plane 2688*b*. In an embodiment, the third offset reference plane 2688*b* may be a third offset distance 26132 from the second reference plane 2688*a* away from the box threads 2626.

In an embodiment, the third offset distance 26132 may be from about 0.010 inch to about 0.030 inch, and any range or value there between. In an embodiment, the third offset distance 26132 may be about 0.015 inch.

In an embodiment, the fifth flat region 26130 at the outer edge of the curved profile may be co-planer with the second reference plane 2688*a* and perpendicular to the connection axis 2612, 2632.

As shown in FIG. 26B-2, the secondary pin shoulder 2666 may have a sixth flat region 26134 at an inner edge of the curved profile and a second angled region 26136 at an outer edge of the curved profile.

In an embodiment, the sixth flat region 26134 at the inner edge of the curved profile may be co-planer with the second reference plane 2688*a* and perpendicular to the connection axis 2612, 2632.

In an embodiment, the second angled region 26136 may be at a second angled region angle 26138 with respect to a fourth offset reference plane 2682*c*. In an embodiment, the fourth offset reference plane 2688*c* may be a fourth offset distance 26140 from the second reference plane 2688*a* towards the pin threads 2646.

In an embodiment, the first angled region angle 24118 may be from about 10 degrees to about 65 degrees, and any range or value there between. In an embodiment, the second angled region angle 26138 may be from about 15 degrees to about 60 degrees. In an embodiment, the second angled region angle 26138 may be about 45 degrees.

In an embodiment, the fourth offset distance 26140 may be from about 0.010 inch to about 0.030 inch, and any range or value there between. In an embodiment, the fourth offset distance 26140 may be about 0.015 inch.

FIG. 26C illustrates a cross-sectional view of an improved secondary connection shoulder 2600 according to an embodiment of the present invention. As discussed above with respect to FIG. 24C, the pitch line 2472 intersects the second perpendicular 2480, 2680 at a second intersection 2482, 2682. In an embodiment, the second intersection 2682 may be equal to a datum intersection.

A second perpendicular 2680 to the connection box/pin axis 2612, 2632 may be offset a second distance 2684 towards a secondary box/pin shoulder 2660 to locate a third perpendicular 2686 to the connection box/pin axis 2612, 2632 at the second distance 2684.

The pin nose outer diameter (i.e., two times pin nose radius 2640) intersects the third perpendicular 2686 at a third intersection 2688.

In an embodiment, the second distance 2684 may be any suitable distance. In an embodiment, the second distance 2684 may be equal to the connection length. The connection length varies with connection size.

In an embodiment, the second distance 2684 may be about 2 inches to about 8 inches, and any range or value there between.

In an embodiment, the secondary shoulder 2660 comprises a secondary box shoulder 2662 at a secondary box angle 2664 with respect to a third perpendicular 2686 to the box axis 2612 at a third intersection 2688 of the box connection; and a secondary pin shoulder 2666 at a secondary pin angle 2668 with respect to the third perpendicular 2686 to the pin axis 2632 at the third intersection 2688 of the pin connection. See also FIG. 1A: 112 & FIG. 1B: 132 (showing box and pin made-up).

Secondary Box Shoulder

In an embodiment, the secondary box shoulder 2662 may be any suitable shape. For example, suitable shapes include, but are not limited to, conical shaped, cylindrical shaped, conical-cylindrical shaped, and variations thereof. In an embodiment, the secondary shoulder 2662 may be conical shaped (outside of cone, male).

In an embodiment, the secondary box shoulder 2662 may be any suitable profile. For example, suitable profiles include, but are not limited to, angled profiles. In an embodiment, the secondary box shoulder 2662 may be an angled profile defined by a secondary box angle 2664, as discussed below.

In an embodiment, the secondary box angle 2664 may be from greater than or equal to about 0 degrees to less than or equal to 15 degrees, and any range or value there between. In an embodiment, the secondary box angle 2664 may be from greater than or equal to about 0 degrees to less than or equal to 10 degrees. In an embodiment, the secondary box angle 2664 may be about 5 degrees. In an embodiment, the secondary box angle 2664 may be about 0 degrees.

Secondary Pin Shoulder

In an embodiment, the secondary pin shoulder 2666 may be any suitable shape. For example, suitable shapes include, but are not limited to, conical shaped, cylindrical shaped, conical-cylindrical shaped, and variations thereof. In an embodiment, the secondary pin shoulder 2666 may be conical shaped (inside of cone, female).

In an embodiment, the secondary pin shoulder 2666 may be any suitable profile. For example, suitable profiles include, but are not limited to, angled profiles. In an embodiment, the secondary pin shoulder 2666 may be an angled profile defined by a secondary pin angle 2668, as discussed below.

In an embodiment, the secondary pin angle 2668 may be from greater than or equal to about 0 degrees to less than or equal to 15 degrees, and any range or value there between. In an embodiment, the secondary pin angle 2668 may be from greater than or equal to about 0 degrees to less than or equal to 10 degrees. In an embodiment, the secondary pin angle 2668 may be about 5 degrees. In an embodiment, the secondary pin angle 2668 may be about 0 degrees.

In an embodiment, the secondary box angle 2664 may be about equal to the secondary pin angle 2668 to form a torque shoulder.

In an embodiment, the secondary box angle 2664 may be slightly different from the secondary pin angle 2668 to form a torque shoulder that is a second seal. In an embodiment, the torque shoulder or the second seal may be a gas-tight seal.

Figure 27:
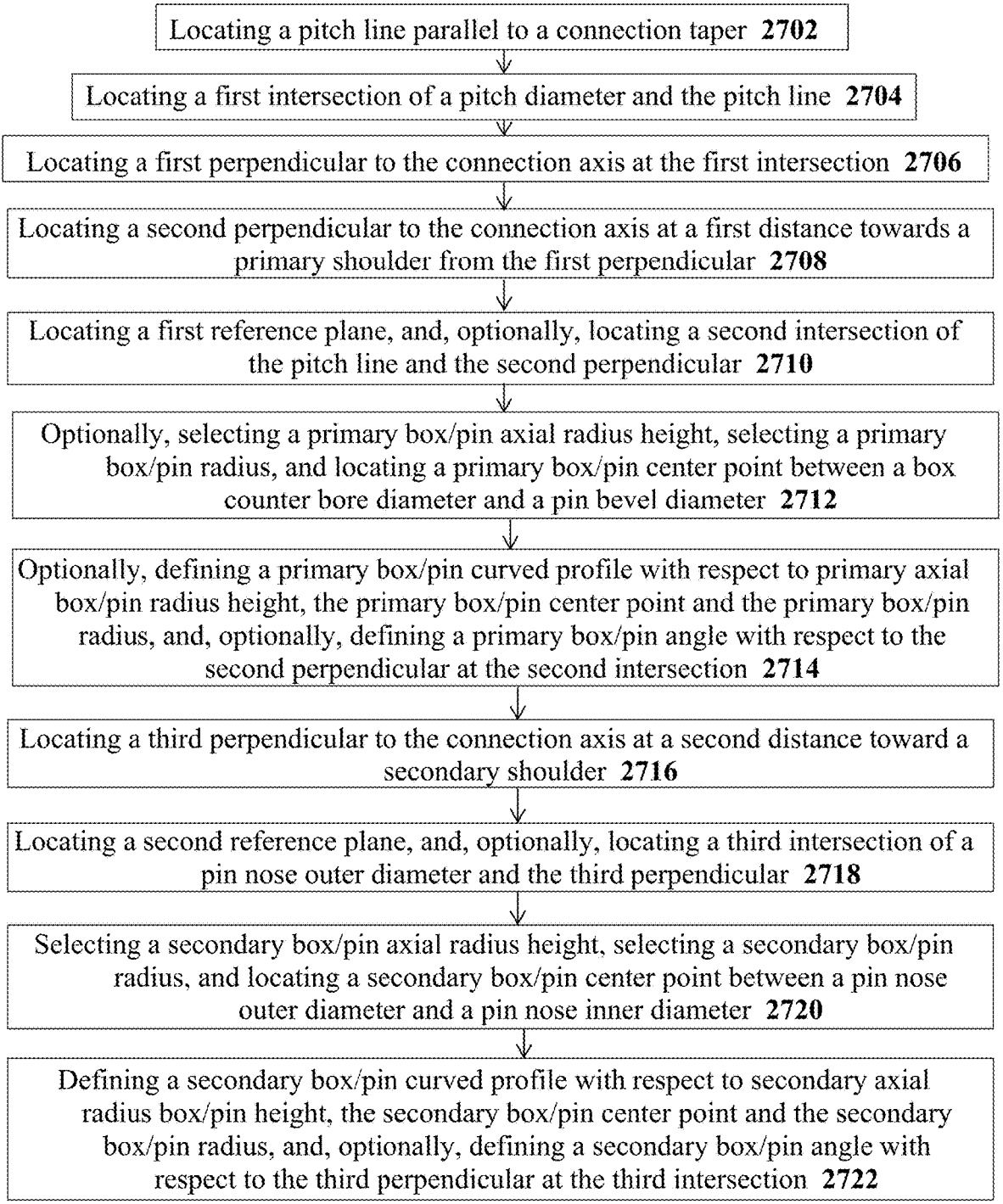
FIG. 27 illustrates a flow chart of a method for determining a secondary connection shoulder location according to an embodiment of the present inventions.

FIG. 27 illustrates a flowchart of a method to determine a secondary connection shoulder location 2700 according to an embodiment of the present invention. As shown in FIG. 27, the method 2700 comprises locating a pitch line parallel to a connection box/pin taper 2702; locating a first intersection of a pitch diameter and the pitch line 2704; locating a first perpendicular to the connection box/pin axis at the first intersection 2706; locating a second perpendicular to the connection pin/box axis at a first distance towards a primary box/pin shoulder from the first perpendicular (and parallel to the first perpendicular) 2708; locating a first reference plane, and, optionally, locating a second intersection of the pitch line and the second perpendicular 2710; selecting a primary axial box/pin radius height, selecting a primary box/pin radius, and locating a primary box/pin center point between a box counter bore diameter and a pin bevel diameter 2712; defining a primary box/pin curved profile with respect to primary axial box/pin radius height, the primary box/pin center point and the primary box/pin radius, and, optionally, defining a primary box/pin angle with respect to the second perpendicular at the second intersection 2714; locating a third perpendicular to the connection box/pin axis at a second distance (connection length) toward a secondary box/pin shoulder (and parallel to the second perpendicular) 2716; and locating a second reference plane, and, optionally, locating a third intersection of a pin nose outer diameter and the third perpendicular 2718.

In an embodiment, the method 2700 further comprises selecting a secondary axial box/pin radius height, selecting a secondary box/pin radius, and locating a secondary box/pin center point between a pin nose outer diameter and a pin nose inner diameter 2720.

In an embodiment, the method 2700 further comprises, defining a secondary box/pin curved profile with respect to secondary axial box/pin radius height, the secondary box/pin center point and the secondary box/pin radius, and, optionally, defining a secondary box/pin angle with respect to the third perpendicular at the third intersection 2722.

Figure 16:
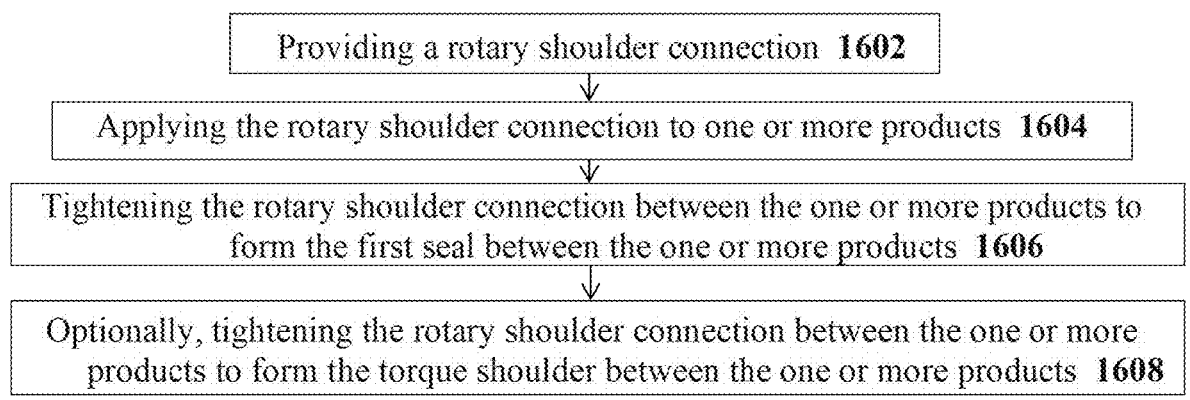
FIG. 16 illustrates a flowchart of a method of using an improved double-shoulder connection with an angled primary shoulder or an improved single-shoulder connection with an angled primary shoulder according to an embodiment of the present invention.

Method of Using Improved Double-Shoulder Connection with Angled Primary Shoulder or Improved Single-Shoulder Connection with Angled Primary Shoulder FIG. 16 illustrates a flowchart of a method of using an improved double-shoulder connection with an angled primary shoulder or an improved single-shoulder connection with an angled primary shoulder 1600 according to an embodiment of the present invention. As shown in FIG. 16, the method 1600 comprises providing a rotary shoulder connection 1602, and applying the rotary shoulder connection to one or more products 1604.

In an embodiment, the rotary shoulder connection may be the improved double-shoulder connection 400, 500, 700 with an angled primary shoulder 450, 550, 750 or the improved double-shoulder connection 600 with an angled secondary shoulder 660, or the improved single-shoulder connection 800, 900, 1000 with an angled primary shoulder 850, 950, 1050, as discussed above.

In an embodiment, the rotary shoulder connection may be the improved double-shoulder connection 400, 500, 600, 700 with an angled primary shoulder 450, 550, 750 and/or an angled secondary shoulder 660, 760, as discussed above.

In an embodiment, the method 1600 further comprises tightening the rotary shoulder connection between the one or more products to form a first seal at an angled primary shoulder 450, 550, 650, 750, 850, 950, 1050.

In an embodiment, the method 1600 further comprises tightening the rotary shoulder connection between the one or more products to form a first seal at an angled primary shoulder 450, 550, 750 and/or a torque shoulder at an angled secondary shoulder 660, 760.

Method of Using Improved Double-Shoulder Connection with Curved Primary Shoulder or Improved Single-Shoulder Connection with Curved Primary Shoulder FIG. 28 illustrates a flowchart of a method of using an improved double-shoulder connection with a curved primary shoulder or an improved single-shoulder connection with a curved primary shoulder 2800 according to an embodiment of the present invention. As shown in FIG. 24, the method 2800 comprises providing a rotary shoulder connection 2802, and applying the rotary shoulder connection to one or more products 2804.

In an embodiment, the rotary shoulder connection may be the improved double-shoulder connection 1700, 1800, 2000, 2400 with a curved primary shoulder 1750, 1850, 2050, 2450 or the improved double-shoulder connection 1900 with a curved secondary shoulder 1960, or the improved single-shoulder connection 2100, 2200, 2300, 2400 with a curved primary shoulder 2150, 2250, 2350, 2450, as discussed above.

In an embodiment, the rotary shoulder connection may be the improved double-shoulder connection 1700, 1800, 1900, 2000, 2400, 2600 with a curved primary shoulder 1750, 1850, 2050, 2450 and/or a curved secondary shoulder 1960, 2060, 2660, as discussed above.

In an embodiment, the method 2800 further comprises tightening the rotary shoulder connection between the one or more products to form a first seal at an angled primary shoulder 1750, 1850, 1950, 2050, 2150, 2250, 2350, 2450.

In an embodiment, the method 2800 further comprises tightening the rotary shoulder connection between the one or more products to form a first seal at a curved primary shoulder 1750, 1850, 2050, 2450.

In an embodiment, the method 2800 further comprises tightening the rotary shoulder connection between one or more products to form a torque shoulder at a curved secondary shoulder 1960, 2060, 2660.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms (e.g., "outer" and "inner," "upper" and "lower," "first" and "second," "internal" and "external," "above" and "below" and the like) are used as words of convenience to provide reference points and, as such, are not to be construed as limiting terms.

The embodiments set forth herein are presented to best explain the present invention and its practical application and to thereby enable those skilled in the art to make and utilize the invention. However, those skilled in the art will recognize that the foregoing description has been presented for the purpose of illustration and example only. The description as set forth is not intended to be exhaustive or to limit the invention to the precise form disclosed. Many modifications and variations are possible in light of the above teaching without departing from the spirit and scope of the following claims.

Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

Definitions

As used herein, the terms "a," "an," "the," and "said" mean one or more, unless the context dictates otherwise.

As used herein, the term "about" means the stated value plus or minus a margin of error plus or minus 10% if no method of measurement is indicated.

As used herein, the term "or" means "and/or" unless explicitly indicated to refer to alternatives only or if the alternatives are mutually exclusive.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the phrase "consisting of" is a closed transition term used to transition from a subject recited before the term to one or more material elements recited after the term, where the material element or elements listed after the transition term are the only material elements that make up the subject.

As used herein, the phrase "material yields" means the material has exceeded its modulus of elasticity.

As used herein, the term "simultaneously" means occurring at the same time or about the same time, including concurrently.

INCORPORATION BY REFERENCE

All patents and patent applications, articles, reports, and other documents cited herein are fully incorporated by reference to the extent they are not inconsistent with this invention.

What is claimed is:

1. A drill pipe comprising:
   (a) A drill pipe body having a drill pipe body outer diameter and a drill pipe body inner diameter, wherein the drill pipe body comprises a drill pipe body wall thickness, wherein the drill pipe body outer diameter is from about 5.1-inches to about 5.4-inches and the drill pipe body inner diameter is from about 4.4-inches to about 4.6-inches, wherein the drill pipe body wall thickness is from about 0.352-inches to about 0.370-inches; and
   (b) A tool joint comprising a rotary shoulder box connection, wherein the rotary shoulder connection comprises:
      i. A box connection having a box axis, wherein the box connection has a box outer radius, a box counter bore radius and a box inner radius, and box threads having a box thread form cut along a box taper;
      ii. A pin connection having a pin axis, wherein the pin connection has a pin outer radius, a pin cylinder radius and a pin nose radius, and pin threads having a pin thread form cut along a pin taper to align with the box threads inside the box connection; and
      iii. A primary shoulder connection at a first end of the box connection and a first end of the pin connection comprising:
         (1) A primary box shoulder at a primary box angle with respect to a first perpendicular to the box axis at a first end point, wherein the primary box angle is from greater than about 0 degrees to less than or equal to about 15 degrees;
         (2) A primary pin shoulder at a primary pin angle with respect to the first perpendicular to the pin axis at the first end point, wherein the primary pin angle is from greater than about 0 degrees to less than or equal to about 15 degrees; and
         (3) wherein the primary box shoulder contacts the primary pin shoulder to form a first seal.

2. The drill pipe of claim 1, wherein the drill pipe body outer diameter is about 5.25-inches and the drill pipe body inner diameter is about 4.528-inches.

3. The drill pipe of claim 1, wherein the tool joint comprises:
   (a) A tool joint box having a tool joint box outer diameter and a tool joint box inner diameter, wherein the tool joint box outer diameter is from about 6.1-inches to about 6.4-inches and the tool joint box inner diameter is from about 3.4-inches to about 3.6-inches;
   (b) A tool joint pin having a tool joint pin outer diameter and a tool joint pin inner diameter, wherein the tool joint pin outer diameter is from about 6.1-inches to about 6.4-inches and the tool joint pin inner diameter is from about 3.4-inches to about 3.6-inches.

4. The drill pipe of claim 3, wherein the tool joint box outer diameter is about 6.25-inches and the tool joint box inner diameter is about 3.5-inches and wherein the tool joint pin outer diameter is about 6.25-inches and the tool joint pin inner diameter is about 3.5-inches.

5. The drill pipe of claim 3, wherein the tool joint box comprises:
   (a) A tapered elevator shoulder having a tapered elevator shoulder angle, wherein the tapered elevator shoulder angle is from about 16 degrees to about 20 degrees.

6. The drill pipe of claim 5, wherein the tapered elevator shoulder angle is about 18 degrees.

7. The drill pipe of claim 3, wherein the tool joint pin comprises:
   (a) A tapered pin shoulder having a tapered pin shoulder angle, wherein the tapered pin shoulder angle is from about 16 degree to about 36-degrees.

8. The drill pipe of claim 7, wherein the tapered pin shoulder angle is from about 16-degrees to about 20 degrees.

9. The drill pipe of claim 7, wherein the tapered pin shoulder is about 18 degrees.

10. The drill pipe of claim 3, wherein the tool joint box comprises:
    (a) A drill pipe box weld neck in a region of a drill pipe box body upset having a drill pipe box body upset inner diameter, wherein the drill pipe box body upset inner diameter is from about 3.66-inches to about 3.85-inches.

11. The drill pipe of claim 10, wherein the drill pipe box body inner diameter is about 3.752-inches.

12. The drill pipe of claim 3, wherein the tool joint pin comprises:
    (a) A drill pipe pin weld neck in a region of a drill pipe pin body upset having a drill pipe pin body upset inner diameter, wherein the drill pipe pin body upset inner diameter is from about 3.66-inches to about 3.85-inches.

13. The drill pipe of claim 12, wherein the drill pipe pin body upset inner diameter is about 3.752-inches.

14. The drill pipe of claim 3, wherein the tool joint box comprises:
    (a) A tool joint box length, wherein the tool joint box length is from about 15-inches to about 19-inches.

15. The drill pipe of claim 14, wherein the tool joint box length is about 17-inches.

16. The drill pipe of claim 3, wherein the tool joint pin comprises:
    (a) A tool joint pin length, wherein the tool joint pin length is from about 12.5-inches to about 15.5-inches.

17. The drill pipe of claim 16, wherein the tool joint pin length is about 14-inches.

18. The drill pipe of claim 1, wherein the tool joint comprises:
    (a) A box hardband having a box hardband outer diameter, wherein the box hardband outer diameter is from about 6.3-inches to about 6.6-inches; and
    (b) A pin hardband having a pin hardband outer diameter, wherein the pin hardband outer diameter is from about 6.3-inches to about 6.6-inches.

19. The drill pipe of claim 18, wherein the box hardband outer diameter is about 6.438-inches and the pin hardband outer diameter is about 6.438-inches.

20. The drill pipe of claim 1,
    (a) wherein the drill pipe body wall thickness is about 0.362-inch.

21. The drill pipe of claim 1, wherein the drill pipe body wall thickness is about 0.361-inch.

22. The drill pipe of claim 1, wherein the drill pipe comprises:
    (a) A drill pipe length, wherein the drill pipe length is from about 25-feet to about 50-feet.

23. The drill pipe of claim 22, wherein the drill pipe length is about 31.5-feet.

24. The drill pipe of claim 1, wherein the rotary shoulder connection comprises:
    (a) A rotary shoulder connection length, wherein the rotary shoulder connection length is from about 4.275-inches to about 5.225-inches.

25. The drill pipe of claim 24, wherein the rotary shoulder connection length is about 4.75-inches.

26. The drill pipe of claim 1, wherein the first end point is equal to a datum intersection.

27. The drill pipe of claim 1, wherein the primary box angle is from greater than about 0 degrees to less than or equal to about 10 degrees and the primary pin angle is from greater than about 0 degrees to less than or equal to about 10 degrees.

28. The drill pipe of claim 1, wherein the primary box angle is about 5 degrees and the primary pin angle is about 5 degrees.

29. The drill pipe of claim 1, wherein the primary box angle is about equal to the primary pin angle to form the first seal.

30. The drill pipe of claim 1, wherein the primary box angle is slightly different than the primary pin angle to form the first seal.

31. The drill pipe of claim 1, wherein the primary box shoulder is conical shaped (outside of cone, male) and the primary pin shoulder is conical shaped (inside of cone, female).

32. The drill pipe of claim 1, wherein the box thread form comprises a first box thread crest, a second box thread crest, a first box thread flank, a second box thread flank, a box included angle between the first box thread flank and the second box thread flank, and a box thread root, and wherein the pin thread form comprises a first pin thread crest, a second pin thread crest, a first pin thread flank, a second pin thread flank, a pin included angle between the first pin thread flank and the second pin thread flank, and a pin thread root.

33. The drill pipe of claim 32, wherein the box thread form is selected from the group consisting of square, triangular, trapezoidal, and variations thereof, and wherein the pin thread form is selected from the group consisting of square, triangular, trapezoidal, and variations thereof.

34. The drill pipe of claim 32, wherein the first box thread crest and/or the second box thread crest is circular, square, triangular or trapezoidal shaped, and wherein the first pin thread crest and/or the second pin thread crest is circular, square, triangular or trapezoidal shaped.

35. The drill pipe of claim 32, wherein the first box thread flank and/or the second box thread flank are concave, convex, or straight shaped, and wherein the first pin thread flank and/or the second pin thread flank are concave, convex, or straight shaped.

36. The drill pipe of claim 32, wherein the box thread root is circular, square, triangular or trapezoidal shaped, and wherein the pin thread root is circular, square, triangular or trapezoidal shaped.

37. The drill pipe of claim 32, wherein the box included angle is from about 29 degrees to about 90 degrees, and wherein the pin included angle is from about 29 degrees to about 90 degrees.

38. The drill pipe of claim 32, wherein the box thread form is triangular and the box included angle is about 60 degrees, and wherein the pin thread form is triangular shaped and the pin included angle is about 60 degrees.

39. The drill pipe of claim 1, wherein the box threads and/or the pin threads are treated by one or more of cold rolling, shot peening, phosphating, fluoropolymer coating, ceramic coating, chrome plating, anodizing, and variations thereof.

40. The drill pipe of claim 1, wherein the box threads and/or the pin threads are treated by one or more of cold rolling, shot peening, fluoropolymer coating, and anodizing.

41. The drill pipe of claim 1 further comprising one or more of a box boreback, a box stress relief groove and a pin stress relief groove.

42. The drill pipe of claim 1, wherein the drill pipe is made from one or more of low alloy steels, stainless steels, super alloys, titanium alloys, copper alloys, cobalt alloys, aluminum alloys, and variations thereof.

43. The drill pipe of claim 1, wherein the drill pipe is made from one or more of low alloy steels, stainless steels, and variations thereof.

44. The drill pipe of claim 1, wherein the rotary shoulder connection further comprises:
   (a) A secondary shoulder connection at a second end of the box connection and a second end of the pin connection comprising:
      i. A secondary box shoulder at a secondary box angle with respect to a second perpendicular to the box axis at a second end point, wherein the secondary box angle is from greater than or equal to about 0 degrees to less than or equal to about 15 degrees;
      ii. A secondary pin shoulder at a secondary pin angle with respect to the second perpendicular to the pin axis at the second end point, wherein the secondary pin angle is from greater than or equal to about 0 degrees to less than or equal to about 15 degrees; and
      iii. wherein the secondary box shoulder contacts the secondary pin shoulder to form a torque shoulder.

45. The drill pipe of claim 44, wherein the second end is offset a first distance from the first end.

46. The drill pipe of claim 45, wherein the first distance is a connection length.

47. The drill pipe of claim 44, wherein the secondary box angle is from greater than or equal to about 0 degrees to less than or equal to 10 degrees and the secondary pin angle is from greater than or equal to about 0 degrees to less than or equal to about 10 degrees.

48. The drill pipe of claim 44, wherein the secondary box angle is about 5 degrees and the secondary pin angle is about 5 degrees.

49. The drill pipe of claim 44, wherein the secondary box angle is about 0 degrees and the secondary pin angle is about 0 degrees.

50. The drill pipe of claim 44, wherein the secondary box angle is about equal to the secondary pin angle to form the torque shoulder.

51. The drill pipe of claim 44, wherein the secondary box angle is slightly different than the secondary pin angle to form the torque shoulder.

52. The drill pipe of claim 44, wherein the secondary box shoulder is conical shaped (outside of cone, male) and the secondary pin shoulder is conical shaped (inside of cone, female).

53. The drill pipe of claim 44, wherein the box thread form comprises a first box thread crest, a second box thread crest, a first box thread flank, a second box thread flank, a box included angle between the first box thread flank and the second box thread flank, and a box thread root, and wherein the pin thread form comprises a first pin thread crest, a second pin thread crest, a first pin thread flank, a second pin thread flank, a pin included angle between the first pin thread flank and the second pin thread flank, and a pin thread root.

54. The drill pipe of claim 53, wherein the box thread form is selected from the group consisting of square, triangular, trapezoidal, and variations thereof, and wherein the pin thread form is selected from the group consisting of square, triangular, trapezoidal, and variations thereof.

55. The drill pipe of claim 53, wherein the box thread crest is circular, square, triangular or trapezoidal shaped, and wherein the pin thread crest is circular, square, triangular or trapezoidal shaped.

56. The drill pipe of claim 53, wherein the first box thread flank and/or the second box thread flank are concave, convex, or straight shaped, and wherein the first pin thread flank and/or the second pin thread flank are concave, convex, or straight shaped.

57. The drill pipe of claim 53, wherein the box thread root is circular, square, triangular or trapezoidal shaped, and wherein the pin thread root is circular, square, triangular or trapezoidal shaped.

58. The drill pipe of claim 53, wherein the box included angle is from about 29 degrees to about 90 degrees, and wherein the pin included angle is from about 29 degrees to about 90 degrees.

59. The drill pipe of claim 53, wherein the box thread form is triangular and the box included angle is about 60 degrees, and wherein the pin thread form is triangular shaped and the pin included angle is about 60 degrees.

60. The drill pipe of claim 44, wherein the box threads and/or the pin threads are treated by one or more of cold rolling, shot peening, phosphating, fluoropolymer coating, ceramic coating, chrome plating, anodizing, and variations thereof.

61. The drill pipe of claim 44, wherein the box threads and/or the pin threads are treated by one or more of cold rolling, shot peening, fluoropolymer coating, and anodizing.

62. The drill pipe of claim 44 further comprising one or more of a box boreback, a box stress relief groove and a pin stress relief groove.

63. The drill pipe of claim 44, wherein the drill pipe is made from one or more of low alloy steels, stainless steels, super alloys, titanium alloys, copper alloys, cobalt alloys, aluminum alloys, and variations thereof.

64. The drill pipe of claim 44, wherein the drill pipe is made from one or more of low alloy steels, stainless steels, and variations thereof.

65. A method of using a drill pipe comprises:
(a) Providing a plurality of the drill pipe of claim 1;
(b) Connecting the plurality of the drill pipe to produce a drill string.

* * * * *